(12) United States Patent
Saiguchi et al.

(10) Patent No.: US 7,021,655 B2
(45) Date of Patent: Apr. 4, 2006

(54) PASSENGER PROTECTING APPARATUS

(75) Inventors: Ryoji Saiguchi, Tokyo (JP); Hiroaki Fujii, Tokyo (JP); Masahiro Higuchi, Tokyo (JP); Katsuyuki Sakai, Tokyo (JP); Ichizo Kobayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 57 days.

(21) Appl. No.: 10/714,928

(22) Filed: Nov. 18, 2003

(65) Prior Publication Data

US 2004/0155436 A1    Aug. 12, 2004

Related U.S. Application Data

(62) Division of application No. 09/749,527, filed on Dec. 28, 2000, now Pat. No. 6,715,788.

(30) Foreign Application Priority Data

Dec. 28, 1999 (JP) .............................. H11-375178
Jul. 4, 2000 (JP) .............................. 2000-202511

(51) Int. Cl.
*B60R 21/18* (2006.01)

(52) U.S. Cl. ................... 280/733; 297/216.1

(58) Field of Classification Search ............. 280/730.1, 280/730.2, 733, 806; 297/216.1, 216.13, 297/216.14
See application file for complete search history.

(56) References Cited

U.S. PATENT DOCUMENTS

| | | | |
|---|---|---|---|
| 4,154,472 A | 5/1979 | Bryll | |
| 4,884,652 A | 12/1989 | Vollmer | |
| 5,082,326 A | 1/1992 | Sekido et al. | |
| 5,125,472 A | 6/1992 | Hara | |
| 5,454,595 A | 10/1995 | Olson et al. | |
| 5,464,246 A * | 11/1995 | Castro et al. | ............ 280/730.2 |
| 5,480,181 A | 1/1996 | Bark et al. | |
| 5,695,242 A | 12/1997 | Brantman et al. | |
| 5,765,867 A | 6/1998 | French | |
| 5,782,492 A * | 7/1998 | Ojima et al. | ................. 280/806 |
| 5,829,827 A * | 11/1998 | Schaper et al. | ........... 297/216.1 |
| 5,839,753 A * | 11/1998 | Yaniv et al. | ................. 280/733 |
| 5,902,010 A | 5/1999 | Cuevas | |
| 5,908,219 A * | 6/1999 | Bohmler | ................... 297/216.1 |
| 5,947,514 A | 9/1999 | Keller et al. | |
| 6,029,993 A * | 2/2000 | Mueller | .................... 280/730.2 |
| 6,050,635 A * | 4/2000 | Pajon et al. | .............. 297/216.1 |
| 6,070,904 A | 6/2000 | Ozaki et al. | |
| 6,109,647 A | 8/2000 | Akaba et al. | |
| 6,113,185 A | 9/2000 | Yamaguchi et al. | |
| 6,126,194 A | 10/2000 | Yaniv et al. | |

(Continued)

FOREIGN PATENT DOCUMENTS

DE    195 04 975 A1    8/1996

(Continued)

*Primary Examiner*—David R. Dunn
(74) *Attorney, Agent, or Firm*—Foley & Lardner LLP

(57) ABSTRACT

A passenger protecting apparatus that prevents a submarine phenomenon of the passenger by the use of an air belt that is configured to inflate to form a sleeve wall. The apparatus includes a seat cushion that includes a seat pad, and an air belt disposed under the seat pad. The apparatus includes a buckle and a lap anchor. The rear end on the right and the left of the air belt are connected to the buckle and the lap anchor via a wire respectively. Upon collision, the air belt is inflated and the front portion of the seat pad is pushed up so that a submarine phenomenon is prevented and the buckle and the lap anchor are pulled down.

15 Claims, 47 Drawing Sheets

U.S. PATENT DOCUMENTS

| | | |
|---|---|---|
| 6,145,879 A | 11/2000 | Lowe et al. |
| 6,206,409 B1 | 3/2001 | Kato et al. |
| 6,237,942 B1 * | 5/2001 | Swann .................... 280/730.2 |
| 6,254,181 B1 | 7/2001 | Aufrere et al. |
| 6,296,292 B1 | 10/2001 | Feldman |
| 6,336,656 B1 | 1/2002 | Romeo |

FOREIGN PATENT DOCUMENTS

| | | |
|---|---|---|
| DE | 196 39 467 C1 | 1/1998 |
| DE | 197 35 915 A1 | 3/1998 |
| GB | 2323336 A | 9/1998 |
| JP | 1-275230 | 2/1989 |
| JP | 5-229378 A | 9/1993 |
| JP | 10217818 | 8/1998 |
| JP | 10309967 | 11/1998 |
| WO | WO 92/06861 | 4/1992 |
| WO | WO 94/19215 A1 | 9/1994 |
| WO | WO 98/41426 | 9/1998 |
| WO | WO 99/30922 | 6/1999 |

* cited by examiner

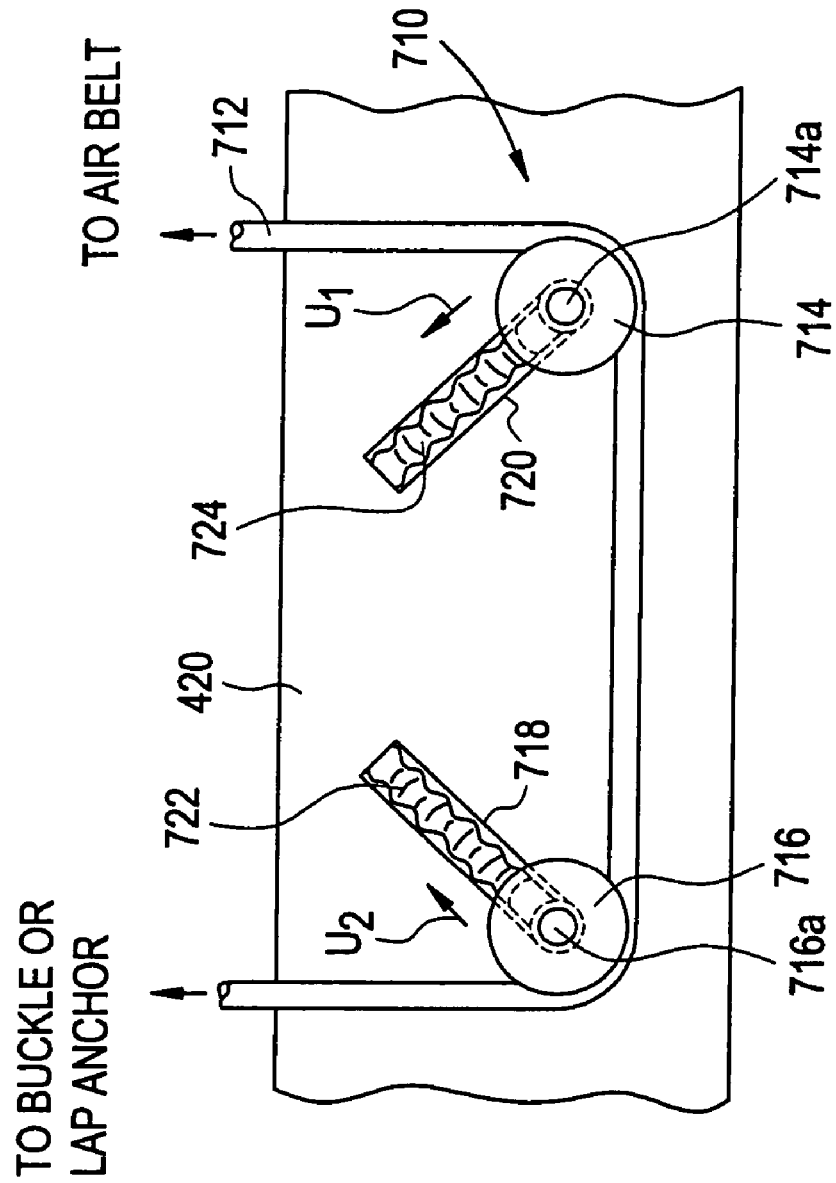

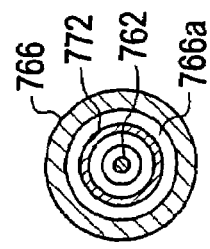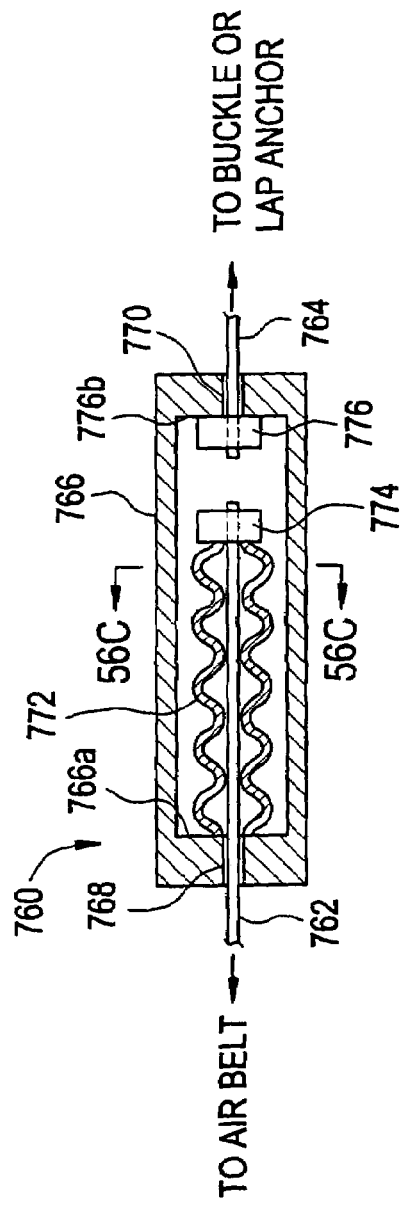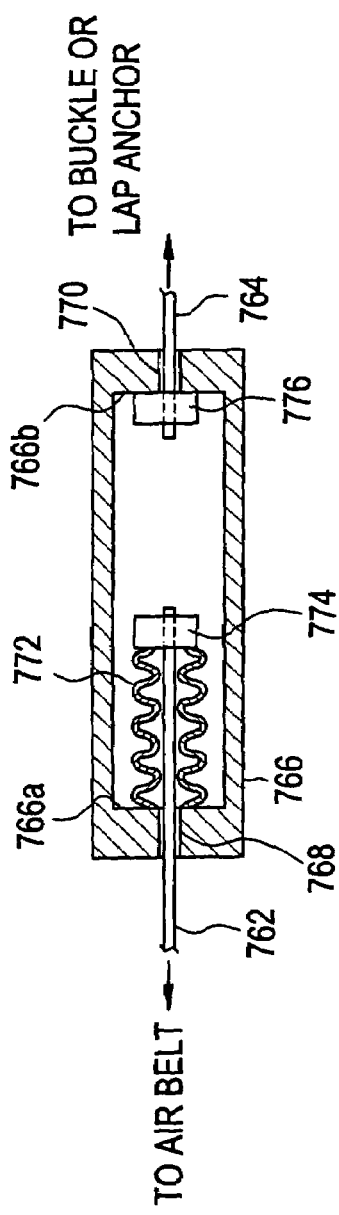

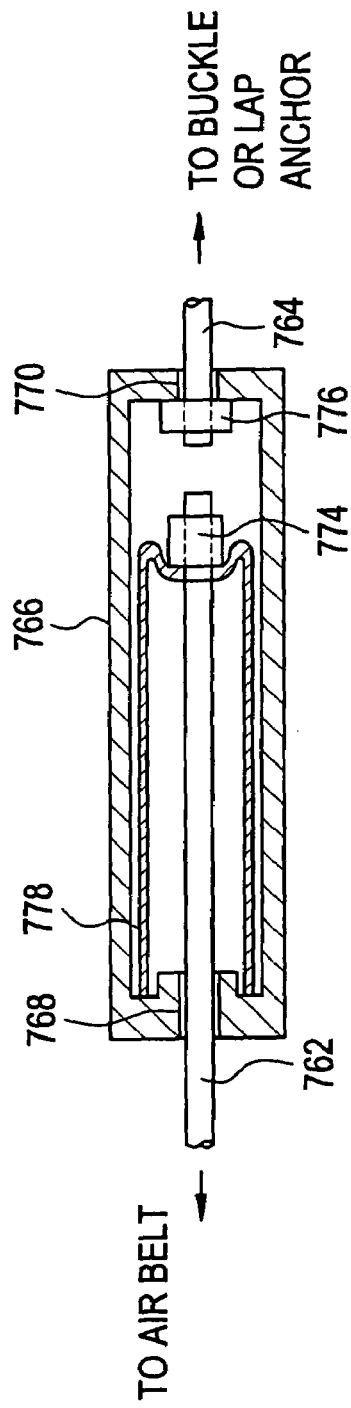
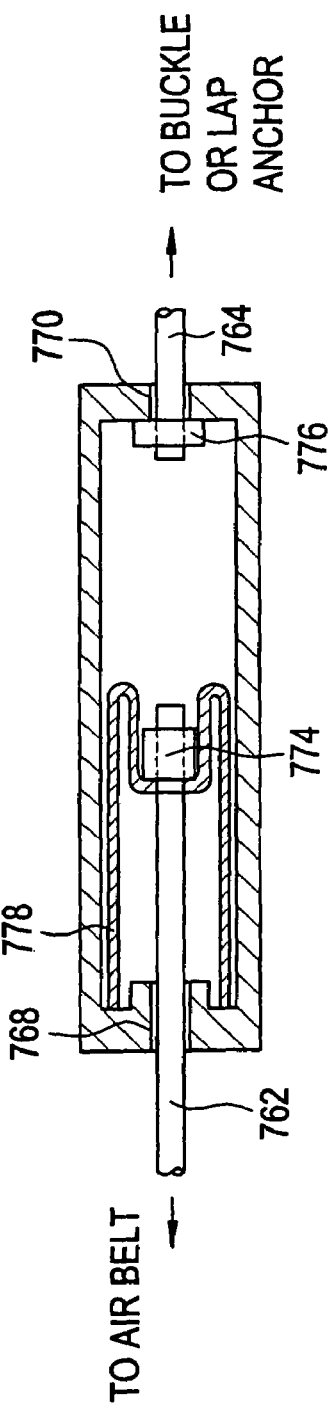
FIG. 58A
FIG. 58B

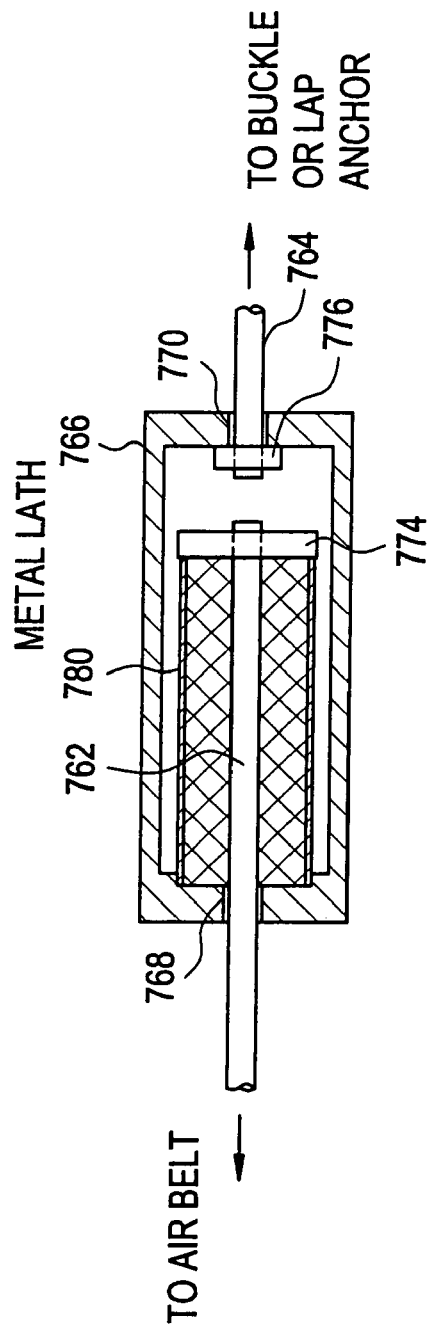
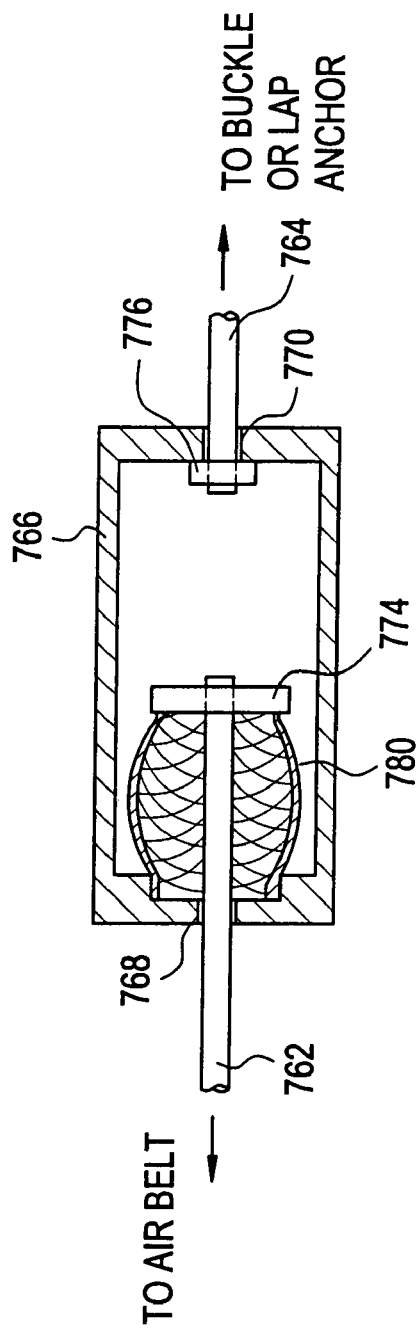

PASSENGER PROTECTING APPARATUS

CROSS REFERENCE TO RELATED APPLICATIONS

The present application is a divisional application of U.S. patent application Ser. No. 09/749,527 filed on Dec. 28, 2000 now U.S. Pat. No. 6,715,788. The foregoing application is incorporated by reference herein in its entirety.

BACKGROUND OF THE INVENTION

The present invention relates to a passenger protecting apparatus for protecting a passenger sitting on the seat of the vehicle such as an automotive vehicle in the event of a collision.

Various types of air bag apparatuses, air belt apparatuses, or air curtain apparatuses have been developed as systems to protect passengers in the automotive vehicle in the event of a collision.

An apparatus has been proposed for raising the front portion of the seat cushion upon collision of the vehicle in order to prevent a submarine phenomenon where the passenger is squeezed out through the lap belt downwardly in case of a frontal crash even when the passenger is wearing the seat belt. For example, in Japanese Unexamined Patent Application Publication No. 10-309967, a vehicle seat in which the front end of the seat cushion is adapted to be raised by a cartridge actuator is disclosed, and in Japanese Unexamined Patent Application Publication No. 10-217818, a vehicle seat in which the front end of the seat cushion is raised by an air bag is disclosed.

SUMMARY OF THE INVENTION

Accordingly, it is an object of the present invention to provide a passenger protecting apparatus adapted to generate a driving force by an air belt.

The passenger protecting apparatus of the present invention comprises a seat having a seat cushion and a seat back, and means for hardening the front portion of said seat cushion in the event of emergency of the vehicle, wherein said means is an air belt which decreases in length when inflated.

In the passenger protecting apparatus, the air belt is preferably disposed under the seat cushion and is prevented from moving downward and forward when inflated, and there may be provided a back-up member for preventing said air belt from moving downward under the air belt.

In the passenger protecting apparatus in this arrangement, the seat cushion is raised by the inflation of the air belt, or is hardened by applying a pressure from below to the portion being in contact with the air belt in case of emergency such as a collision of the vehicle or the like so as to prevent a submarine phenomenon of the passenger.

When a back-up member is disposed under the air belt, a projection extending upward for positioning the air belt may be provided on the back-up member. In this case, the projection deforms when a pressure in excess of a prescribed value is applied to said projection by the air belt so that the forward movement of the air belt is permitted.

In this arrangement, it is assured that the front portion of the seat cushion is pushed up or hardened by the air belt in case of emergency of the vehicle, and when the passenger bumped against the front portion of the seat cushion with an excess of an impactive force, the base plate moves forward of the seat cushion while deforming the projection in accordance with the movement of the passenger and absorbs the impactive force.

In this passenger protecting apparatus, the air belt may be extended in the direction of the width of said seat cushion and connected to the structural member of said seat cushion at both ends thereof.

In this passenger protecting apparatus, the air belt is preferably provided with a shock-absorbing mechanism.

In this case, the shock-absorbing mechanism may be a gas outlet for preventing the internal pressure of the air belt from increasing excessively by discharging the gas from the air belt when the air belt is inflated (hereinafter such a gas outlet may be referred to as "vent hole"), or may be a tear seam formed in such a manner that a part of the air belt is seamed with a thread for reducing the volume of the air belt in the inflated state and the thread is broken and the seamed portion is torn when the internal pressure of the air belt reaches or exceeds a prescribed pressure in order to allow the air belt to increase in volume and to lower the internal pressure therein. When the gas outlet is used as a shock-absorbing mechanism, it is also possible to construct in such a manner that valve means that opens when the gas pressure reaches or exceeds the prescribed value is provided to prevent the gas from escaping when the air belt is being inflated.

The shock-absorbing mechanism comprises a gas outlet provided on the air belt, and a tear seam formed by seaming a part of said air belt and closing said gas outlet, wherein the tear seam is broken so that said air belt increase in volume and simultaneously said gas outlet is opened to allow the gas to escape when the internal pressure of the air belt reaches or exceeds a prescribed value.

In this arrangement, when the internal pressure of the inflated air belt is not more than the prescribed value, a part of the air belt is being seamed to form a tear seam and the vent hole is closed. When the internal pressure of the air belt reaches or exceeds a prescribed value, since the tear seam is broken to allow the air belt to increase in volume and simultaneously to allow the vent hole to open, the internal pressure of the air belt decreases with the increase of the volume of the air belt, and a gas is escaped through a vent hole to prevent the internal pressure of the air belt from excessively increasing.

The shock-absorbing mechanism may be means to limit deployment of the air belt when the internal pressure of the air belt is not more than the prescribed value, and release the limitation and allow the air belt to increase in volume and decrease in internal pressure accordingly when the internal pressure of the air belt reaches or exceeds the prescribed value.

In the passenger protecting apparatus of the present invention provided with such a shock-absorbing mechanism, when the passenger bumped against the front portion of the seat cushion with a large impactive force when the air belt inflated and thus the front portion of the seat cushion is raised or hardened, the air belt receives the passenger via said seat cushion. When the air belt is pressurized by the impactive force and thus the internal pressure of the air belt reaches or exceeds a prescribed value, the shock-absorbing mechanism described above is actuated to decrease the internal pressure of the air belt or to prevent an excessive increase of the internal pressure of the air belt, thereby absorbing the impactive force.

The passenger protecting apparatus of the present invention may further comprise a seat belt apparatus for restraining the passenger sitting on the seat and a lowering mechanism for lowering at least one of the buckle and the lap anchor of said seat belt apparatus in case of emergency of the vehicle, wherein said lowering mechanism includes an air belt that decreased in length by inflation thereof as a driving power source for lowering movement.

In the passenger protecting apparatus described above, a shrinking force of the air belt can apply a pretension to the seat belt.

In the passenger protecting apparatus including the seat belt apparatus, the end of the air belt and at least one of said buckle and the lap anchor are preferably connected via a linkage. As an alternative to this linkage, it is also possible that the end of the air belt and at least one of the buckle and the lap anchor are connected via a rack-and-pinion mechanism, or that the end of the air belt and at least one of said buckle and the lap anchor are connected via a linear body.

In the air belt including the seat belt apparatus in which the end of the air belt and at least one of the buckle and the lap anchor are connected, the shrinking force of the air belt is transmitted to the buckle or the lap anchor by said linkage, the rack-and-pinion, or the linear body, and thus the buckle or the lap anchor is pulled down, thereby applying a pretension to the seat belt.

When the end of the air belt and at least one of the buckle and the lap anchor are connected via a linear body, the linear body may be a flexible elongated member such as a wire or a rope, or webbing or mesh webbing having one end elongated.

The linear body may be guided by a guide column or the like, or by a member such as a pulley or a roller. It may also be guided by a member having slipping property such as a slip anchor.

In this passenger protecting apparatus, means for transmitting a shrinking force of the air belt to the buckle and the anchor may comprises a first linear body which is connected at one end to one end of the air belt and the other end to a rotatable body, and a second linear body having one end connected to said buckle or the lap anchor and the other end being windable on said rotatable body.

When the air belt and the buckle or the lap anchor are connected in this arrangement, a rotatable body comprising a pair of rollers coaxially connected so as to rotate integrally is used, the other end of the first linear body connected at one end to the air belt is wound onto one of the rollers of a rotatable body, and the other end of the second linear body connected at one end to the buckle or the lap anchor is windably connected to the other roller of the rotatable body, so that when the air belt is inflated and decreases in length, one end of said first linear body is pulled by the shrinking force of the air belt, and the other end of the first linear body wound on said one of the rollers of a rotatable body is unwound from the roller, along with which said roller, in other words, the rotatable body rotates and said other end of the second linear body is wound on the other roller, whereby the buckle or the lap anchor connected to one end of the second linear body is pulled down, thereby applying a pretension to the seat belt.

In this arrangement as well, the first linear body and the second linear body maybe flexible elongated members such as wire or rope, and may be webbing or mesh webbing having one end elongated.

This passenger protection apparatus preferably comprises raising means for raising the front portion of the seat cushion in case of emergency of the vehicle, and the power source of said raising means is an air belt sheared with the power source for said lowering means. Preferably, a force from the air belt is transmitted to the driven member via a one-way clutch.

The passenger protecting apparatus including the seat belt apparatus as described above may further comprise a power transmission mechanism in which the air belt and the buckle or the anchor are connected to transmit a power to the buckle or the anchor preferably comprises a shock-absorbing mechanism which allows the upward movement of the buckle or the lap anchor while applying a drag to said buckle or said lap anchor when an upward force not less than the prescribed value is applied to said buckle or said lap anchor lowered by the lowering mechanism.

In this case, the shock-absorbing mechanism may be a gas outlet for preventing the internal pressure from increasing excessively by supplying a gas from the air belt when the air belt is inflated, or may be a tear seam constructed in such a manner that the air belt is partly seamed by a thread for reducing the volume of the air belt in the inflated state, and the thread is broken and seamed portion is torn when he internal pressure of the air belt reaches or exceeds a prescribed pressure in order to allow the air belt to increase in volume and to lower the internal pressure therein. When the gas outlet is used as a shock-absorbing mechanism, it is also possible to construct in such a manner that valve means that opens when the gas pressure reaches or exceeds the prescribed value is provided to prevent the gas from escaping when the air belt is being inflated.

The shock-absorbing mechanism comprises a gas outlet provided on the air belt, and a tear seam formed by seaming a part of said air belt and closing said gas outlet, wherein the tear seam is broken so that said air belt increase in volume and simultaneously said gas outlet is opened to allow the gas to escape when the internal pressure of the air belt reaches or exceeds a prescribed value.

In this arrangement, when the internal pressure of the inflated air belt is not more than the prescribed value, a part of the air belt is being seamed to form a tear seam and the vent hole is closed. When the internal pressure of the air belt reaches or exceeds a prescribed value, since the tear seam is torn to allow the air belt to increase in volume and simultaneously the vent hole is opened, the internal pressure of the air belt decreases with the increase of the volume of the air belt, and a gas is escaped through a vent hole to prevent the internal pressure of the air belt from excessively increasing.

The shock-absorbing mechanism may be means to limit deployment of the air belt when the internal pressure of the air belt is mot more than the prescribed value, and release the limitation and allow the air belt to increase in volume and decrease in internal pressure accordingly when the internal pressure of the air belt reaches or exceeds the prescribed value.

The passenger protecting apparatus including the seat belt apparatus may further comprise any one of the shock-absorbing mechanisms described above and a power transmission mechanism for connecting the air belt and the buckle or the lap anchor to transmit the power, when the passenger bumped against the seat belt to which a pretension is applied in advance by the buckle or the lap anchor being pulled down by the air belt shortened as a result of inflation thereof with a large kinetic energy, a large impactive force is applied to the buckle or the lap anchor in the pulling-up direction. The impactive force thus applied is transmitted to the air belt via said power transmission mechanism connecting the buckle or the lap anchor and the air belt, elongates the air belt longitudinally and simultaneously contracts the same circumferentially, thereby increasing the internal pressure of the air belt abruptly. In this case, when the internal pressure of the air belt reaches or exceeds a prescribed value, the shock-absorbing mechanism described above actuates to decrease the internal pressure or the air belt or to prevent an excessive increase of the internal pressure thereof so as to allow longitudinal elongation of the air belt with the suitable internal pressure of the air belt maintained.

Accordingly, the buckle or the lap anchor connected to the air belt can be moved in the pulling-up direction by the impactive force applied by the passenger with a suitable drag applied by the internal pressure of the air belt, thereby absorbing an impactive force applied by the passenger and an excessive kinetic energy of the passenger to protect the passenger.

The passenger protecting apparatus having a power transmission mechanism as described above preferably comprises an shock-absorbing mechanism that allows the buckle or the lap anchor to move upwardly while applying a drag to said buckle or the lap anchor when a upward force not less than a prescribed value is applied to the power transmission mechanism for transmitting a power from the air belt to said buckle or the lap anchor.

In this case, as an shock-absorbing mechanism, when the power transmission mechanism comprises, for example, a linear body that connects the air belt and the buckle or the lap anchor so that the power of the air belt is transmitted to the buckle or the lap anchor via the linear body. The power transmission mechanism may comprise a guiding member for guiding a linear body so as to allow the buckle or the lap anchor to move upward while applying a suitable drag by deformation or retraction of the guiding member, and when webbing is used as a linear body, it is also possible to provide a seamed portion by seaming a part of said webbing with another part thereof with a thread to shorten the length thereof, so that an impact is absorbed by increasing the length of the webbing by tearing the seamed portion to allow the upward movement of the buckle or the lap anchor.

In this passenger protecting apparatus, when the power transmission mechanism is constructed in such a manner that the power of the air belt is transmitted to the buckle or the lap anchor via the rotatable body as shown in FIG. 20, the shock-absorbing mechanism may be provided with a torsion bar as an axis of rotation of the rotatable body, so that an impact is absorbed by alleviating winding of the second linear body connected to said buckle or the lamp anchor by torsion of the torsion bar to allow the buckle or the lap anchor to move upward while applying a suitable drag thereto.

The shock-absorbing mechanism may comprise, as a power transmission mechanism, a first linear body connected to the air belt, a second linear body connected to said buckle or lap anchor, and a connecting member for connecting said first linear body and the second linear body, wherein deformation of said connecting member allows the buckle or the lap anchor to move upward while applying a suitable drag so as to absorb the impact, and when the power transmission mechanism is formed of a linear body provided between the buckle or the lap anchor and the air belt, there may be provided a connecting member connecting said linear body to said buckle or the lap anchor or the air belt at one end of the linear body, so that deformation of the connecting member allows the buckle or the lap anchor to move upward while applying a suitable drag, thereby absorbing the impact.

In the passenger protecting apparatus having such an shock-absorbing mechanism, the power transmission mechanism comprises a wire connected to said shock-absorbing mechanism at one end and engaged with said buckle or the lap anchor or the air belt at a midpoint for transmitting a power.

In the passenger protecting apparatus comprising said shock-absorbing mechanism, when the passenger bumped with a large impactive force against the seat belt applied with a pretension by the buckle or the lap anchor being pulled down, the impactive force is absorbed by said shock-absorbing mechanism and thus the passenger is protected.

In the passenger protecting apparatus of the present invention, the air belt is preferably extending diagonally along the fore-and-aft direction of the seat cushion.

In this case, the air belt may be oriented so that one end of the air belt is located at the front portion of one side of the seat cushion and the other end is located at the rear portion of the other side of the seat cushion for example, or the first and the second air belts are disposed in such a manner that one end of the respective first and second air belts are located at the midway of the front side of the seat cushion extending between the left and the right, the other end of the first air belt is located on the left side at the rear, and the other end of the second air belt is located on the right side at the rear of the seat cushion.

The end of the air belt disposed at the rear side of the seat cushion may be connected directly with at least one of the buckle and the lap anchor of said seat belt apparatus. In this arrangement, when the air belt is inflated and decreased in length, the end of the air belt connected to the buckle or the lap anchor is pulled toward said end of the air belt disposed on the front portion of the seat cushion, and the buckle or the lap anchor is directly pulled down by its shrinking force, thereby applying a pretension to the seat belt and minimizing the loss of transmission occurred when the shrinking force of the air belt is transmitted as a pulling down force of the buckle or the lap anchor.

In this case as well, there is preferably provided a raising means for raising the front portion of the seat cushion in case of emergency of the vehicle, and a power source is an air belt shared with the said lowering means. A force from the air belt is preferably transmitted to the driven member via a one-way clutch.

In an alternative embodiment, the passenger protecting apparatus of the present invention is a passenger protecting apparatus comprising a seat including a seat cushion and a seat back, and a hardening means for hardening the front portion of said seat cushion in case of emergency of the vehicle, wherein said hardening means is a bag body containing a magnetic fluid, and includes an energizing means for hardening said magnetic fluid by passing a current in said magnetic fluid.

In the passenger protecting means, the energizing means may pass a current in the magnetic fluid contained in said bag body located in the front portion of the seat in case of emergency such as a collision of the vehicle to harden the magnetic fluid. Accordingly, the front portion of the seat cushion is hardened, thereby preventing a submarine phenomenon of the passenger. When no current is passing through the magnetic fluid, the magnetic fluid freely flows in said bag body as a matter of course so that the passenger can sit on the seat without having a feeling of discomfort in the normal state other than the emergency state.

In the passenger protecting apparatus, the bag body is preferably disposed in said seat cushion and is prevented from moving downward, there may be provided a back-up member for preventing the downward movement of the bag body under the bag body.

When the back-up member is disposed under the bag body, a projection extending upward for positioning the bag body may be provided on the back-up member. In this case, the projection deforms when a pressure in excess of a prescribed value is applied to said projection by the bag body so that the forward movement of the bag body is permitted.

In this arrangement, in case of emergency of the vehicle, it is assured that the magnetic fluid contained in the bag body is hardened in the front portion of the seat cushion so that a submarine phenomenon of the passenger is prevented, and when the passenger bumped against the front portion of the seat cushion with an excess of impactive force, the bag body moves forward of the seat cushion while deforming the projection in accordance with the movement of the passenger and absorbs the impactive force.

In the passenger protecting apparatus, said bag body may be extended in the direction of the width of said seat cushion and connected to the structural member of said seat cushion at both ends thereof.

In another alternative embodiment, the passenger protecting apparatus of the present invention comprises a seat including a seat cushion and a seat back, and means for forming a sleeve wall on the side of said seat cushion in case of emergency of the vehicle, wherein said means comprises an air belt disposed so as to connect said seat cushion and the seat back, and said air belt decreases in length when the air belt is inflated, whereby said air belt is routed between the seat cushion and the seat back so as to form said sleeve wall.

In this case, said air belt may be disposed between the front end of the plate and the seat back so that the air belt forms a sleeve wall along the side of the seat when said air belt is inflated.

Said means is preferably disposed on the side portion of the seat cushion and on the side portion of the seat back, and provided with an upwardly rotatable plate on its front side, so that a rotating torque is applied to said plate by the length-reducing force of said air belt.

It is also possible to construct in such a manner that at least one of the members of the buckle and the lap anchor of the seat belt and said plate is interlocked so that at least one of said buckle and said lap anchor moves downwardly when said plate is rotated with the front end thereof moved upward.

In a further alternative embodiment, the passenger protecting apparatus of the present invention comprises an air belt, wherein said air belt is disposed on the lower portion of the back side of the seat so that it functions as a bag for protecting the lower half of the passenger's body including the knees sitting on the seat located in the rear of said seat.

In this case, it is also possible to construct in such a manner that at least one of the members of the buckle and the lap anchor of the seat belt and said air belt are interlocked, so that one of the members of said buckle and lap anchor moves downward when said air belt is inflated and the length thereof is reduced. In this case, the plate and said member are preferably interlocked via the one-way clutch so that the upward movement of said member is prevented by said one-way clutch.

In yet another alternative embodiment, the passenger protecting apparatus of the present invention comprises a seat having a seat cushion, seat back and a headrest, and means for moving said headrest frontward and diagonally upward in case of emergency of the vehicle, wherein said means comprises an air belt that is shortened when inflated as a power source for moving the headrest.

In the passenger protecting apparatus, the headrest supports the head of the passenger when the vehicle is bumped from the rear, so that an injury such as whiplash can be prevented.

In this case, the air belt is preferably disposed on the upper portion of the seat cushion so that the air belt is inflated so that the distance between the seat cushion and the passenger is reduced.

The passenger protecting apparatus of the present invention comprises an air belt for protecting the passenger sitting on the rear seat is routed between the left and right B pillar of the vehicle.

According to the passenger protecting apparatus as described above, the air belt can apply a pretension to the seat belt and prevents the passenger or the baggage on the rear seat from jumping forward when inflated.

In this case, the passenger protecting apparatus comprises a seat belt for protecting the passenger sitting on the seat, and said air belt can be provided so as to tow the shoulder anchor of said seat belt apparatus.

The passenger protecting apparatus of the present invention may comprises a metal plate that encloses said air belt when said air belt is not inflated, and expands as said air belt expands and contracts and deforms plastically when the external pressure is applied.

In the passenger protecting apparatus, a submarine phenomenon is prevented and the impact applied to the passenger is absorbed by plastic contraction and deformation of the expanded and deformed metal plate.

The passenger protecting apparatus of the present invention comprises a one-way clutch.

In this passenger protecting apparatus, decrease of tractive force of the air belt with decreasing of the expansive force thereof may be supplemented.

The passenger protecting apparatus of the present invention comprises a shock absorbing means elongating so that the upper limit of the tensile strength is maintained constant.

According to the passenger protecting apparatus as described above, the load applied to the passenger may be maintained constant.

In the passenger protecting apparatus of the present invention, a gas exhaust port of the inflator is preferably inserted into the air belt from one end thereof, and a flange member is preferably provided on the rear end of the inflator projecting from the air belt, and fixed on the side frame of the seat. In this arrangement, there is preferably provided a gas guide member for changing the direction of gas injected from the inflator into the direction longitudinally of the air belt on the tip side of the inflator.

According to the passenger protecting apparatus in this arrangement, since one end of the air belt is stable fixed to the side panel of the seat, and the other end of the air belt is positively attracted toward said one end when the length of the air belt is reduced upon inflation of the air belt, it is suitable as a power source for the lowering means for lowering the buckle and the lap anchor of said seat belt apparatus.

In this case, the other side of the air belt may be fixed on the other side frame.

In the passenger protecting apparatus of the present invention, the inflator may be fixed on the side frame of the seat and a tubular gas duct is provided so that a gas from said inflator to one end of the air belt, and a flange member is preferably provided on said gas duct and said flange member is fixed to the side frame of the seat.

In this arrangement, one end of the air belt is stably fixed to the side panel of the seat.

In the passenger protecting apparatus of the present invention, when the air belt used is wide in width, the air belt may be folded into a narrower width and stored in mesh webbing.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 50 is an explanatory drawing showing a third structural example of the power transmission mechanism comprising a shock-absorbing mechanism according to an embodiment of the present invention.

FIG. 56 is an explanatory drawing showing the sixth structural example of the power transmission mechanism comprising a shock-absorbing mechanism according to an embodiment of the invention.

FIG. 58 is an explanatory drawing showing another structure of the power transmission mechanism shown in FIG. 50.

FIG. 59 is an explanatory drawing showing still another structure of the power transmission mechanism shown in FIG. 50.

DETAILED DESCRIPTION

Figure 1:
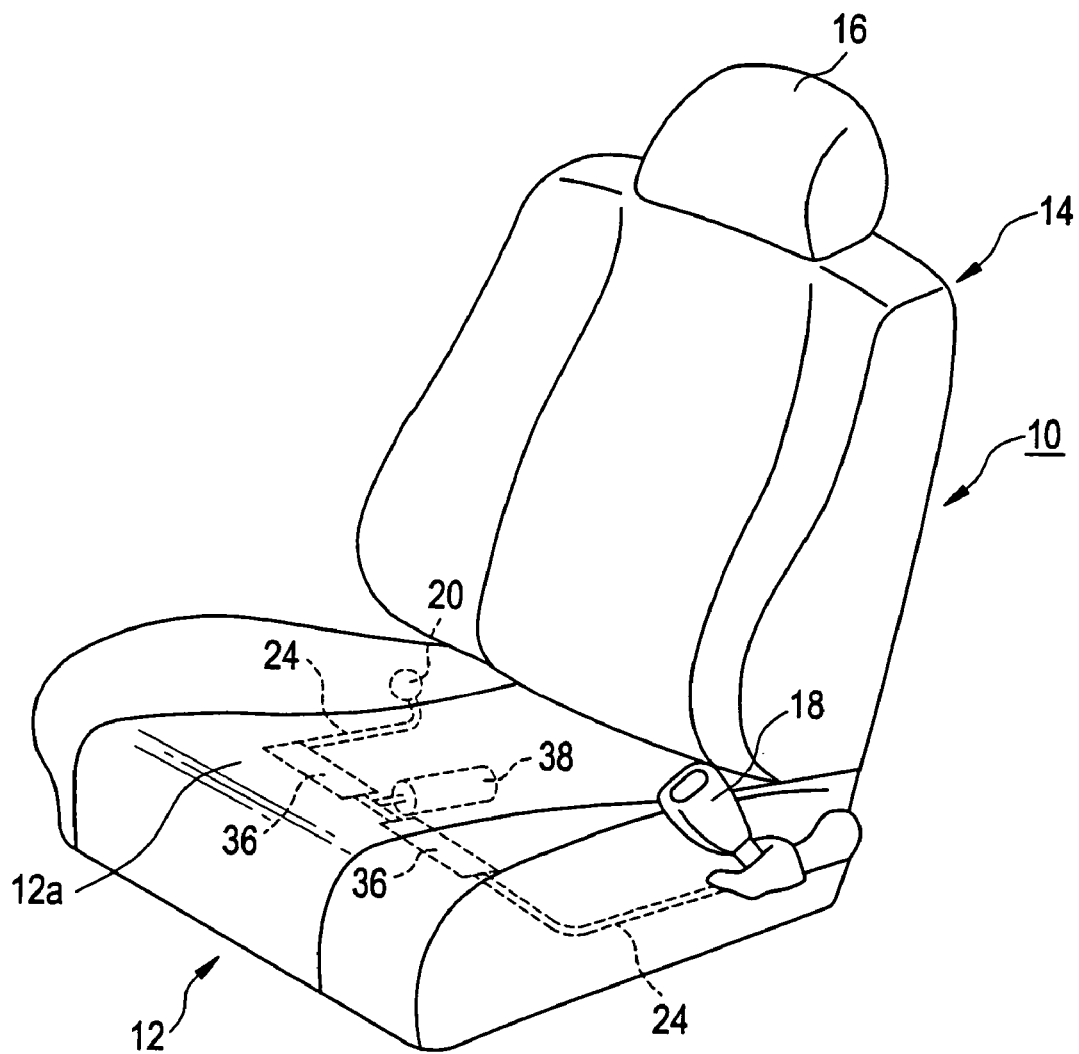
FIG. 1 is a perspective view of the seat showing an embodiment of the invention.
Figure 2:
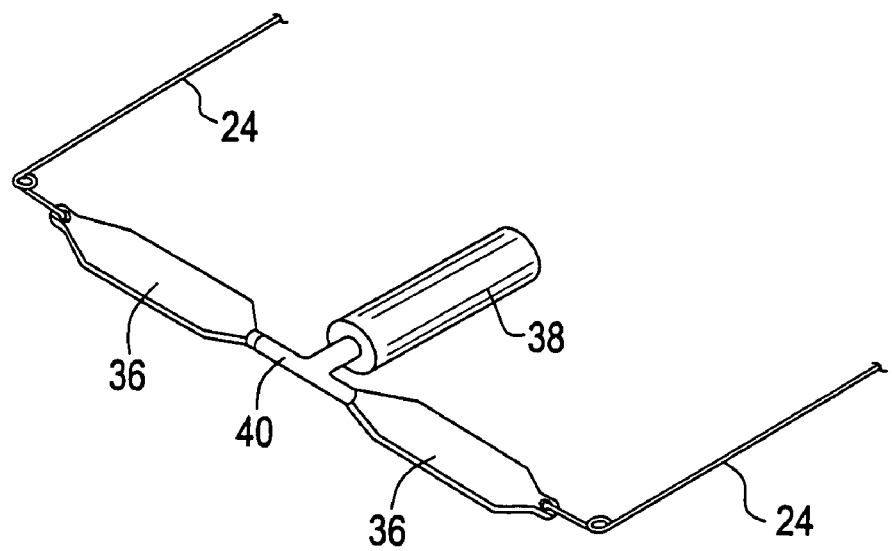
FIG. 2 is a perspective view of the air belt and the inflator shown in FIG. 1.
Figure 3:
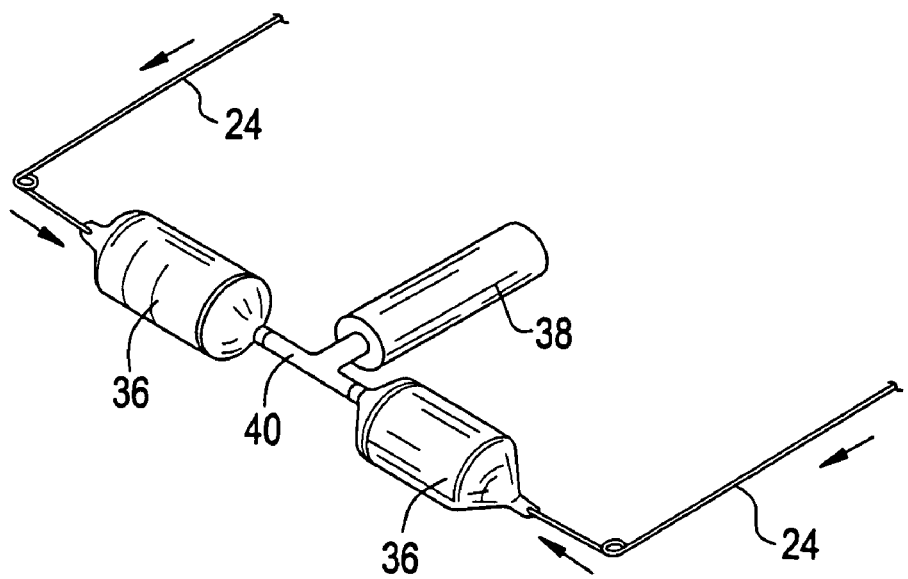
FIG. 3 is a perspective view of the air belt in the state where it is inflated in FIG. 1.
Figure 4:
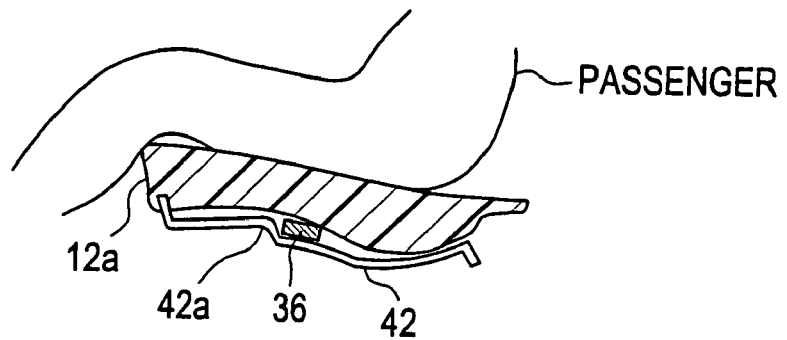
FIG. 4 is a schematic cross sectional view showing the structure of FIG. 1.

Although references are made below to directions, such as left, right, up, down, etc., in describing the drawings, they are made relative to the drawings (as normally viewed) for convenience. These directions are not intended to be taken literally or limit the present invention in any form.

Referring now to the drawings, the embodiments of the invention will be described. FIG. 6 to FIG. 9 show the passenger protecting apparatus according to an embodiment.

Figure 6:
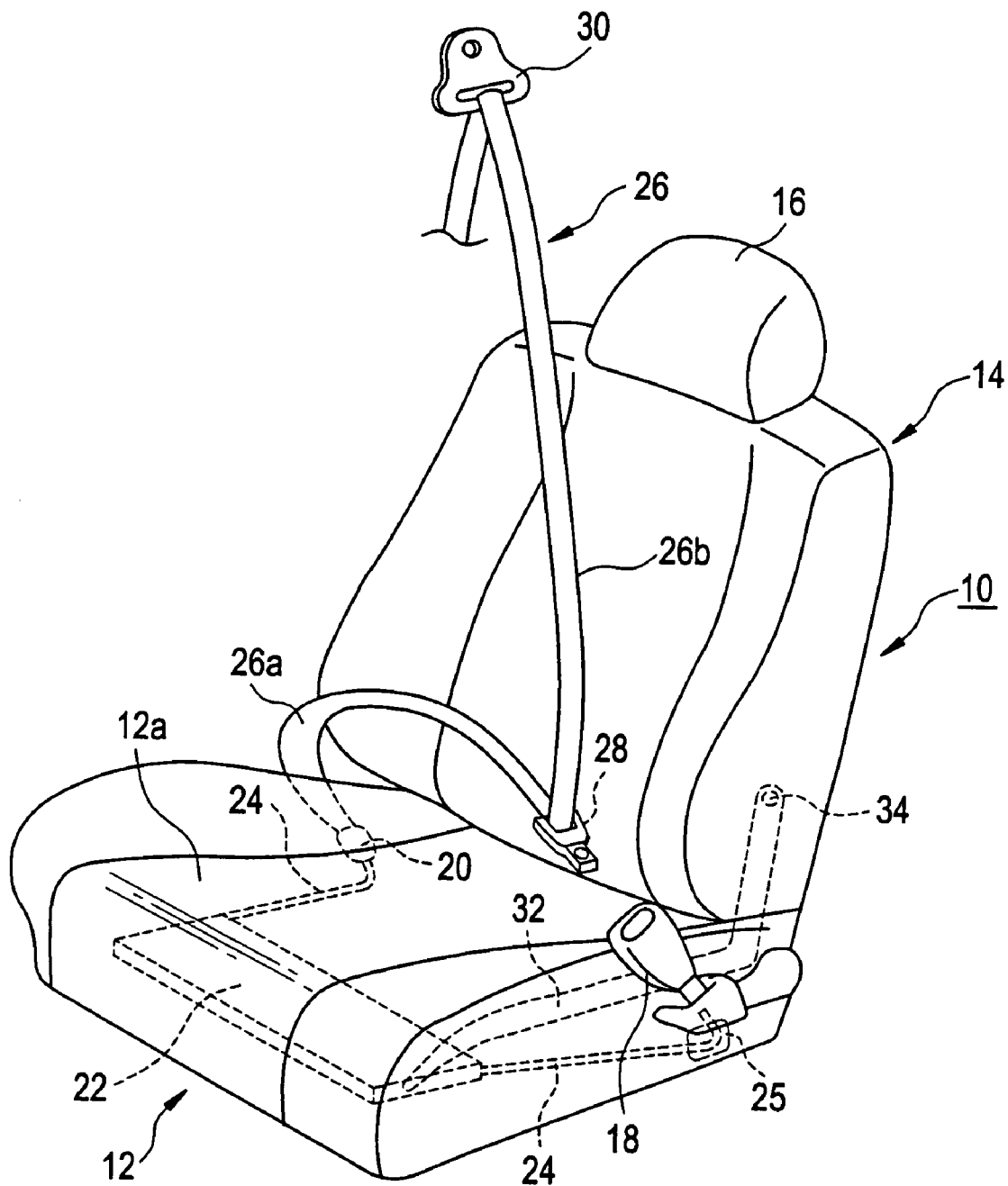
FIG. 6 is a perspective view of the seat according to another embodiment.

As shown in FIG. 6, the seat of the vehicle 10 comprises a seat cushion 12, a seat back 14 and a headrest 16. On the left and right side surfaces of the seat cushion 12, the buckle 18 and the lap anchor 20 are disposed so as to move in the vertical direction.

The seat cushion 12 comprises a base plate constituting the bottom plate portion of said seat, a seat pad 12a mounted on said base plate, and a submarine phenomenon preventing plate 22 rotatably mounted via a shaft 22a fixed to the front end portion of said base plate about the midsection between the left and right sides thereof. A submarine preventing plate 22 is constructed in such a manner that the front-end side rotates upward and the rear end side is rotates downward.

The rear ends on the left and right sides of said submarine phenomenon preventing plate 22 are connected to said buckle 18 and said lap anchor 20 respectively. The wires 24 extend along the left and right sides of the seat cushion 12 in the fore-and-aft direction. The wire 24 is provided with a one-way clutch 25 that only allows the movement toward the front of the seat and prevents the movement toward the rear of the seat. In this case, it is also possible to employ various linkages other than the wire 24 to obtain the same movement.

The tip portion of the lap belt 26a of the seat belt webbing 26 is connected to the lap anchor 20. The tongue 28 through which the webbing 26 is passed is attachable to the buckle 18. The shoulder webbing 26b is passed through the shoulder anchor 30 provided on the B pillar 30 and windably and unwindably connected to the retractor (not shown).

On the left and right sides of the seat is provided with an air belt 32. The air belt 32 comprises an inflatable tube (not shown) formed of an airtight bag body of an elongated belt shape in plan view, and a mesh webbing (not shown) covering on said inflatable tube.

The inflatable tube comprises a gas inlet (not shown) and is connected to the inflator as a gas source, not shown, via said gas inlet. The inflator is actuated upon collision of the vehicle and supplies a gas to said inflatable tube to inflate the inflatable tube. The mesh webbing is formed of a cylindrical woven material, and expandable in the circumferential direction and longitudinally shrinkable with this circumferential expansion, so as to be decreased in length.

The inflator tube is covered by the mesh webbing so as not to be crawled out therefrom, and when the inflatable tube is inflated by gas injecting action of the inflator, the mesh webbing expands in the circumferential direction and shrinks longitudinally in association with expansion of the inflator tube, so that the ends of the inflatable tube are attracted toward each other. Therefore, when the inflator is actuated and injected a gas upon collision, the air belt 32 expands in the circumferential direction by inflation of the inflatable tube and the mash webbing shrinks longitudinally, and thus the distance between the ends of the air belt 32 decreases so as to decrease in length.

Figure 7:
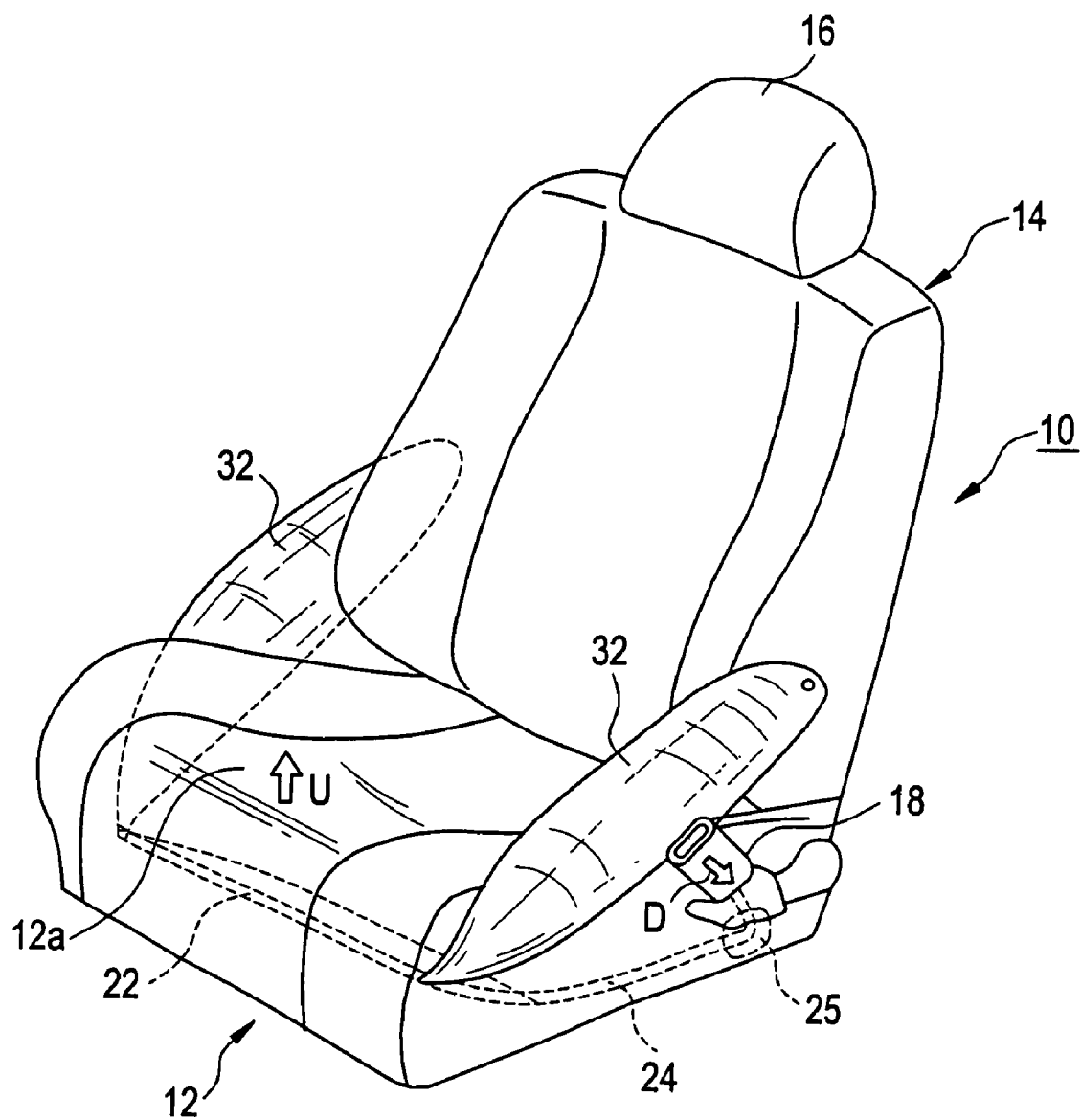
FIG. 7 is a perspective view of the air belt when inflated in FIG. 6.
Figure 8:
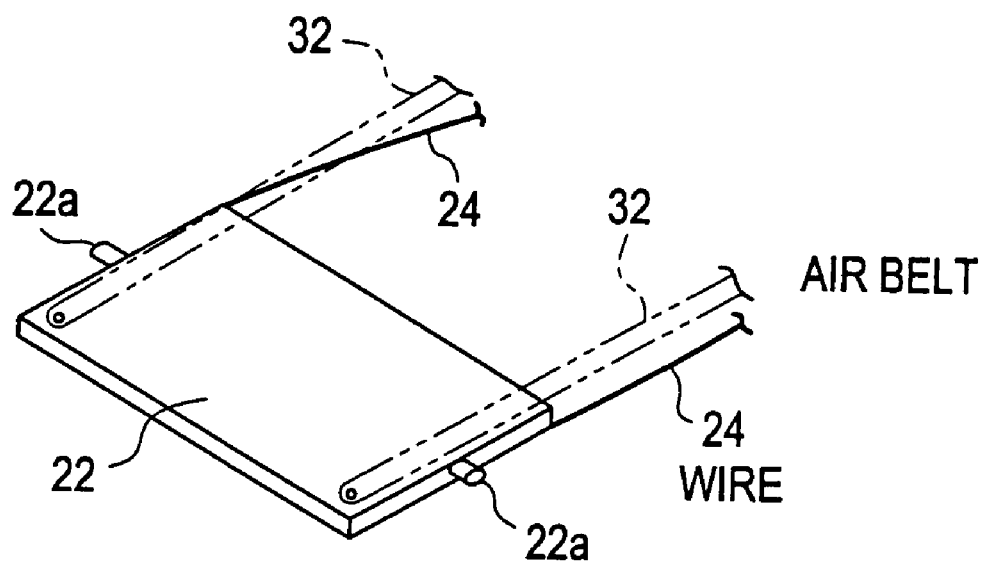
FIG. 8 is a perspective view showing the structure of a submarine phenomenon preventing plate shown in FIG. 6.
Figure 9:
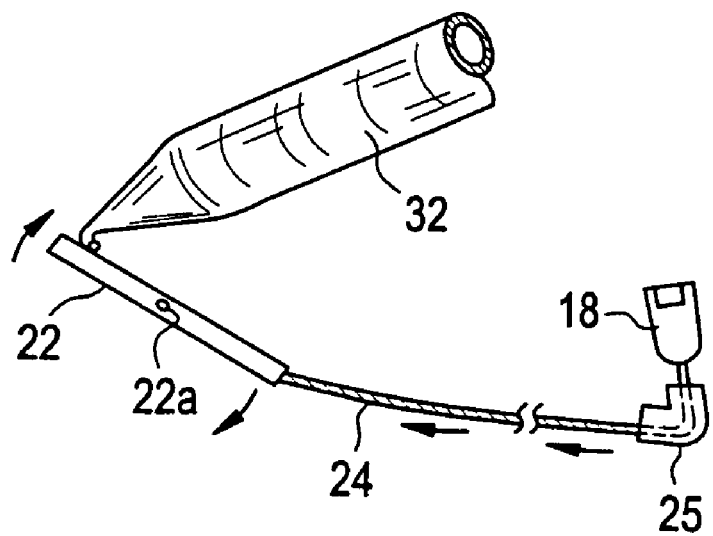
FIG. 9 is a side view when a submarine phenomenon preventing plate shown in FIG. 6 when being inclined.
Figure 10:
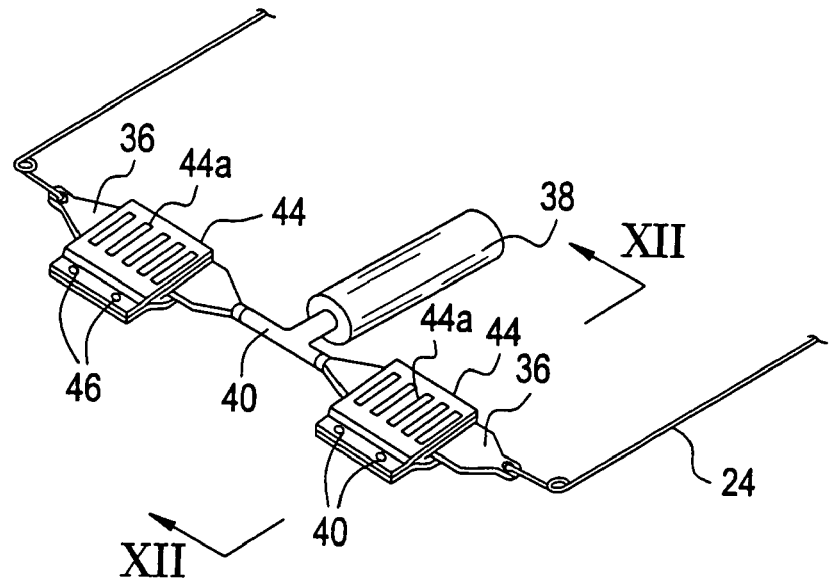
FIG. 10 is a perspective view of the air belt and the inflator showing another embodiment.
Figure 11:
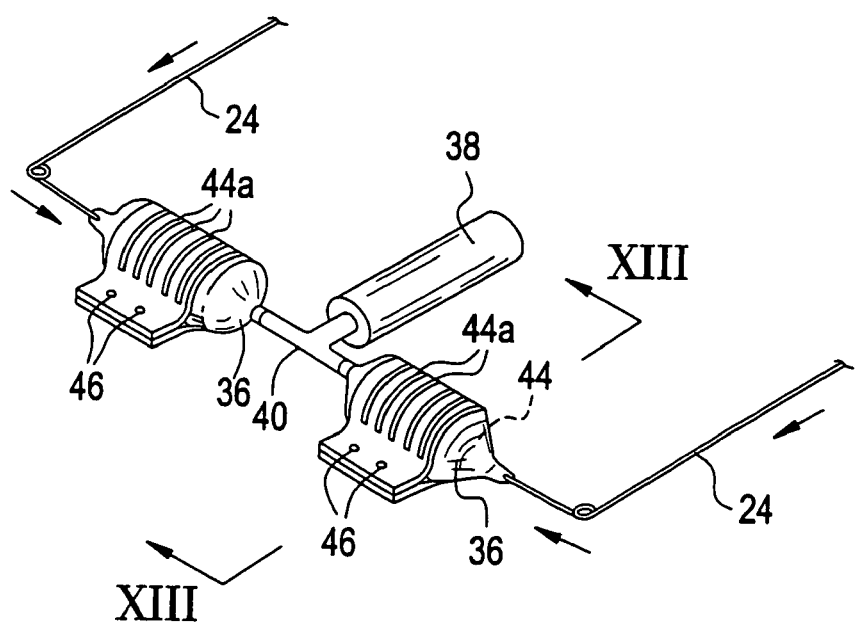
FIG. 11 is a perspective view of the air belt of FIG. 10 when inflated.
Figure 12:
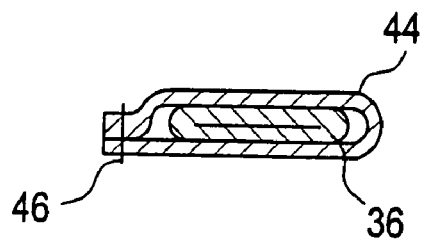
FIG. 12 is a cross sectional view taken along the line XII—XII in FIG. 10.
Figure 13:
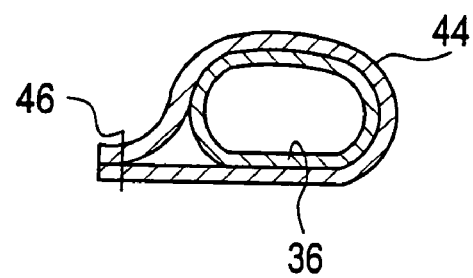
FIG. 13 is a cross sectional view taken along the line XIII—XIII in FIG. 11.

The front side of the air belt 32 is fixed to the front end of said submarine phenomenon preventing plate 22. The rear end of the air belt 32 is fixed to the side surface portion of the seat back at the mid point in the vertical direction by a fitting 34. Each air belt 32 is normally covered by a cover. When the air belts 32 are inflated by a gas from the inflator, said covers are torn and said air belts 32 form sleeve walls extending diagonally on the left and right sides of the seat cushion 12 as shown in FIG. 7. The inflator is installed for example in the seat back 14.

Upon collision of the vehicle, the inflator is actuated and the air belts 32 are inflated as shown in FIG. 7 to form sleeve wall portions as described above, the length of the air belts 32 are shortened in association with the expansion thereof. Accordingly, the front end of a submarine phenomenon preventing plate 22 is pulled up by said air belt 32, and thus the front end of the seat pad 12a is pushed up upwardly as shown by an arrow U. Therefore, a submarine phenomenon of the passenger may be prevented.

When said plate 22 rotates, the rear end of the plate 22 is lowered and the wire 24 is pulled forward. Accordingly, the buckle 18 and the lap anchor 20 are pulled down downwardly (in the direction shown by an arrow D) respectively and a tensile strength (pretension) is applied to the webbing 26, so that said webbing 26 comes into intimate contact with the passenger.

According to the passenger protecting apparatus of this embodiment, when the vehicle collides from the front or from the diagonal direction, the front end of the seat pad 12a is pushed up to protect a submarine phenomenon, and the air belts 32 form sleeve walls to restrain the passenger from the left and right sides. The webbing 26 is applied with a pretension so that the passenger is stably fixed on the seat by the webbing 26.

Said one-way clutch 25 holds the buckle 18 and the lap anchor 20 in the lowered state even after the air belt 32 is deflated. The one-way clutch may be constructed in such a manner that the wire is advanced little by little to absorb the impact for the passenger.

The structure of the air belt 32 is not limited to the structure described above, but the structure in which the mesh webbing is eliminated and the inflatable tube itself can shrink longitudinally in association with the inflation thereof in the circumferential direction is also applicable. The air belt 32 can be inflated also at the time of a side crash.

In this embodiment, since both of the buckle 18 and the anchor 20 are pulled down, it is also possible to pull down one of these only.

FIGS. 1 to 5 show the passenger protecting apparatus according to another embodiment of the present invention.

In this embodiment, the air belts 36 are mounted in the center or the lower portion of the front portion of the seat pad 12a so as to extend in the direction of width between the left and the right. The air belt 36 has a same structure as the air belt 32 of the embodiment described above, and so constructed that it is inflated in the circumferential direction by a gas from the inflator and decreases in length upon collision of the vehicle. In this embodiment, there are two air belts 36 are provided and each supplied with a gas from a common inflator 38. The side of each air belt 36 located at the center of the seat width is fixed to the duct 40 for introduction of a gas. The side of each air belt 36 located at the outside of the seat width is connected with the front end of the wired 24. The rear end of the wire 24 is connected to the buckle 18 and the lap anchor 20 via a one-way clutch.

The air belt 36 is mounted on the base plate 42 of the seat, and the base plate 42 prevents the air belt 36 from moving downward when inflated. The base plate 42 is formed with a projection 42a extending widthway along the front edge of the air belt 36, which limits the mounting position of the air belt 36 and prevents the air belt 36 from moving forward. In addition, the projection 42a is constructed in such a manner that when a pressing force not less than a prescribed value is applied to the projection 42a, the projection 42a deforms accordingly and allows the air belt 36 to move forward.

Figure 5A:
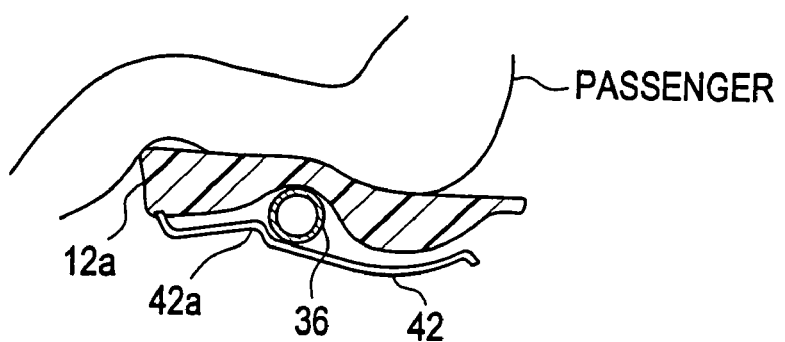
FIG. 5 is a cross sectional view of the air belt shown in FIG. 4, when inflated.
Figure 5B:
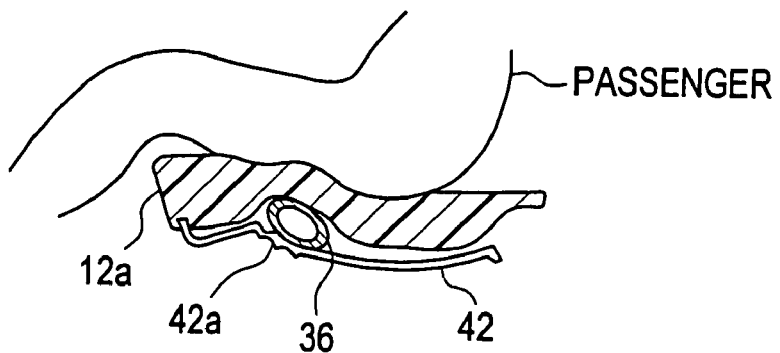

In case of collision of the vehicle, the inflator 38 is actuated to supply a gas to the air belt 36, and thus the air belt 36 is inflated and decreases in length. Since the air belt 36 is supported by the base plate 42 from below, the seat cushion 12a is pushed up or the portion of the seat cushion 12a being abutted against the air belt 36 is hardened by being pressed and compressed from below when the air belt 36 is inflated as shown in FIG. 5(a), and supported by the air belt 36 that is prevented from moving forward by the projection 42a, whereby the passenger is supported stably and thus a submarine phenomenon of the passenger is prevented. In this case, when the passenger bumped against the seat cushion 12a with an excessive impactive force, the large impactive force is transmitted to the air belt 36 via the seat cushion 12a and the air belt 36 presses the projection 42a forward with a pressing force in excess of a prescribed value. As a consequent, the projection 42a deforms in response to this pressing force and allows the air belt 36 to move forward, and then the air belt 36 moves forward while making the projection 42a flat along with the movement of the passenger, and absorbs the impactive force applied by the passenger.

In this embodiment, since the buckle 18 and the lap anchor 20 are pulled down via wires 24 due to decrease in length of the air belt 36, and a pretension is applied to the seat belt webbing, the webbing comes into intimate contact with the passenger so that the passenger is stably restrained on the seat.

Figure 22:
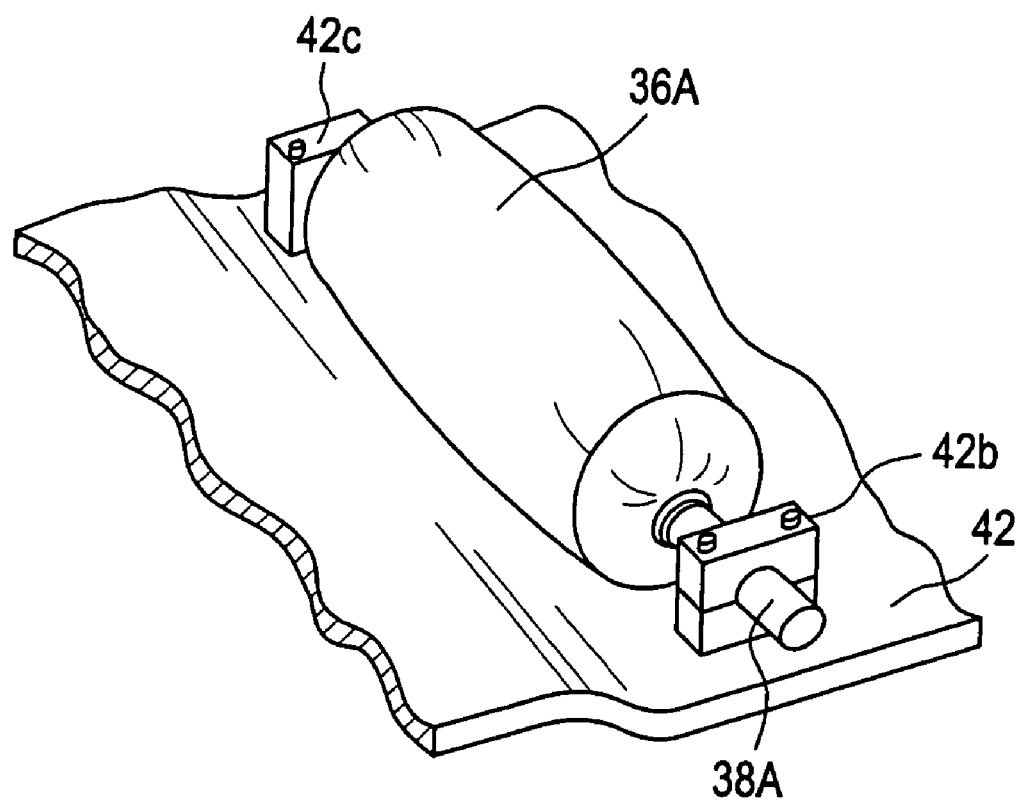
FIG. 22 is a perspective view of the principal portion of a passenger protecting apparatus of another structure according to the present invention.

Though the air belt 36 is mounted on the base plate 42 and the mounting position thereof is limited by the projection 42a in this embodiment, it is not limited thereto, but as the air belt 36A shown in FIG. 22, the air belt may be mounted in such a manner that the both ends thereof is supported by the anchors 42b, 42c provided on the base plate 42. FIG. 22 is a perspective view of the principal portion of the base plate portion of the passenger protecting apparatus having the air belt 36A, and the structure of the passenger protecting apparatus other than that the air belt 36A is mounted on the base plate via the anchors 42b, 42c is identical to the passenger protecting apparatus of the embodiment described above, and identical numerals and signs designates identical components.

The air belt 36A shown in FIG. 22 is disposed between the base plate 42 and the seat cushion 12a (not shown) so as to extend along the width between the left and the right of the base plate 42 in the vicinity of the mid section of the front portion of the base plate 42. Both shorter ends of the air belt 26A are supported by a pair of anchors 42b, 42c extending upward from the base plate 42, and are prevented from moving downward and in the fore-and-aft direction with respect to the seat. At a shorter end of the air belt 36A, there is provided a gas inlet (not shown) for introducing a gas from the inflator 38A described later.

In this embodiment, a generally cylindrical inflator 38A having a gas exhaust port (not shown) at one end is used as a gas source for inflating the air belt. The end of the inflator 38A having a gas exhaust port is inserted into the air belt 36A through said gas inlet so that the gas exhaust port is disposed within the air belt 36A, and the peripheral edge of said gas inlet of the air belt 36A fitted on the inflator 38A is connected directly with the air belt 36A so as not to be separated due to the pressure of the injected gas by being tightened by the band (not shown) or the like (hereinafter, the direct connection between the inflator and the air belt may be referred to as "direct-coupling"). Said end of the inflator 38A is provided with a gas guide member (not shown) for changing the direction of the gas flow injected from the gas exhaust port into the direction longitudinally of the air belt 36A.

The anchor 42b supports said one end of the air belt 38A indirectly by holding and fixing the inflator 38A.

In the passenger protecting apparatus having the air belt 36A supported at both ends by the anchors 42b, 42c, the inflator 38A is actuated and injects a gas to inflate the air belt 36A in case of emergency such as a collision of the vehicle. Since the air belt 36A is prevented from moving downward and in the fore-and-aft direction by the anchors 42b, 42c, the seat cushion 12a is pushed up by the inflation of the air belt 36A or the portion of the seat cushion 12a abutting against the air belt 36A is hardened by being pressed and compressed from below when the air belt is inflated, whereby the passenger is supported stably and thus a submarine phenomenon of the passenger is prevented.

FIGS. 10 to 13 show an embodiment in which the air belt 36 of the embodiment shown in FIGS. 1 to 5 is enclosed by a metal plate 44. The metal plate 44 is folded into halves, and the air belt 36 is interposed therebetween, and then fixed to the base plate 42 by a fittings 46 such as bolts, screws, rivets, or the like.

When the air belt 36 is inflated, said metal plate 44 is plastically deformed and expanded (widened) together with the air belt 36 and pushes up the seat cushion 12a, or compresses and hardens the portion of the seat cushion 12a in contact with the air belt 36 (metal plate 44). In this case, the air belt 36 is prevented from moving downward by the base plate 42 via the lower leaf of the plate 44.

Though the metal plate 44 is apt to maintain the expanded shape even after the air belt 36 is deflated, when a pressing force is applied from the passenger, it is plastically contracted and deformed gradually, and this plastic deformation serves to absorb the impact energy applied by the passenger.

Expansion, and thus decrease in length of the air belt 36 pulls the buckle 18 and the lap anchor 20 downward to apply a pretension to the webbing.

In this embodiment, though the plate 44 is formed with a slit 44a to promote the plastic deformation of the plate 44, the slit 44a may be omitted.

Figure 14:
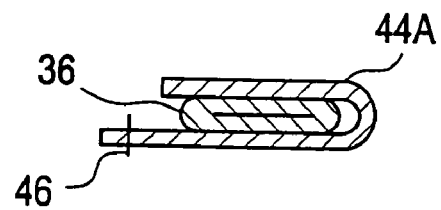
FIG. 14 is a cross sectional view of the portion shown in FIG. 12 showing another configuration of the metal plate.
Figure 15:
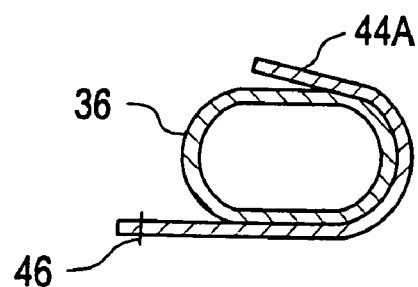
FIG. 15 is a cross sectional view of the air belt shown in FIG. 14 when inflated.

In FIGS. 10 to 13, though the upper and lower leaves of the plate 44 having the air belt 36 interposed therebetween are fixed to the base plate by bolts 46 or the like, it is also possible to fix only the lower leaf to the base plate by bolts or the like as the plate 44A shown in FIGS. 14 and 15.

In the embodiment described above, the air belt is disposed so as to extend along the width between the left and the right at the mid section of or under the front portion of the seat the seat cushion, and one end thereof is connected to at least one of the buckle and the lamp anchor of the seat belt apparatus via the wire or the like, the arrangement of the seat belt is not limited thereto, but the air belt may be arranged diagonally in the fore-and-aft direction of the seat cushion.

Figure 23:
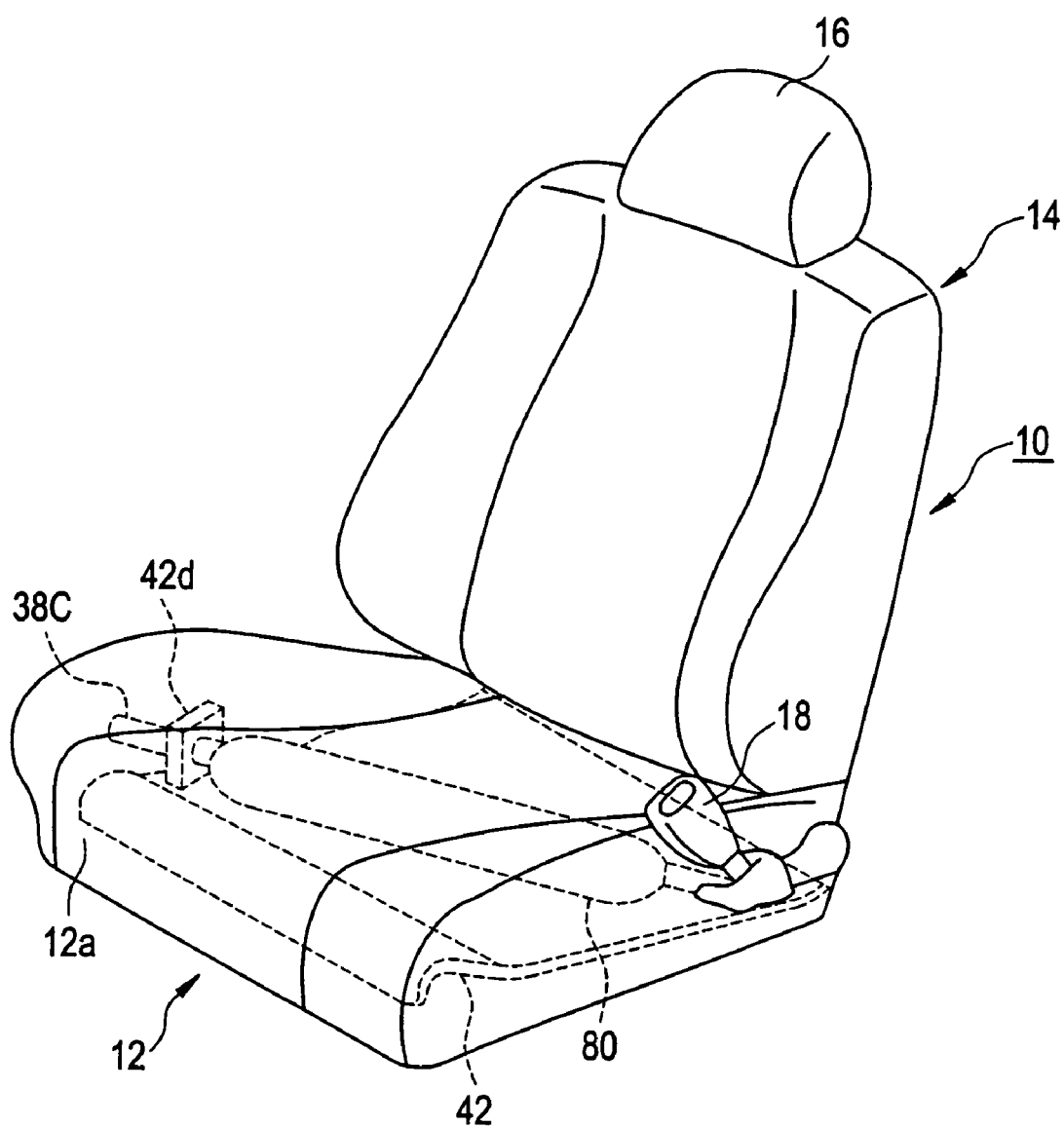
FIG. 23 is a perspective view of the seat according to the passenger protecting apparatus for the passenger protecting apparatus of the present invention.
Figure 24:
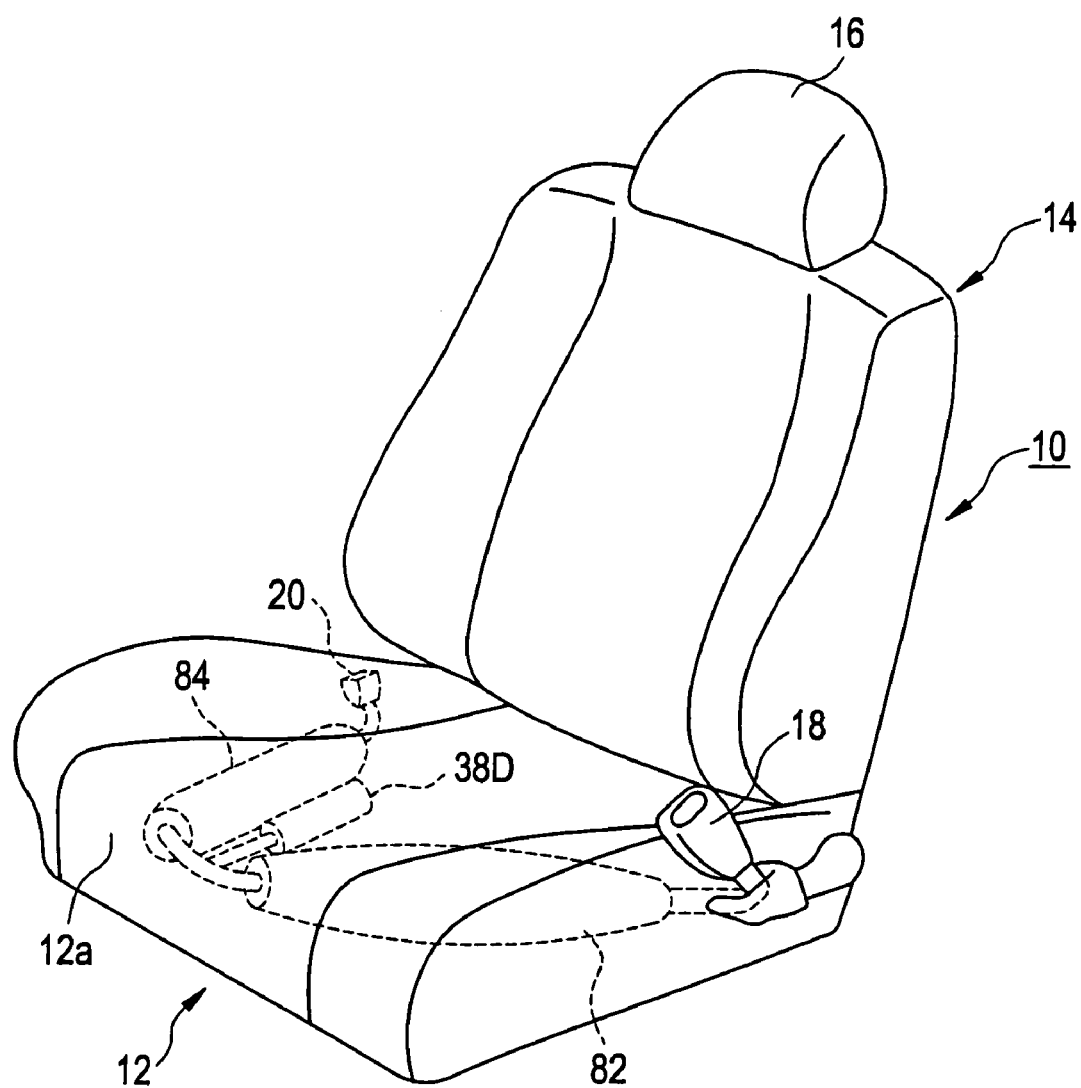
FIG. 24 is a perspective view of the seat according to still another embodiment for the passenger protecting apparatus of the present invention.

FIGS. 23 and 24 are perspective views showing structures of the passenger protecting apparatuses each having an air belt or air belts arranged in different ways.

According to the passenger protecting apparatus shown in FIG. 23, there is provided an air belt 80 of which a shorter end is located at the front portion of the seat cushion 12a on one side, and of which the other end is located at the rear portion of the other side of the seat cushion 12a.

There is provided a gas inlet (not shown) at said one end of the air belt 80, and said gas inlet is direct-coupled with the gas exhaust port (not shown) located at one end of the cylindrical inflator 38C as in the case of the air belt 36A described above. The inflator 38C is held by the anchor 42d extending from the base plate 42, whereby said one end of the air belt 80 is engaged and fixed between the base plate 42 and the front portion of said one side of the seat cushion 12a.

The other end of the air belt 80 is connected to any one of the buckle 18 and the lap anchor 20 disposed on the sides of the seat cushion 12a so as to be movable in the vertical direction (in this embodiment, the other side of the air belt 80 is connected to the buckle 18 and said one side is disposed and fixed to the front portion of the side of the seat cushion 12a where the lap belt 20 resides.). The air belt 80 is inflated circumferentially by a gas from the inflator and decreased in length as in the case of the air belts in the embodiments described above.

The passenger protecting apparatus in this arrangement, the inflator 38C is actuated and injects a gas, and the air belt 80 is inflated and decreased in length. In this case, since said one end of the air belt 80 is fixed to the front portion of said one side of the seat cushion 12a, the other end of the air belt 80 connected to the buckle 18 movable in vertical direction is attracted to said one end thereof and accordingly the buckle 18 is pulled down, then a pretension is applied to the seat belt webbing, and thus the webbing comes into intimate contact with the passenger so that the passenger is restrained stably on the seat. When the air belt 80 is inflated and the other end thereof is attracted toward said one end or the front portion of the seat cushion 12a, the front portion of the seat cushion 12a is pushed up or the portion of the seat cushion 12a being abutted against the air belt 80 is hardened by being pressed and compressed from below, so that a submarine phenomenon of the passenger is prevented. In this embodiment, though the other end of the air belt 80 is connected to the buckle 18, it is also possible to connect the other end of the air belt 80 to the lap anchor 20 located on the side of the seat cushion 12a opposite from the buckle 18 so as to be movable in the vertical direction, and to dispose and fix said one end of the air belt 80 to the front portion of the side of the seat cushion 12a where the buckle 18 resides.

In the passenger protecting apparatus as shown in FIG. 24, a first air belt 82 and a second air belt 84 having respectively the same structure as the air belt 80 described above and being inflated by a gas from the inflator and decreased in length are disposed, and one end of each air belt 82, 84 is located in the front portion of the seat cushion 12a at the mid section of the width between the left and the right. The other end of the first air belt 82 is located at the rear portion of one side of the seat cushion 12a and the other end of the second air belt 84 is located at the rear portion of the other side of the seat cushion 12a. The other end of each air belt 82, 84 is connected to the buckle 18 and the lap anchor 20 disposed on the right and left side of the seat cushion 12a so as to be movable in the vertical direction.

The air belts 82, 84 have gas inlets (not shown) respectively at one end, and both gas inlets are connected to a common inflator 38D, which supplies a gas to each air belt 82 and 84. The one end of each air belt 82, 84 are fixed under the front portion of the seat cushion 12a at the central portion of the width between the left and the right.

In the passenger protecting apparatus in this arrangement, when the inflator 38D is actuated and injects a gas upon collision of the vehicle, the air belts 82, 84 are inflated and decrease in length. At this time, since said one end of each air belt 82, 84 is fixed to the front portion of the seat cushion 12a, the other ends connected respectively to the buckle 18 and the lap anchor 20 are attracted toward said one end or the front portion of the seat cushion 12a. Accordingly, in the passenger protecting apparatus shown in FIG. 24 as well, the buckle 18 and the lap anchor 20 are pulled down, then a pretension is applied to the seat belt webbing, and thus the passenger is restrained stably on the seat, and the front portion of the seat cushion 12a is pushed up or the portion of the seat cushion 12a being abutted against these air belts 82, 84 is hardened by being pressed and compressed from below, so that a submarine phenomenon of the passenger is prevented.

In this embodiment, one end of the air belt is fixed to the front portion of the seat cushion 12a and the other end is directly connected to the buckle 18 or the lap anchor 20 disposed at the rear portion of the right and left sides of the seat cushion 12a so as to be movable in the vertical direction, and the connecting means between the air belt and the buckle 18 or the lap anchor 20 using a wire or the like as described above is eliminated and thus the structure is more simple and the loss of the pulling-down force transmitted when the buckle 18 or the lap anchor 20 is pulling down may be reduced.

Figure 25:
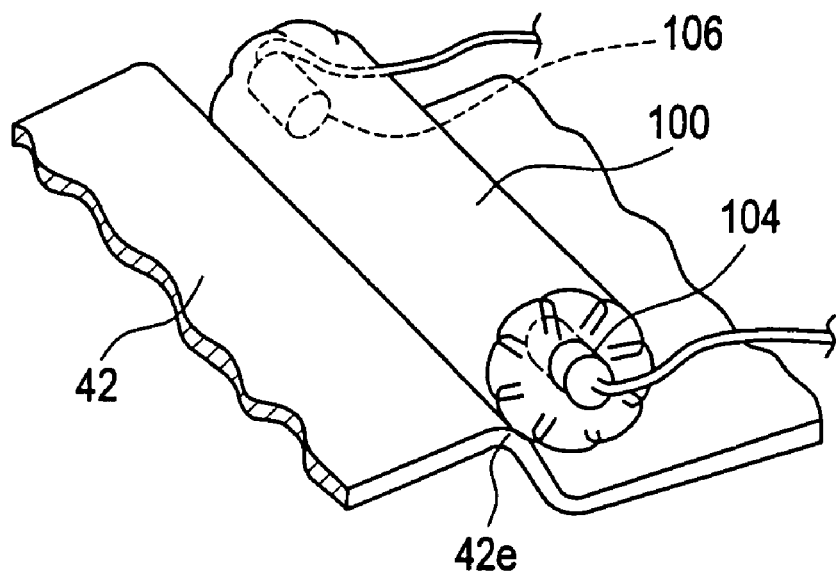
FIG. 25 is a perspective view of the principal portion of the passenger protecting apparatus according to another embodiment of the present invention.
Figure 26:
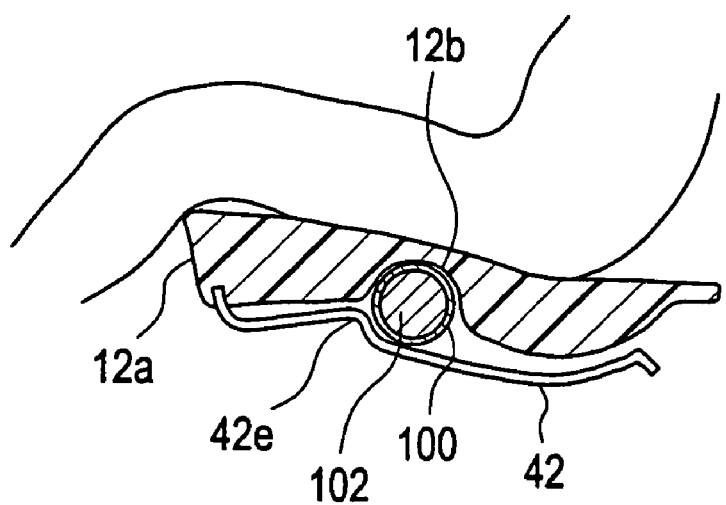
FIG. 26 is a schematic cross sectional view showing a structure of the passenger protecting apparatus shown in FIG. 25.

In the embodiments described above, though the front portion of the seat cushion 12a is compressed and hardened from below by inflating the air belt so that a submarine phenomenon of the passenger is prevented, means to harden the front portion of the seat cushion 12a is not limited thereto. Referring now to FIGS. 25, 26, the passenger protecting apparatus according to another embodiment of the present invention will be described.

FIG. 25 is a perspective view of the principal portion of the passenger protecting apparatus according to another embodiment of the present invention, and FIG. 26 is a schematic cross sectional view showing the structure of the passenger protecting apparatus.

The passenger protecting apparatus shown in FIG. 25 and FIG. 26 comprises a bag body 100 containing a magnetic fluid 102 that is solidified by magnetically joined together by passing a current therethrough. The bag body 100 is generally cylindrical in appearance formed of a flexibly deformable cloth or a resin sheet. The bag body 100 is provided on both ends thereof with a pair of electrodes 104, 106 for passing a current through the magnetic fluid 102. These electrodes 104, 106 are connected to the current generating apparatus, not shown, so that in case of a collision of the vehicle, the current generating apparatus is actuates and supply a current through the magnetic fluid 102.

The bag body 100 is mounted on the base plate 42 so as to extend longitudinally in the direction of the width of the seat between the left and the right under the front portion of the seat cushion 12a. The bag body 100 is prevented form being moved downward when inflated by the base plate 42. The base plate 42 is formed with a projection 42e extending in the direction of the width of the base plate 42 along the front edge portion of the bag body 100, so that the projection 42e limits the mounting position of the bag body 100 and prevents the bag body 100 from moving forward. When a pressing force not less than a prescribed value is applied, the projection 42e deforms accordingly and allows the bag body 100 to move forward.

The lower surface of the seat cushion 12a is formed with a recess 12b facing downward for accommodating the upper half of the bag body 100. The seat cushion 12a is very thin at the portion over the recess 12b, and when the bag body 100 is placed in the recess 12b, the upper surface of the seat cushion 12a and the upper end surface of the bag body 100 comes close so that the bag body 100 substantially supports the passenger in the vicinity of the recess 12b.

In the passenger protecting apparatus in this arrangement, the current generating apparatus not shown described above is actuated and flow a current through the magnetic fluid 102 to solidify the bag body 100 upon collision of the vehicle so as to support the passenger and prevents a submarine phenomenon of the passenger. In this embodiment as well, when the passenger bumped against the bag body 100 with an excess of impactive force, the bag body 100 presses the projection 42a at a pressing force not less than a prescribed value. As a consequent, it moves forward while deforming the projection 42e and absorbs the impactive force applied by the passenger.

In this embodiment, since the bag body 100 is mounted on the base plate 42 and is prevented from moving downward and forward of the seat by the projection 42e provided on the front end thereof, the method of mounting the bag body 100 is not limited thereto, but it is also possible to mount the bag body by supporting both ends of the bag body 100 with the anchors or the like extending from the base plate 42 so as not to move downward and fore-and-aft direction of the seat.

Figure 16:
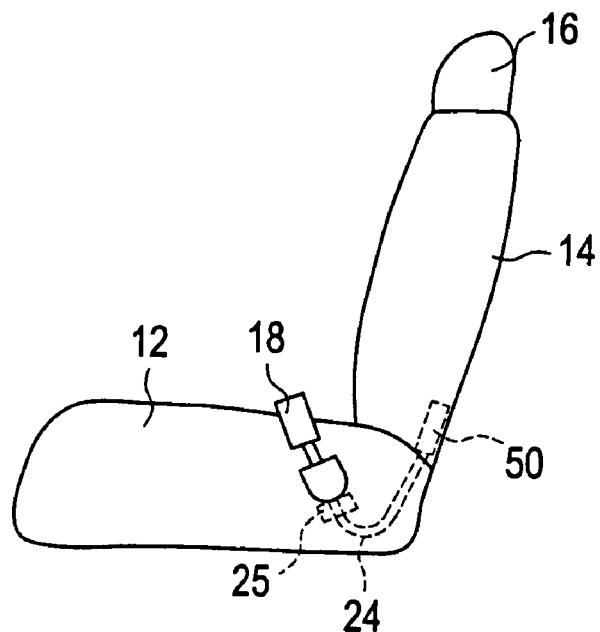
FIG. 16 is a side view of the seat showing the forth embodiment.
Figure 17:
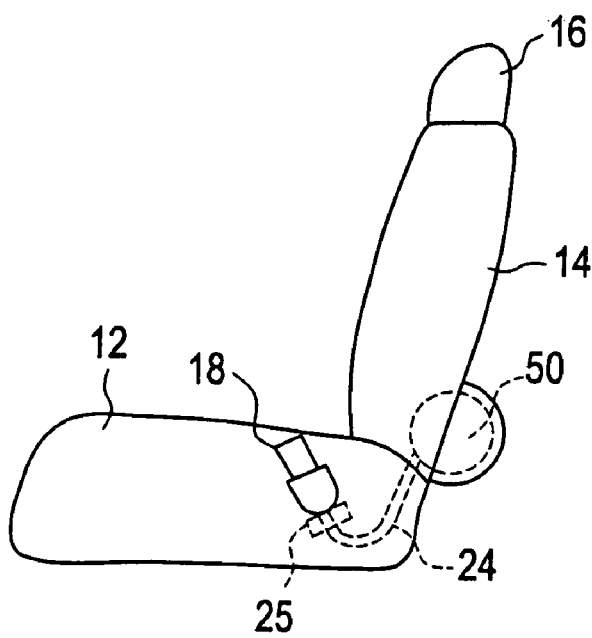
FIG. 17 is a side view showing an air belt shown in FIG. 16 when inflated.

FIGS. 16, 17 are drawings showing still another embodiment, in which an air belt 50 extends in the direction of the width of the seat along the back surface of the seat back 14. The ends of the air belt 50 are connected to the buckle 18 and the lap anchor 20 via wires 24.

When the inflator, not shown, is actuated upon collision of the vehicle and the air belt 50 is inflated, the length of the air belt 50 in the left and right direction is shortened, then the buckle 18 and the lap anchor 20 are pulled down via wires 24, and a pretension is applied to the webbing. The air belt 50 swells out from the back surface of the seat back 14. Accordingly, the lower half including knees of the passenger's body sitting on the rear seat is protected.

Figure 18:
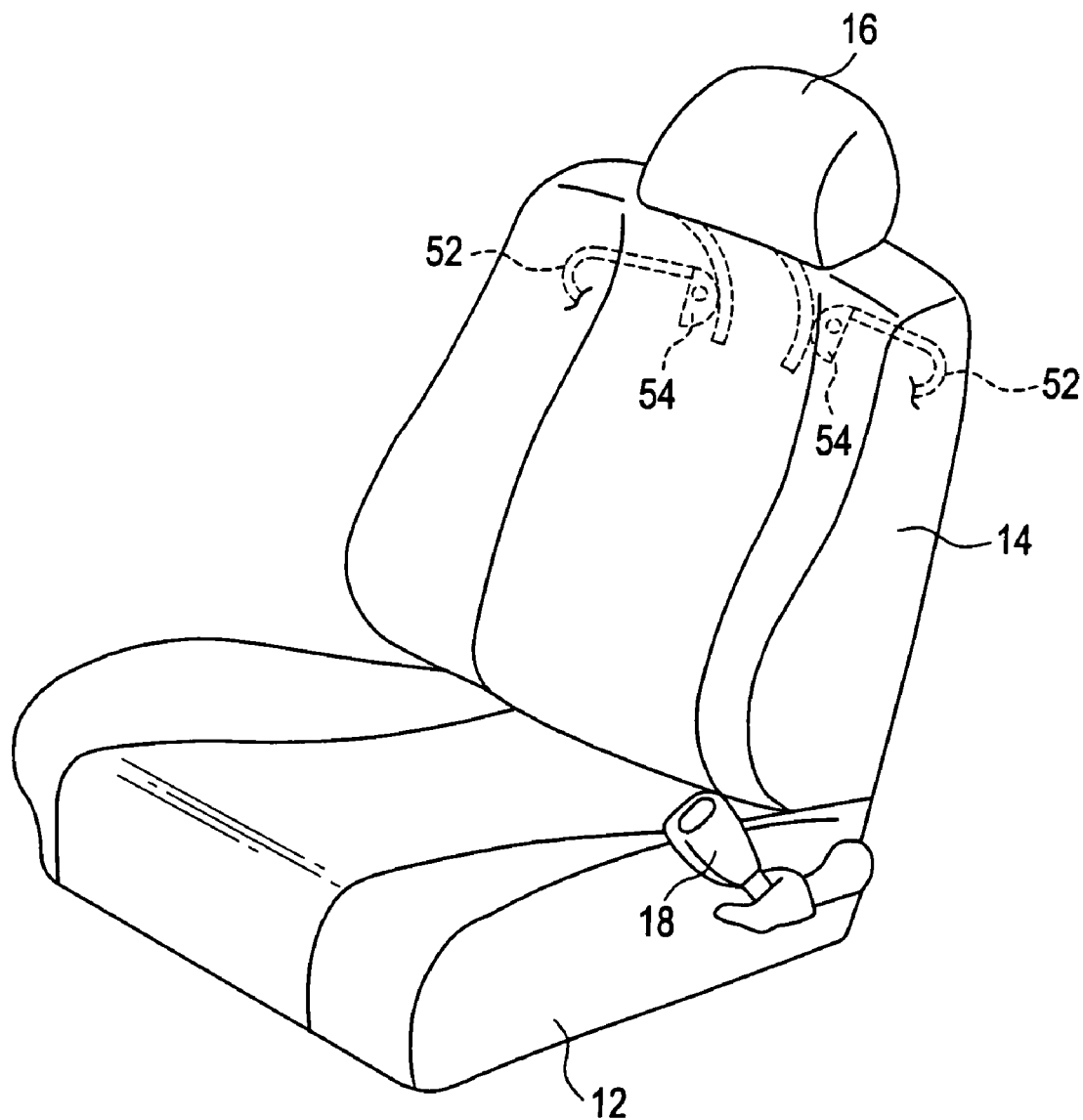
FIG. 18 is a perspective view showing the fifth embodiment of the invention.
Figure 19:
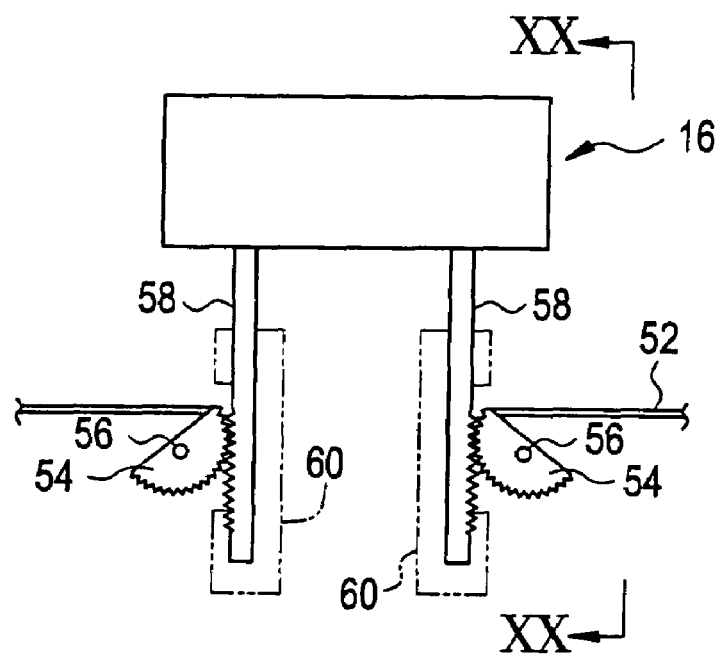
FIG. 19 is a front view showing a state in which the headrest shown in FIG. 18 is mounted.
Figure 20:
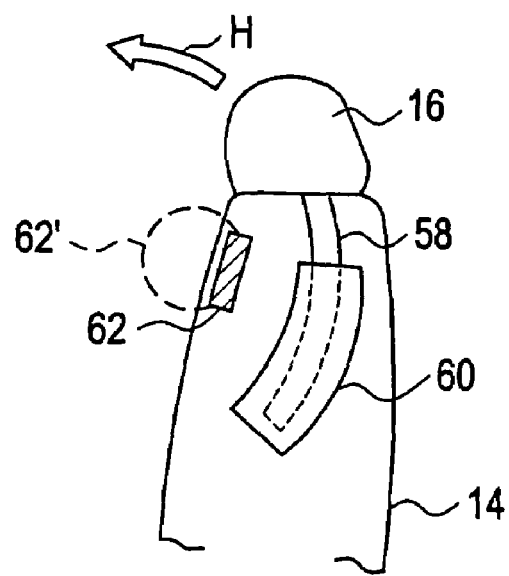
FIG. 20 is a view seen from the direction shown by the arrow XX—XX in FIG. 19.

FIGS. 18 to 20 are drawings of the another embodiment comprising a headrest 16 movable frontward and diagonally upward by the tensile strength generated by inflation of the air belt, in which one end of the wire 52 is connected to the end of the air belt 62 and the other end of the wire 52 is connected to the gear 54. The gear 54 is generally half-round or three quarters round having gear teeth on the peripheral surface. The gear 54 is rotatably supported to the seat back frame or the like by a pivot 56 at the center of the circle.

Two anchor rods 58 are extending downwardly from the headrest 16. As shown in FIG. 20, the anchor rod 58 is curved into an arc in side view, and supported so as to slide along the rod guide 60 also curved into an arc. A rack is provided on the side surface of the anchor rod 58, and said gear 54 is engaged with the rack. In this case, vertically adjusting means of the headrest is provided in the headrest.

The air belt 62 to which the wire 52 is connected is inflated only when the vehicle is bumped from the back, and disposed on the upper front side of the seat back 14. The air belt 62 is extending in the direction of the width of the seat back.

When the vehicle is bumped from the back, the air belt is inflated as shown in FIG. 20 with a dot dash line 62' so that the upper portion of the back or the passenger is supported, the wire 52 is pulled by the air belt 62 decreases in length, the gear 54 rotates, the anchor rod 58 moves along the rod guide 60, and the headrest 16 is pushed frontward and diagonally upward as shown by an arrow H in FIG. 20. Accordingly, the headrest receives the head of the passenger. By inflating the air belt 62 frontward and positioning the headrest 16 in the front, the upper half of the body or the head of the passenger is prevented from being smashed to the seat back 14 or the headrest 16 at high velocity upon collision, thereby preventing an injury such as whiplash.

The wire 52 is preferably provided with a one-way clutch at the mid point of the wire 52.

Figure 21:
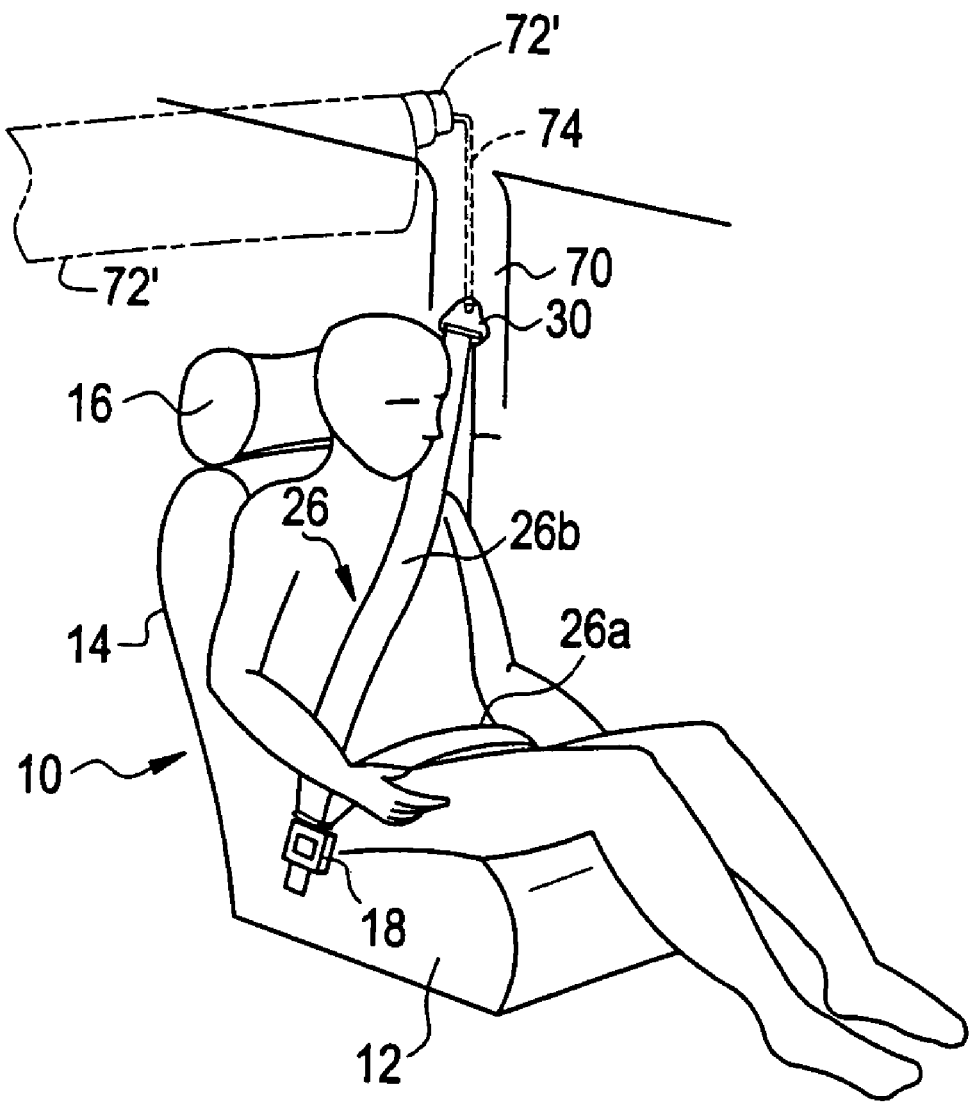
FIG. 21 is a perspective view of the seat according to the sixth embodiment.

FIG. 21 shows a passenger protecting apparatus according to another embodiment in which the air belt 72 is provided so as to extend on the ceiling portion of the vehicle at the upper portion of the seat back 14 of the left and right front seats along the width of the vehicle body. The end of the air belt 72 on the left side of the vehicle body is connected to the shoulder anchor of the B pillar 70 on the left side of the vehicle body via a wire 74. The end of the air belt 72 on the right side of the vehicle body is connected to the shoulder anchor of the B pillar on the right side of the vehicle body via the wire. Other reference numerals and signs in FIG. 21 designate identical components as those in FIG. 6.

When the air belt is inflated upon collision of the vehicle, the length of the air belt 72 is shortened, the shoulder anchor 30 is pulled up, and a pretension is applied to the webbing 26. The inflated air belt 72 extends from the ceiling portion of the vehicle body above the seat back of the front seat on the left side to the portion above the seat back of the front seat on the right side as shown by a dot dash line 72' in FIG. 21, so as to prevent the passenger sitting on the rear seat from jumping forward.

In the embodiment described above, the air belts 50, 62, 72 have the same structure as the air belts 32 or 36 described above.

Referring now to FIG. 27 to FIG. 33, another embodiment of the present invention will be described.

Figure 27:
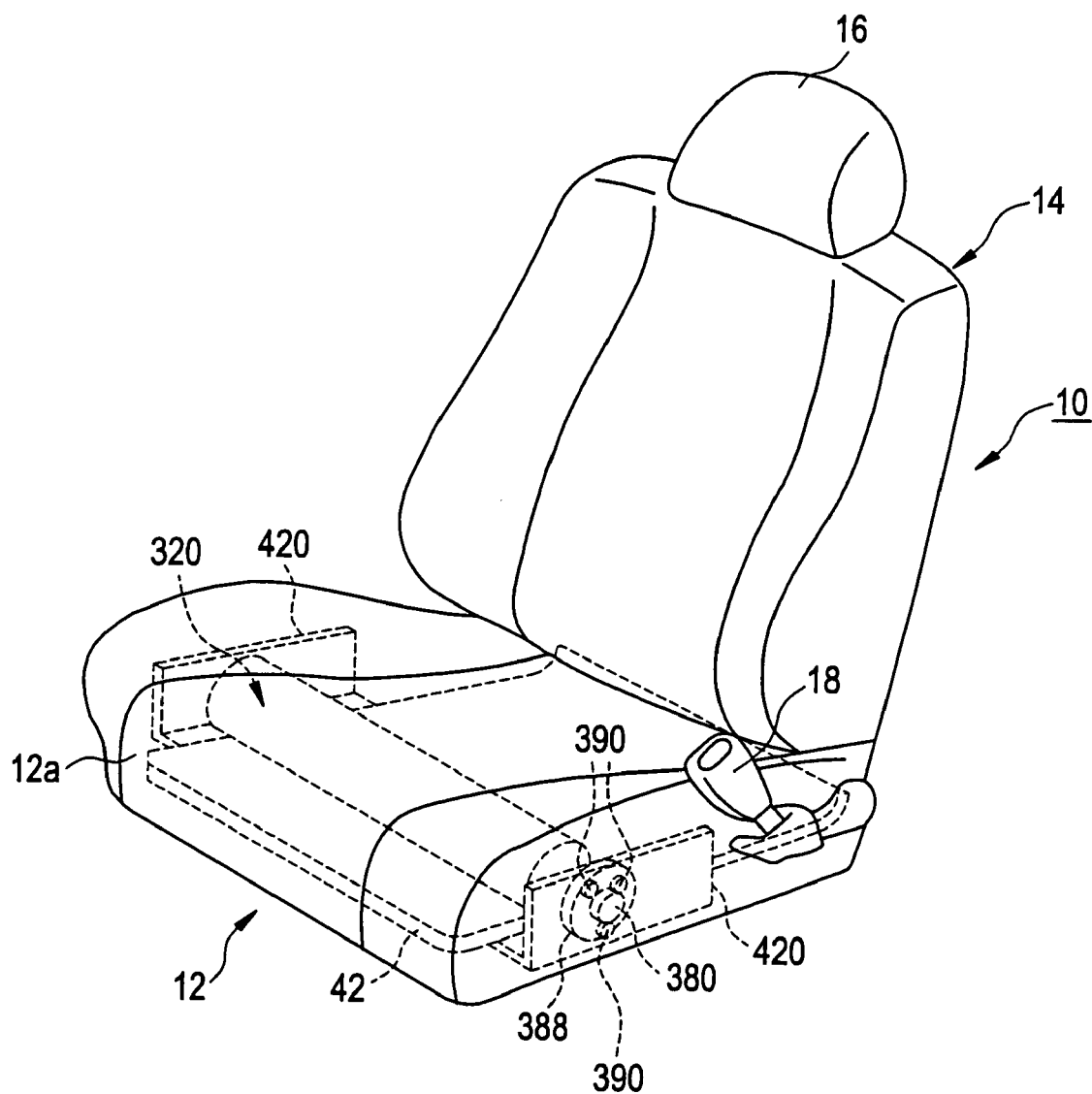
FIG. 27 is a perspective view of the seat including a passenger protecting apparatus according to still another embodiment of the present invention.
Figure 28:
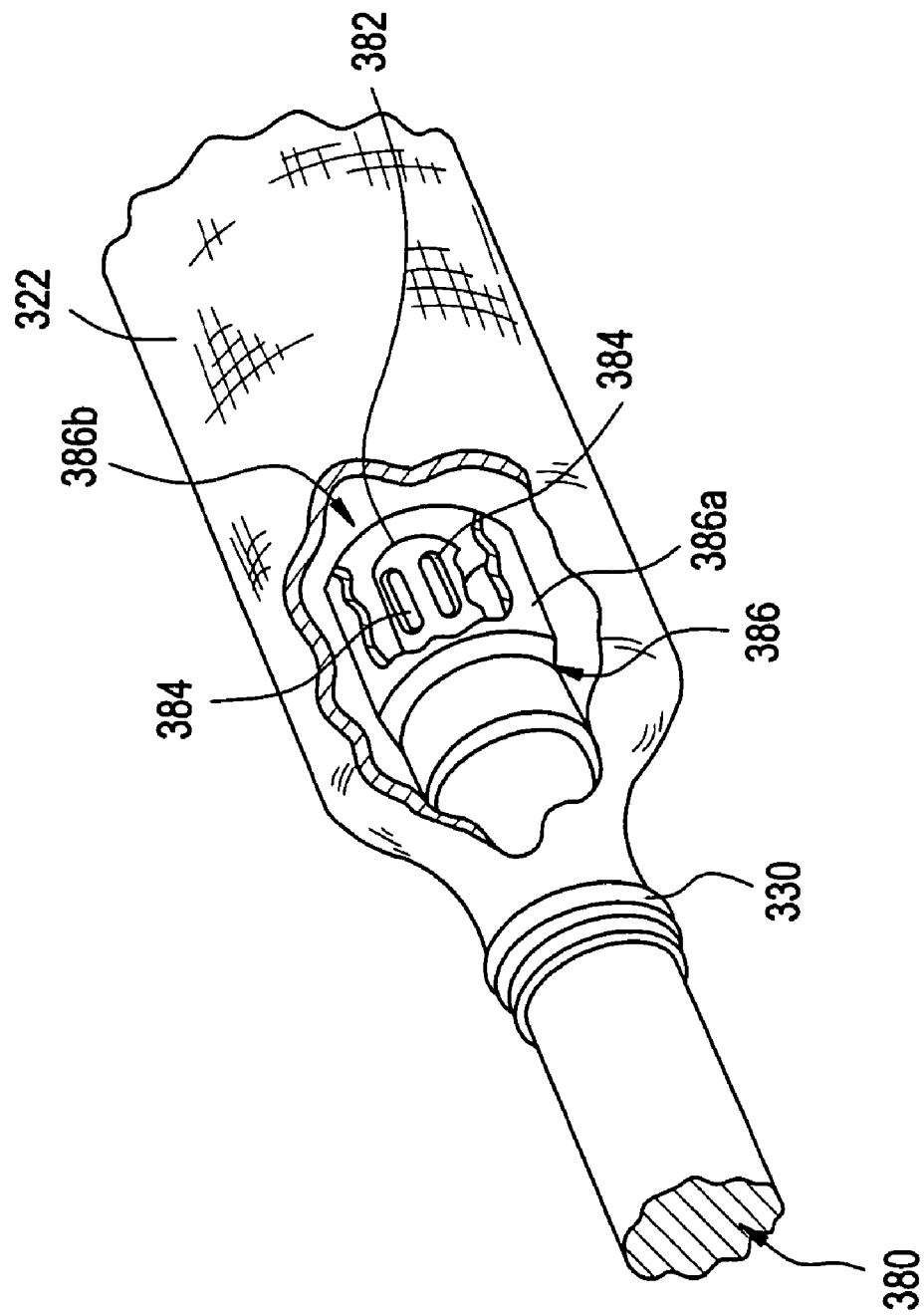
FIG. 28 is a perspective view of the connecting portion between the air belt and the inflator of FIG. 27, partly cross section.
Figure 29:
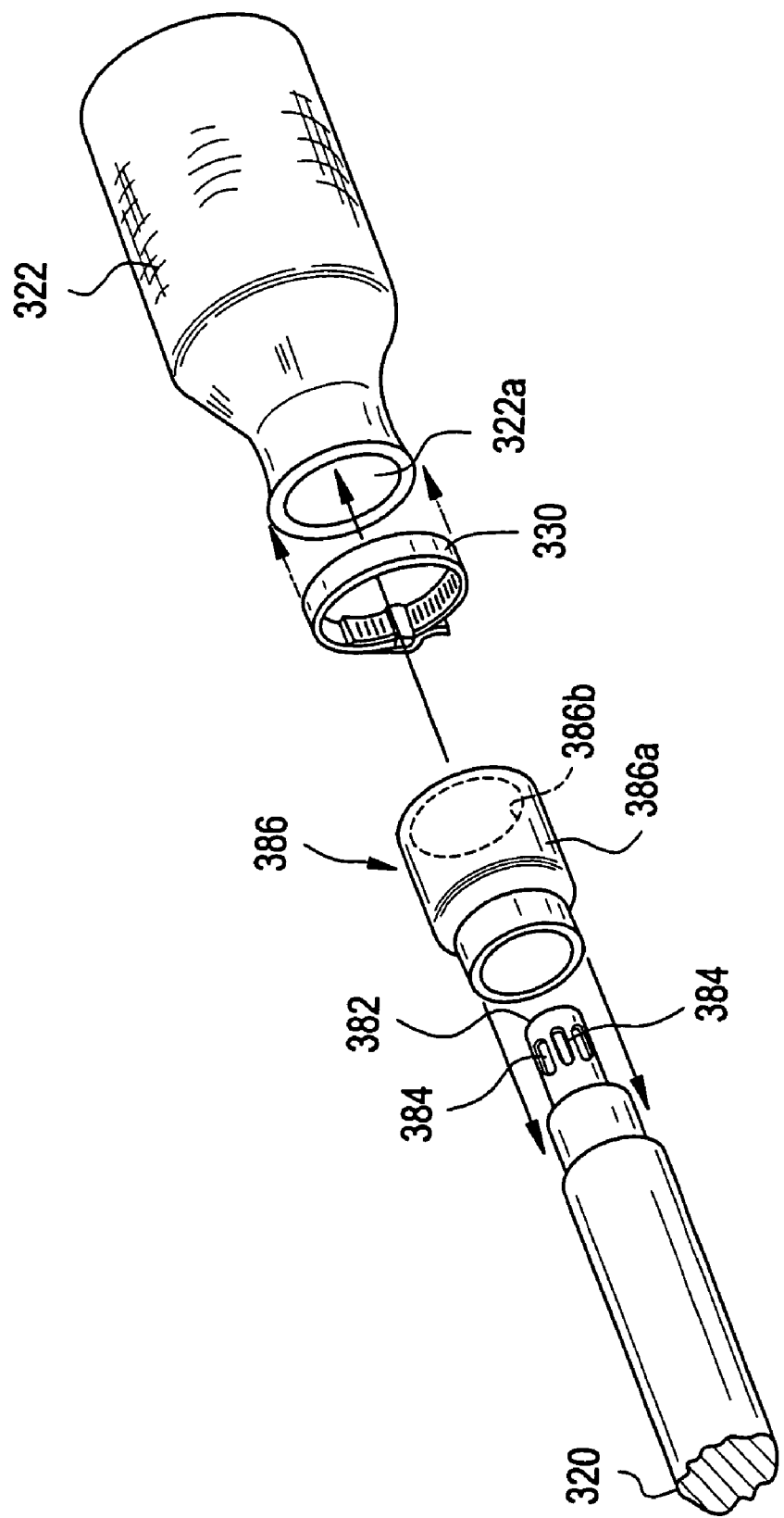
FIG. 29 is an explode perspective view of the connecting portion between the air belt and an inflator shown in FIG. 28.
Figure 30:
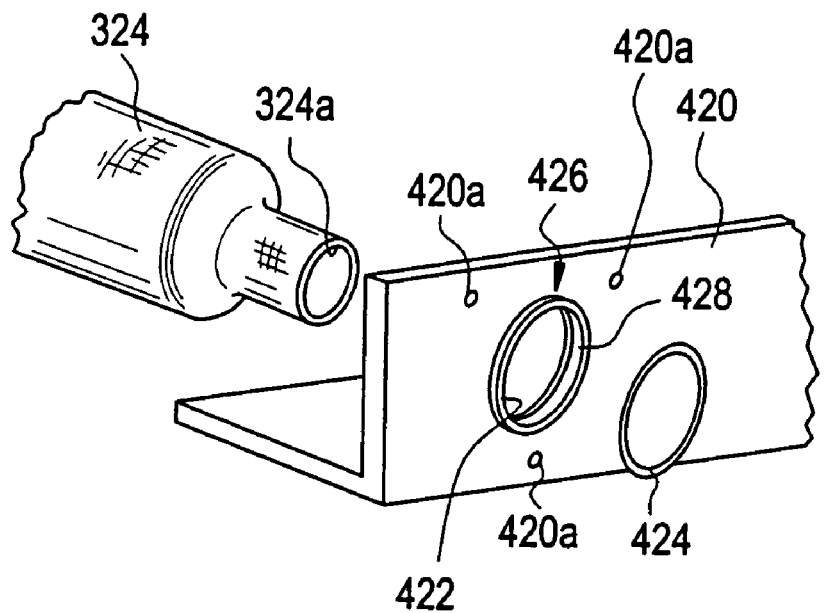
FIG. 30 is a perspective view of the structure in which the mesh webbing constituting an air belt shown in FIG. 27 is engaged with the side panel.
Figure 31:
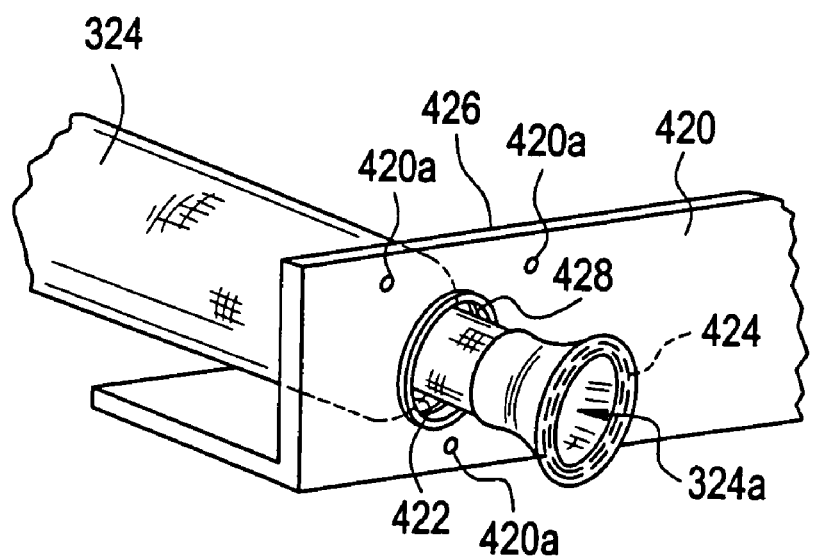
FIG. 31 is a perspective view showing an engaging relation between the mesh webbing and the ring member shown in FIG. 30.
Figure 32:
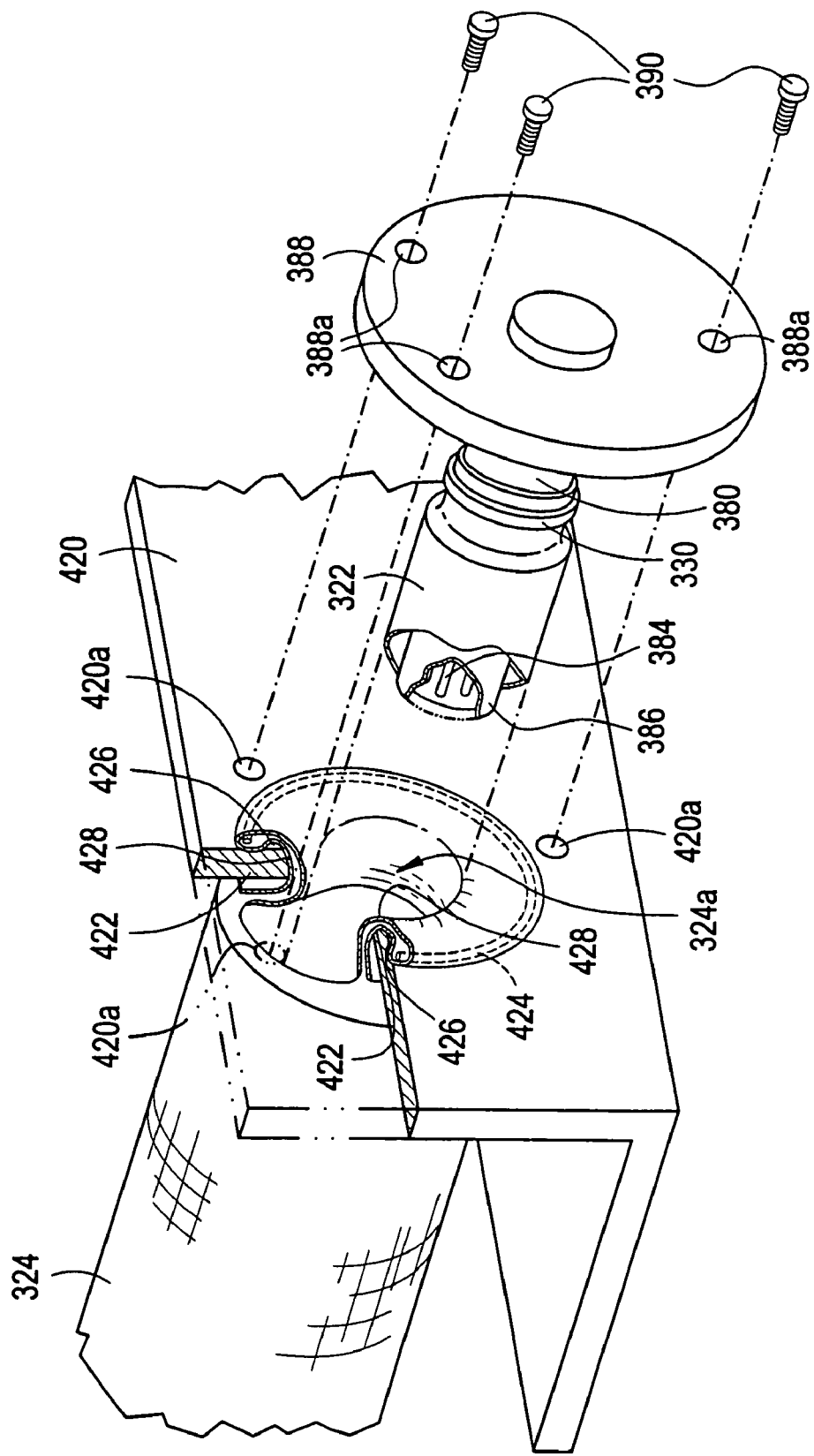
FIG. 32 is an exploded perspective view showing an engaging relation between the side panel and the inflator shown in FIG. 27.
Figure 33:
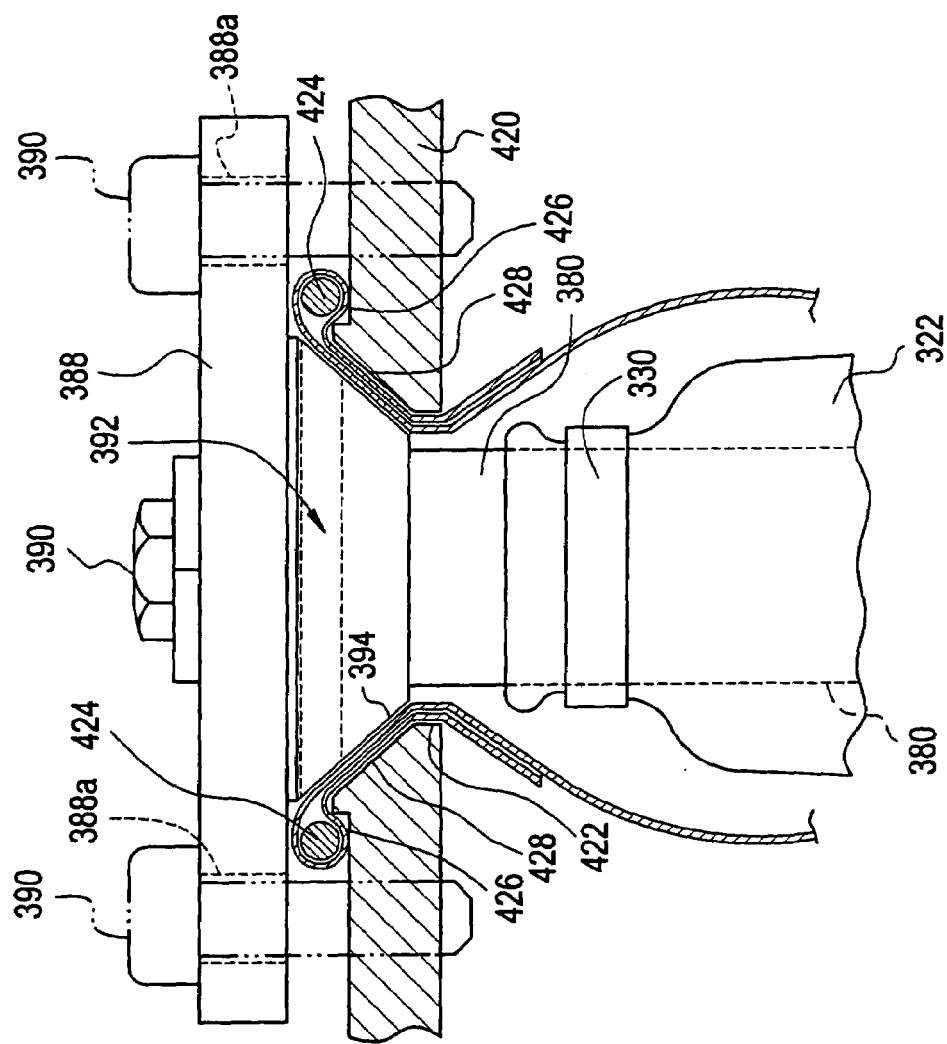
FIG. 33 is a cross sectional view showing a joint structure of an air belt and the side panel shown in FIG. 27.

FIG. 27 is a perspective view of the seat comprising a passenger protecting apparatus according to still another embodiment of the present invention, FIG. 28 is a perspective view of the connecting portion between the air belt and the inflator of the passenger protecting apparatus partially in cross section, FIG. 29 is an exploded perspective view of said connecting portion shown in FIG. 28, FIGS. 30–32 are explanatory drawings showing the method of fixing the air belt to the side panel, and FIG. 33 is a cross sectional view showing the connecting portion between the air belt and the side panel. FIG. 30 is an exploded perspective view showing a structure in which the mesh webbing is engaged with the side panel. FIG. 31 is a perspective view showing the engagement between the mesh webbing and the ring member, and FIG. 32 is an exploded perspective view showing the engagement between the side panel and the inflator.

The air belt 320 comprises an elongated bag shaped inflatable tube 332 to be inflated by a gas from the inflator, and an elongated bag shaped mesh webbing 324 for covering the inflatable tube 322, as in the case of the air belts 32, 36 in the embodiment described above, in which the air belt 320 is disposed in the front portion of the base plate 42 of the seat 10 at the mid section along the width between the left and the right. At one of shorter ends of the inflatable tube 322, there is provided a gas inlet 322a for introducing a gas from the inflator 380 described later.

The inflator 380 is elongated generally cylindrical shape and is provided with a gas exhaust port 384 on the side of the tip portion 382 of said one of shorter ends thereof.

As shown in FIGS. 28, 29, one-half of the inflator 380 is inserted into the gas inlet 322a of the inflatable tube 322 from the side of the tip portion 382. After said gas exhaust port 384 is disposed in the inflatable tube 322, the inflator 380 and the inflatable tube 322 is directly connected so as not to be separated by the pressure of a gas by a band 330 tightened on the peripheral edge of the gas inlet 322a of the inflatable tube 322 fitted on the inflator 380 (hereinafter, the direct connection between the inflator and the inflatable tube (or the air belt) may be referred to as "direct-coupling").

At said one end of the inflator 380, a generally cylindrical gas guide member 386 having a circumferential wall 386a surrounding the tip portion 382 coaxially is fitted prior to insertion of the inflator 380 into the inflatable tube 322. The gas guide member 386 comprises said circumferential wall 386a enclosing the tip portion of the inflator 380 at a prescribed distance and a gas outlet 386b opened at the end surface of said tip portion 382, whereby a gas exhausted from the gas exhaust port 384 is prevented from flowing sideward by the circumferential wall 386a and is allowed to flow out only from the gas outlet 386b, so that the direction of a flow of a gas exhausted from the inflator 380 is changed toward the tip of the inflator 380 or longitudinally of the inflatable tube 322.

The inflator 380 is connected to the inflatable tube 322 so that the rear end projects from said opening 322a. The rear end of the inflator 380 is formed of a flange member 388 extending from the side surface thereof, and the flange member 388 is fixed to the side panel 420 described later to lock the inflator 380 and thus the inflatable tube 322 at a prescribed position.

The inflatable tube 322 is covered by the mesh webbing 324. The mesh webbing 324 is circumferentially expandable as described before and shaped in an elongated bag formed of a woven material or the like which contracts longitudinally in association with the circumferential expansion to decrease in length. The mesh webbing 324 is formed with an opening 324a at one of the shorter ends, and the inflatable tube 322 in the state having an inflator 380 connected is inserted into the bag body of the mesh webbing 324 through said opening 324a.

The mesh webbing 324 is disposed at the front central portion of the base plate 42 of the seat 10 along the width of the base plate 42 between the left and the right, and said one end where the opening 324a is formed is fixed to one of a pair of opposed plate shaped side panels 420 disposed along the left and right sides of the base plate 42.

In order to fix the mesh webbing 324 to the side panel 420, in a first place, said one end of the mesh webbing 324 is inserted into an air belt insertion hole 422 formed of a through hole provided at a prescribed position of the side panel 420 and a ring member 424 of a prescribed configuration and dimensions provided on the surface of the side panel 420 facing toward outside (surface facing toward the side away from the opposed side panel 420) (FIG. 30). Then, the peripheral edge of the opening 324a at said one end of the mesh webbing 324 is turned over the outer surface of the mesh webbing 324 so as to enclose the outer periphery of the ring member 424, and thus the ring member 424 is held at said one end of the mesh webbing 324 by said one end of the mesh webbing 324 in a state of being enclosed by a midsection of said one end of the mesh webbing 324 (FIG. 31).

On the surface of the side panel 420 facing toward outside, an annular projected shoulder portion 426 is formed along said insertion hole 422 so as to enclose the peripheral edge thereof. The ring member 424 is fitted on said annular projected shoulder portion 424 in a state of being enclosed by the mid section of one end of the mesh webbing 324, and said one end of the mesh webbing 324 is pulled into the insertion hole 422 together with the peripheral edge portion of the opening 324a turned over the outer surface (FIG. 32). As a consequent, the mid section of the mesh webbing 324 enclosing the ring member 424 is held on the peripheral edge portion of the projected shoulder portion 426 of the side panel 420 by the ring member 424.

Then the inflatable tube 322 in the sate of being connected directly to the inflator 380 is inserted into the opening 324a of the mesh webbing 324 of which the peripheral edge is turned along the outer periphery of the ring member 424 from the side of the shorter end opposite from the side connected to the inflator 380 (FIG. 32).

The inflatable tube 322 is inserted into said opening 324a until the flange member 388 of the inflator 380 disposed at the rear end overlays on the ring member 424 fitted on the projected shoulder portion 426 along the surface of the side panel 420 facing toward the outside via the mid section of the mesh webbing 324 enclosing the ring member 424. The flange member 388 is fixed on the side panel 420 by inserting a bolt 390 through the bolt insertion hole 388a disposed on the peripheral portion thereof and tightening the bolt 390 into the bolt hole 420a formed on the side panel 420.

As a consequence, the side of the mesh webbing 324 enclosing the ring member 424 is positively clumped between the ring member 424 and the side panel 420 and between the ring member 424 and the flange member 388, and thus fixedly mounted on the side panel 420. By fixing the flange member 388 on the side panel 420, both of the inflator 380 and the inflatable tube 322 are locked on the side panel 420 in the state of being covered by the mesh webbing 324.

The inner peripheral surfaces of the air belt insertion hole 422 and the projected shoulder portion 426 provided on the side panel 420 form a consecutive surface, and the consecutive surface forms an annular tapered portion 428 that increases in diameter concentrically and consecutively from the mid point of the insertion hole 422 in the direction of thickness of the side panel to the edge portion of the inner periphery of the end surface of the projected shoulder portion 426. The mesh webbing 324 inserted into the insertion hole 422 and pulled into the insertion hole 422 while enclosing the ring member 424 extends along the tapered portion 428.

On the surface of the flange member 388 facing toward the side panel 420, there is provided an annular shelf portion 392 overhanging along the circumferential surface of the inflator 380 at the boundary with the flange member 388 so as to enclose the inflator 380. The circumferential surface of the shelf portion 392 forms a tapered portion 394 tapering toward the tip of the inflator 380. When the flange member 388 and the ring member 424 fitted on the insertion hole 422 are overlapped, the tapered portion 394 engages with the tapered portion 428 formed on the consecutive inner peripheral surfaces of the insertion hole 422 described above and the annular projected shoulder portion 426. In this case, the mesh webbing 324 extending along said tapered portion 428 in advance is interposed between these tapered portions 394 and 428.

Therefore, when the mesh webbing 324 is held by the ring member 424 against the peripheral portion of the inserting hole 422 as described above, and the inflatable tube 322 and the inflator 380 are inserted into the mesh webbing 324, and then the flange member 388 is placed so as to overlap with the ring member 424 with the mid section of the mesh webbing 324 interposed therebetween, the mid section of the mesh webbing 324 is clumped between the ring member 424 and the side panel 420 and between the ring member 424 and the flange member 388, as well as between said tapered portions 394 and 428, so as not to resist being detached from the insertion hole 422.

The other end of the mesh webbing longitudinally opposed to the one of the sides thereof fixed with the side panel 420 is connected to one of the buckle 18 and the lap anchor 20 provided on the left and right sides of the seat 10 via a connecting structure, not shown (in this embodiment, the other end of the mesh webbing 324 is connected to the lap anchor (not shown)). The buckle 18 or the lap anchor 20 connected to the other end of the mesh webbing 324 is disposed so as to be movable in the vertical direction on the side surface of the seat.

In such a passenger protecting apparatus comprising an inflatable tube and a mesh webbing 324 fixed to the side panel 420 at one end and disposed in the front central portion of the base plate 42 so as to extend along the width thereof between the left and the right, upon collision of the vehicle, the inflator 380 is actuated and injects a gas into the air belt 320, and then the air belt 320 is inflated and decreases in length as in the embodiment described above. In this case, since a gas injected form the inflator 380 flows longitudinally of the air belt while being guided by the gas guide member 386, a high-temperature and high-pressure gas is directly injected onto the side surface of the inflatable tube 322, so that the inflatable tube 322 is not damaged and the air belt 320 is quickly inflated. Since one end of the air belt 320 is fixedly attached to the side panel 420, the other end of the air belt 320 is positively attracted toward said one end thereof in association with the reduction of the length of the air belt 320, then the buckle 18 or the rap anchor 20 connected to the other end is pulled down so as to apply a pretension to the seat belt webbing, and thus the passenger is stably restrained on the seat. As a matter of course, as is the case of the embodiment described above, by inflation of the air belt 320, the seat cushion 12a is pushed up or the portion of the seat cushion 12a abutting against the air belt 320 is pressed from below and thus hardened, so that a submarine phenomenon of the passenger is prevented.

Figure 34:
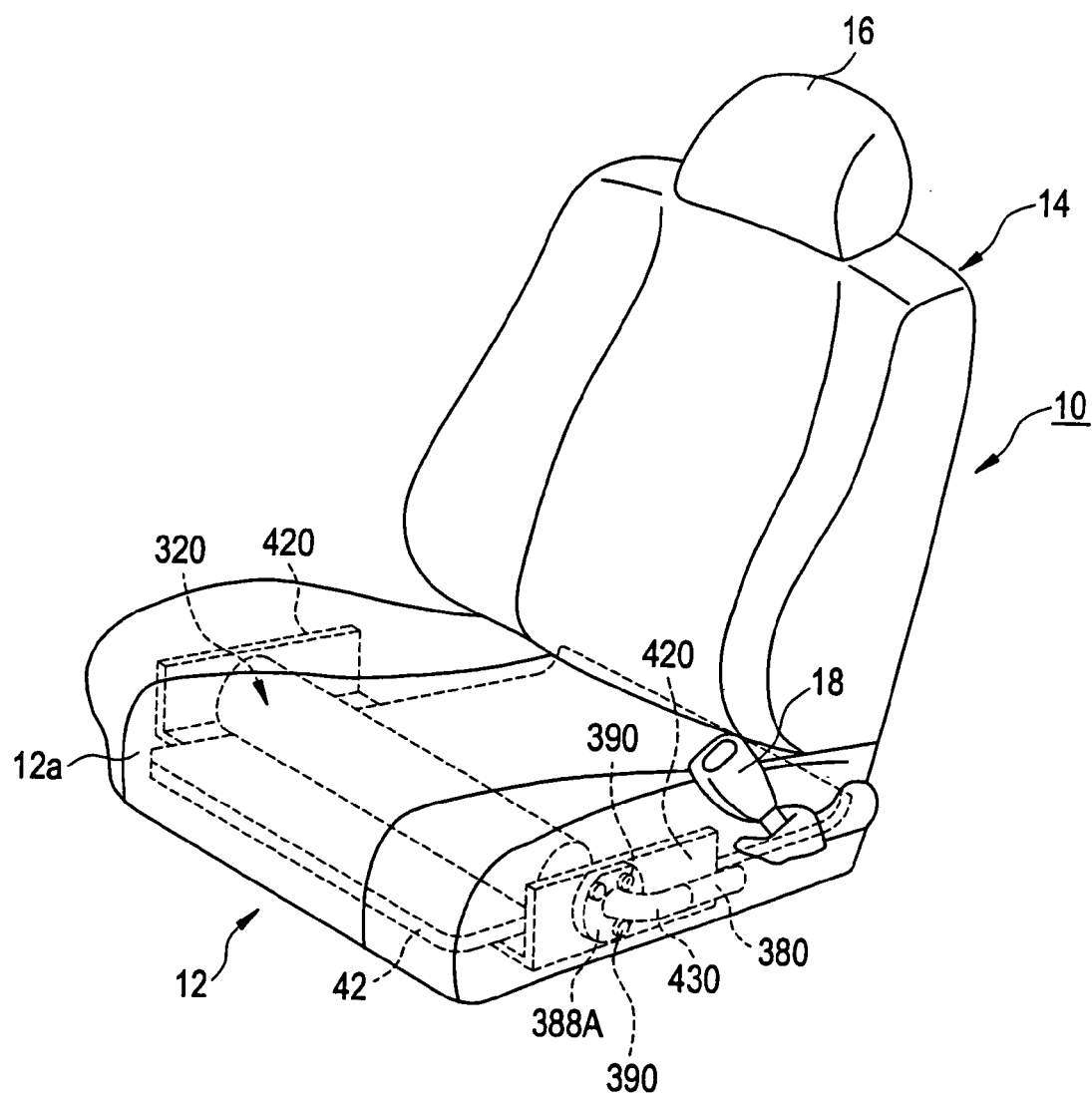
FIG. 34 is a perspective view of the seat comprising a passenger protecting apparatus according to still another embodiment of the present invention.
Figure 35:
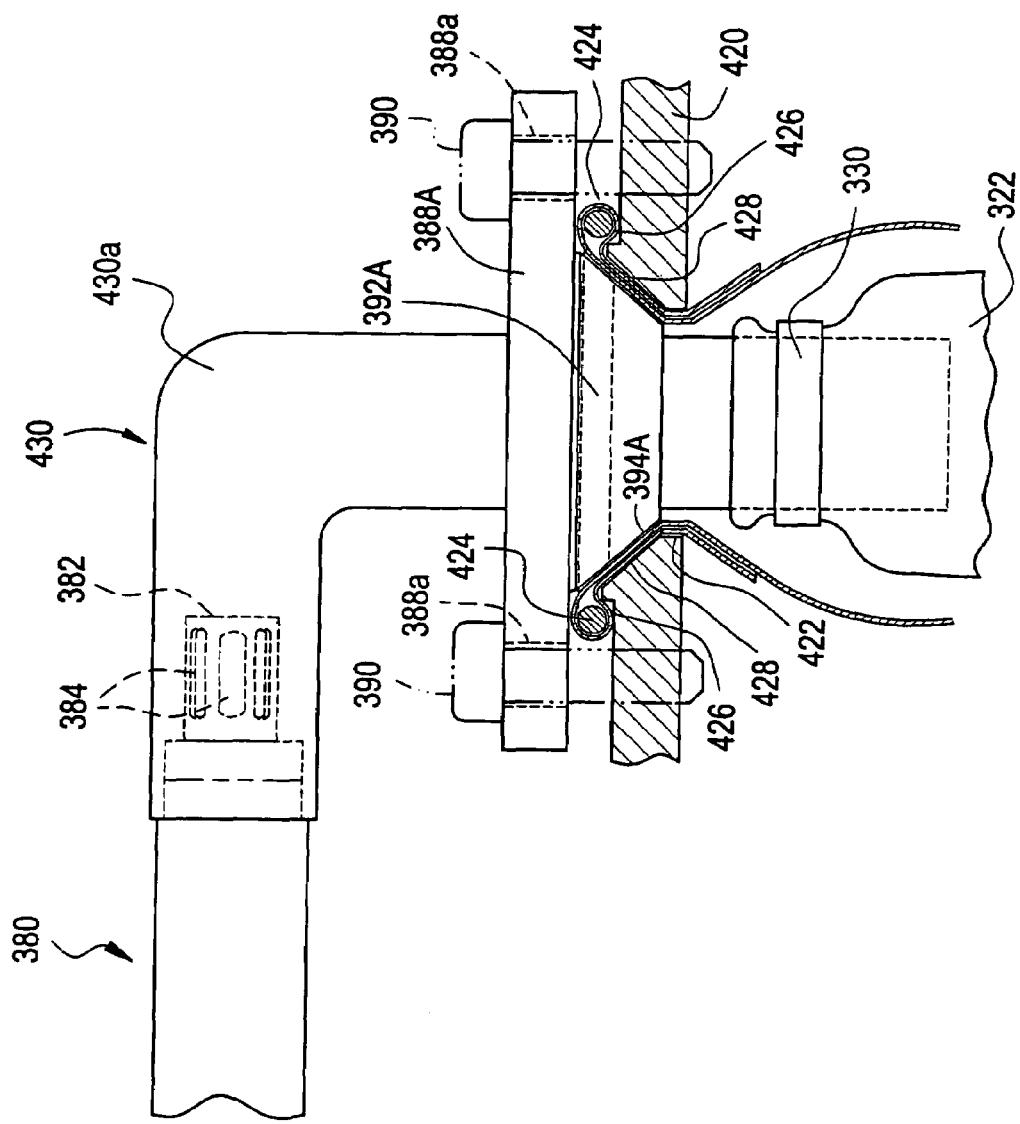
FIG. 35 is a cross sectional view showing a joint structure of the air belt and the side panel shown in FIG. 34.

FIGS. 34 and 35 shows another embodiment of the structure shown in FIGS. 27 to 33, in which the inflator 380 and the air belt 320 are connected by a tubular gas duct 430 so that the gas from the inflator is guided to the air belt by said gas duct 430.

The gas duct 430 is bent at the mid point thereof into L-shape, and the tip portion at one end is inserted into the opening 322a of the inflatable tube 322 and the other end is fitted on the tip portion 382 of the inflator 382. A gas from the inflator 380 is introduced through the gas duct 430 to the inflatable tube 322. Said one end of the gas duct 430 inserted into the inflatable tube 322 is fixedly secured thereto by a band 330 tightened on the peripheral edge of the opening 322a of the inflatable tube 322 fitted on the gas duct 430 so as not to be detached by the gas pressure.

As shown in FIG. 35, the portion of the gas duct 430 projecting from the portion of the inflatable tube 322 located between said end connected to the inflatable tube 322 and the bent portion 430a, there is provided a flange member 388A including an annular shelf portion 392A having a tapered portion 394A constructed in the same manner as the flange member 388 described above. Therefore, as in the case of the embodiment described above, the inflatable tube 322 and the inflator 380 are engaged with the side panel 420 by fixing the flange member 388A to the side panel 420 with bolts 390 or the like, and the mesh webbing 324 is interposed between the ring member 424 and the side panel 420 and between the ring member 424 and the flange member 388A with the mid section thereof on the side of one end enclosed the ring member 424, and then fixed to the side panel. At this time, the inflator 380 is disposed from the other end of the gas duct 430 bent from said one end along the side panel 420 and fixed to the side of the seat.

Figure 36:
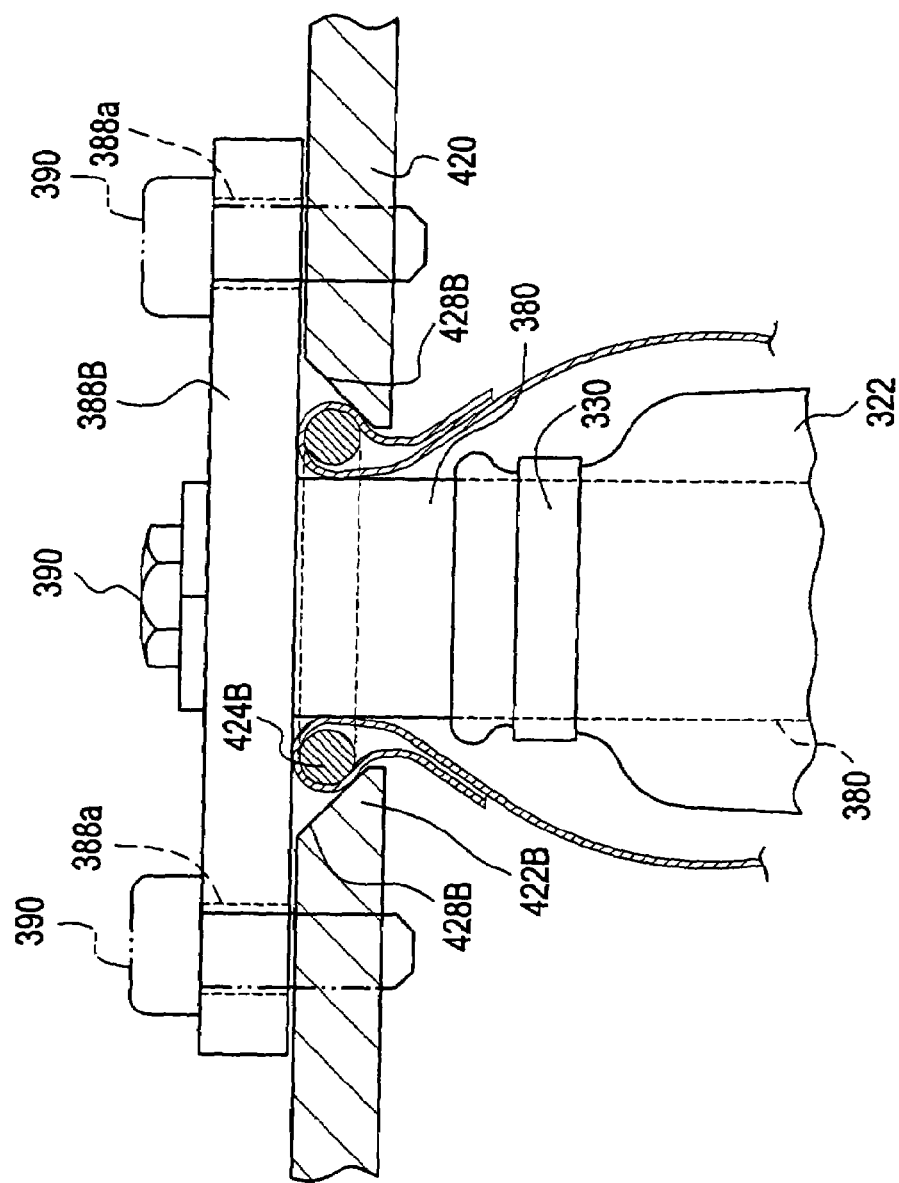
FIG. 36 is a cross sectional view showing a joint structure of the air belt and side panel of the passenger protective apparatus according to still another embodiment of the present invention.

FIG. 36 shows another embodiment of the structure shown in FIGS. 27 to 33, in which the ring member enclosed by the mid section of the mesh webbing 324 on the side of one end is fitted into the air belt insertion hole on the side panel 420 along the tapered portion and the ring member is held by the flange member provided on the rear portion of the inflator 380.

In this embodiment, the air belt insertion hole 422B of the side panel 420 has a tapered portion 428B on the inner peripheral surface thereof, which increases in diameter toward the surface of the side panel facing the outside, as in the case of the embodiment described above, and the projected shoulder portion 426 formed along the peripheral edge of the insertion hole 422 facing toward the outside in the embodiment described above is omitted. The ring member 424B is inserted into the insertion hole 422B along the tapered portion 428B in the state of being enclosed by the mid section of the mesh webbing 324 on the side of one end, and the inflatable tube 322 and the inflator 380 are inserted via the opening 324a of the mesh webbing 324 of which the peripheral edge portion is turned along the outer periphery of the ring member 424B. The ring member 242B is pressed against said tapered portion 428B by the flange member 388B provided on the rear portion of the inflator 380.

As in the case of the flange member 388 in the embodiment described above, the flange member 388B of this embodiment extends from the circumferential surface of the rear portion of the inflator 380, and overlaps with the ring member 424B when the inflator connected to the inflatable tube 322 is inserted into said opening 324a of the mesh webbing 324, so that it can be fixed on the surface of the side panel 420 facing outside by bolts 390 or the like. The surface of the flange member 388B overlapping with the ring member 424B is flat, and the shelf portion 392 having a tapered portion 394 in the flange member 388 described above is omitted. Therefore, the ring member 424B is fixedly secured to the side panel 420 by fixing the flange member 388B on the side panel 420, then holding the ring member 424B by the side panel 420 in the state of being enclosed by said flange member 388B, the tapered portion 428B of the insertion hole 42B, and the circumferential surface on the rear portion of the inflator 380, and then interposing the mid section of the mesh webbing 324 on the side of one end enclosing said ring member 424B between the ring member 424B and the surfaces enclosing said ring member 424B.

The structure shown in FIG. 36 is also applicable to the embodiment shown in FIGS. 34 and 35.

In the embodiment described above, though the ring member 424, 424B are formed into circle in cross section and a closed O-shaped ring, the construction of the ring member is not limited thereto, but it may be triangular or rectangular, or other shape in cross section, and the ring member may be C-shape opening at a part of it.

Figure 37A:
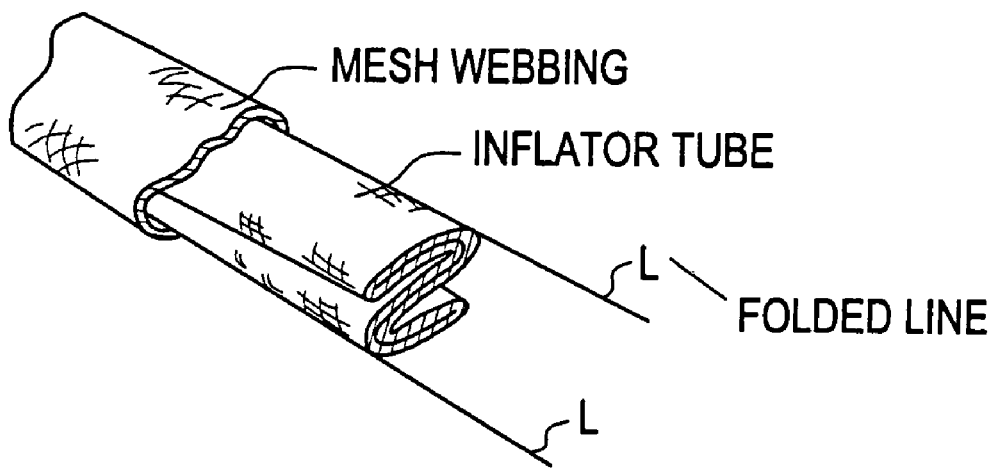
FIG. 37 is a cross sectional perspective view showing the method of folding the inflatable tube of the air belt.
Figure 37B:
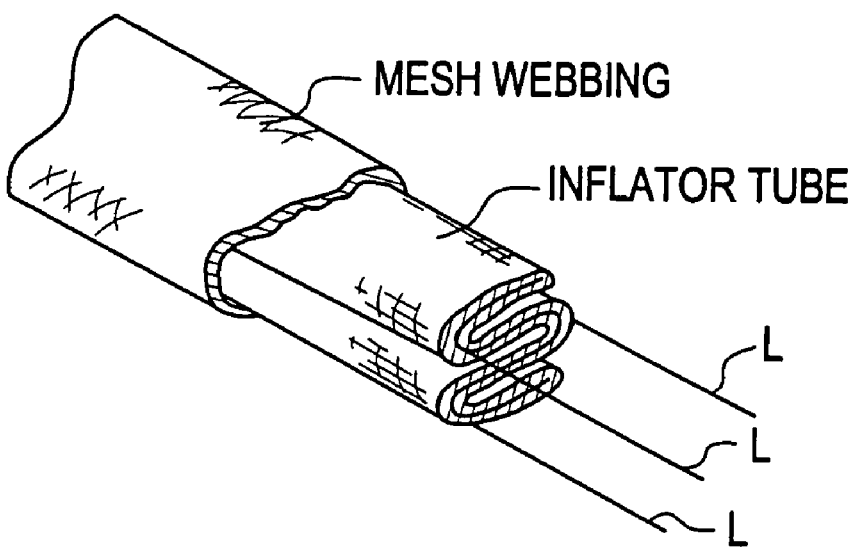

In the passenger protecting apparatus of the present invention, a thick air belt may be used as needed. In this case, when a wide inflator tube is used to make the air belt thicker when inflated, as shown in FIGS. 37(a), (b), it is also possible to fold the inflatable tube once or several times along the longitudinal folding line L at the mid point of the width to make a narrow folded body, and to store the folded body of the inflatable tube into the mesh webbing for covering the folded body of the inflatable tube and having elasticity, so that the storing area of the air belt in normal state under the cushion other than the case where the air belt is inflated may be reduced.

Referring now to FIGS. 38 to 43, the connecting structure between the air belt and the buckle or the lap anchor of the passenger protecting apparatus of the present invention will be described now. FIGS. 38 to 43 are perspective views showing the connecting structure between the air belt and the buckle according to this embodiment, and identical numerals and signs designates identical components throughout the drawings.

Figure 38:
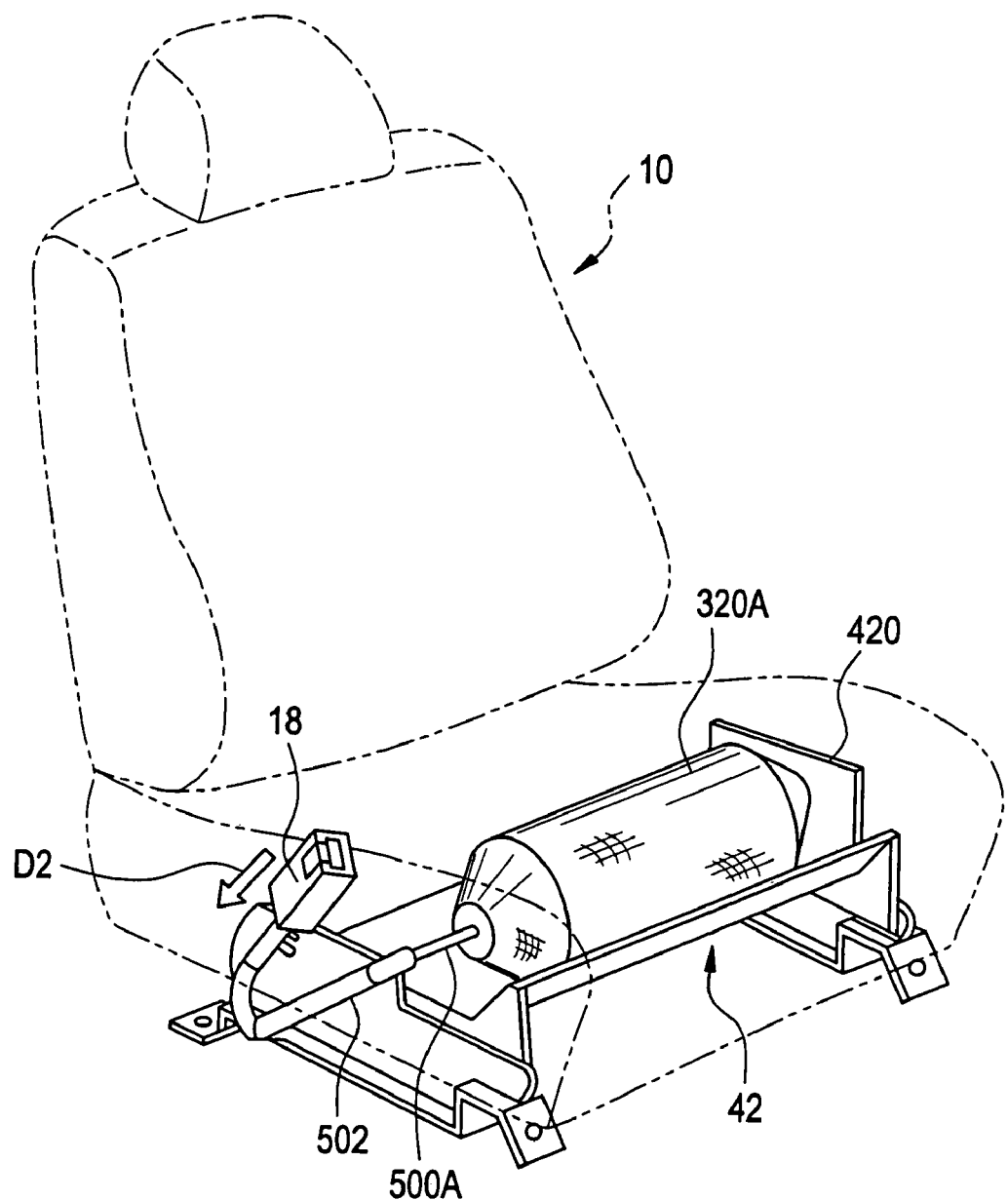
FIG. 38 is a perspective view showing the first structural example of the connection between the air belt and the buckle according to the present invention.

The air belt 320A shown in FIG. 38 is connected to the buckle 18 via a wire 500A. The air belt 320A is, as the air belt 320 described above and shown in FIG. 27, disposed in the front central portion of the base plate 42 so as to extend along the width thereof between the left and the right, and one of the shorter ends is fixed to the side frame 420 mounted along the side of the base plate 42. The buckle 18 is disposed on the side portion of the seat 10 so as to move in the vertical direction as described above.

The one end of the wire 500A is connected to the other shorter end of the air belt 320A (the end of the air belt longitudinally opposed to said one of the shorter ends fixed to the side frame 420), and the other end of the wire 500 is connected to the lower portion of the buckle 18.

When the air belt 320A is inflated and the length thereof is shortened, the other side of the air bag 320A connected to one end of the wire 500A is attracted to said one end fixed to the side panel 420 and pulls said one end of the sire 500A. The buckle 18 connected to the other end of the wire 500A is pulled downward (direction shown by an arrow D2 in FIG. 38) via the wire 500A by a shrinking force of the air belt 320A. Therefore, a pretension is applied to the seat belt webbing, not shown, and the passenger is stably restrained on the seat by the seat belt webbing.

The mid section of the wire 500A is inserted into the tubular guide column 502 so as to be movable along the length thereof. Guided by the guide column 502, the wire 500A extends from the other end of the air belt 320A longitudinally of the air belt 320A, then turns on the side of the seat 10 below the buckle 18 and is routed up in the direction in parallel with the direction to pull down the buckle 18 (direction shown by the arrow D2) and connected to the lower portion of the buckle 18. Accordingly, when one end of the wire is pulled in the direction in which the air belt 320A shrinks, the other end of the wire 500A can pull the buckle 18 downward.

Figure 39:
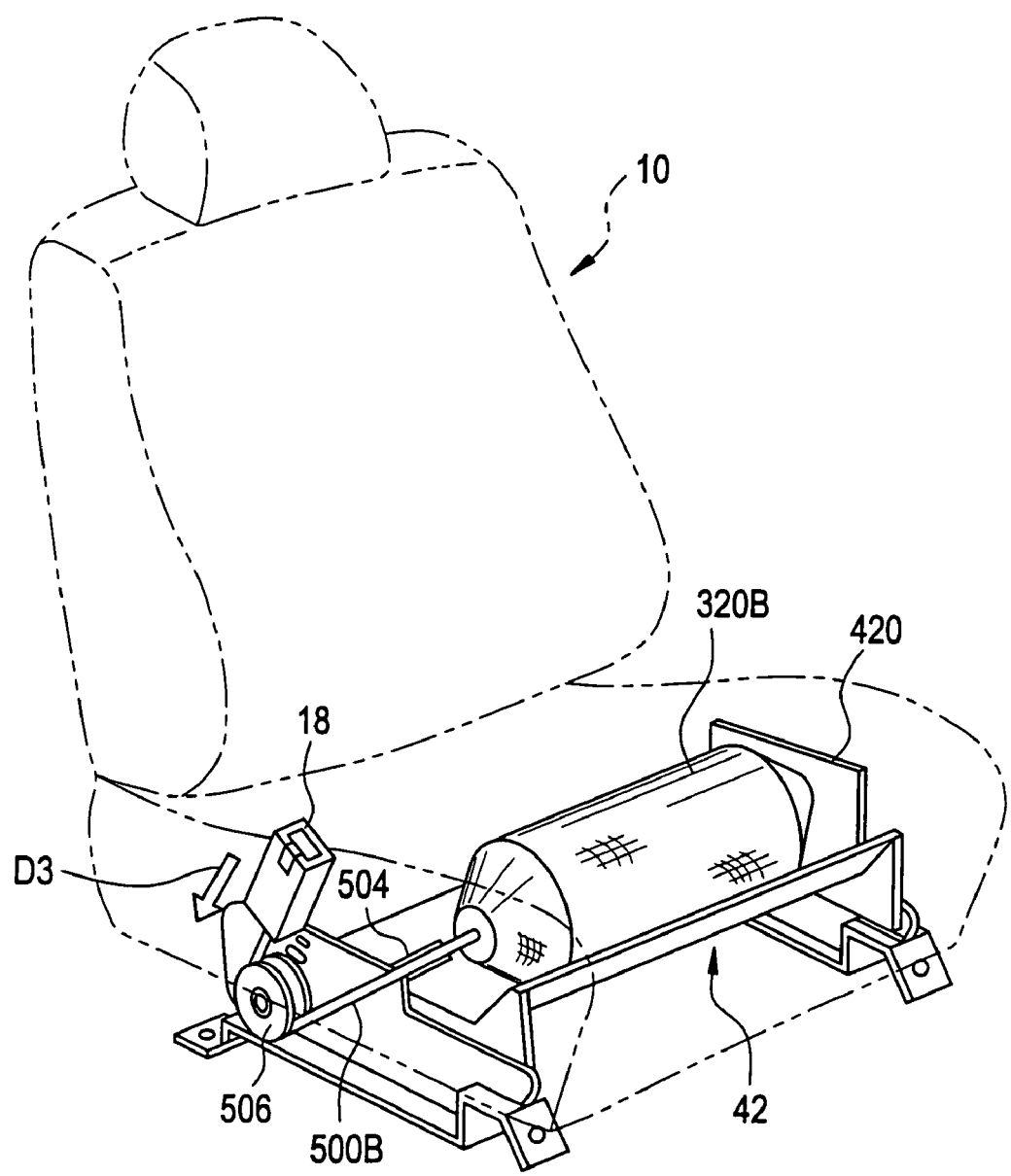
FIG. 39 is a perspective view showing the second structural example of the connection between the air belt and the buckle according to an embodiment of the present invention.

The air belt 320B shown in FIG. 39 has the same structure and arrangement as the air belts 320, 320A described above, and connected to the buckle 18 via the wire 500B. One end of the wire 500B is connected to the other end of the air belt 320B longitudinally opposed to the end fixed to the side flame 420, and from the other end, it extends along the air belt, then at the mid section thereof, it is guided by the pulleys 504, 506 to the position below the buckle 18 and then routed in the direction in parallel with the direction to pulled down the buckle 18 (direction shown by the arrow D3 in FIG. 39) and connected to the lower portion of the buckle 18.

The pulleys 504, 506 are mounted at the prescribed positions shown in FIG. 39 respectively by the supporting members, not shown, so as to be rotatable in a prescribed direction. The wire 500B is engaged with the pulley 504, 506 at the mid section thereof, and guided in such a manner that when one end of the wire 500B is pulled by the pulleys 504, 506 in the direction in which the air belt 320B shrinks, the other end pulls the buckle 18 downward (direction shown by the arrow D3).

In this embodiment, when the air belt 320B is inflated and the length thereof is shortened, the buckle 18 is pulled by the shrinking force of the air belt 320B downward in the direction shown by the arrow D3 via the wire 500B guided by the pulleys 504, 506, and thus a pretension is applied to the seat belt webbing, not shown.

Figure 40:
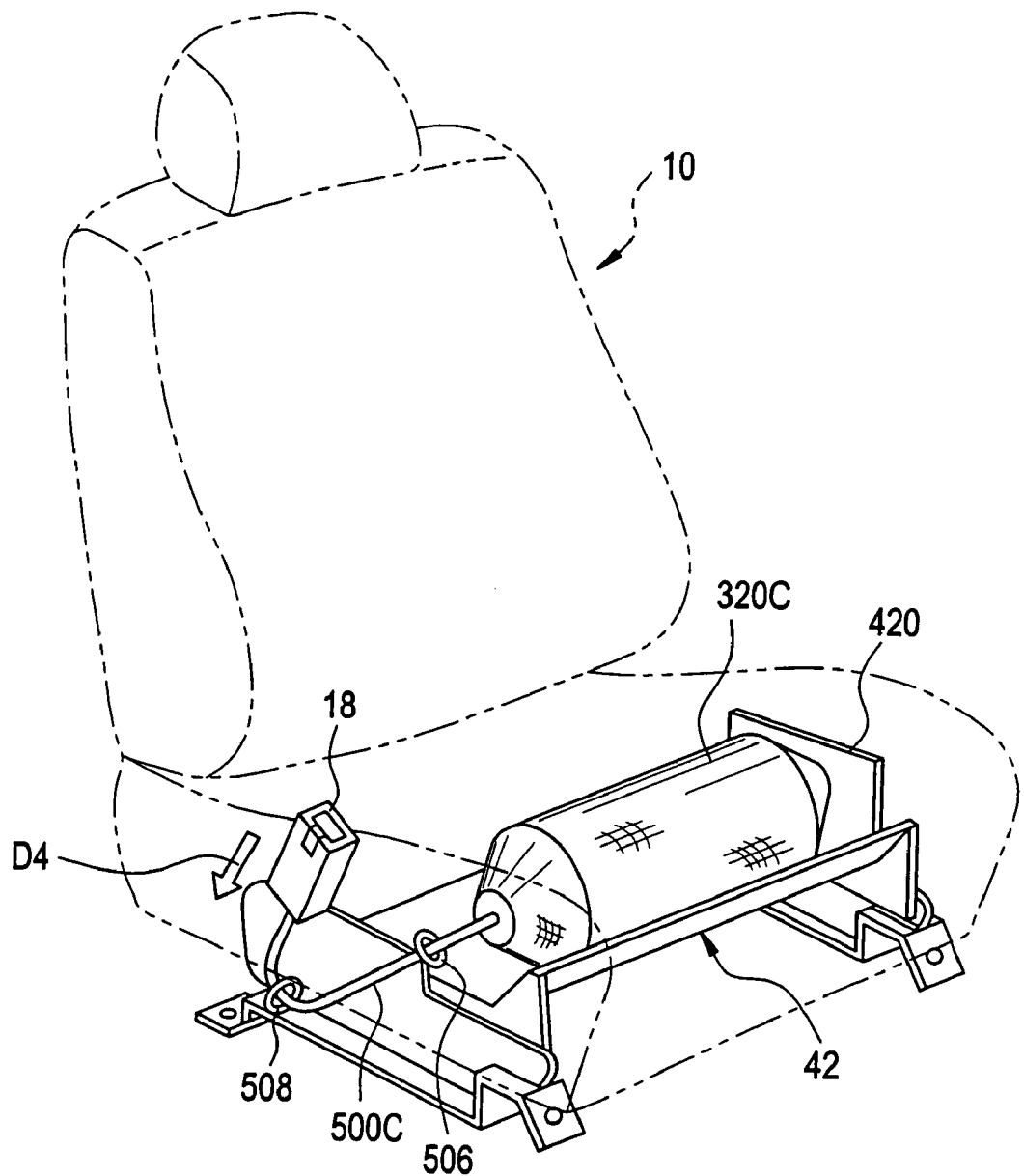
FIG. 40 is a perspective view showing the third structural example of the connection between the air belt and the buckle according to an embodiment of the present invention.

The air belt 320C shown in FIG. 40 has the same structure and the arrangement as the air belts 320, 320A described above, and connected to the buckle 18 via the wire 500C.

The mid section of the wire 500C is inserted through the slip anchors 508, 510 so as to be slidable therein, and guided by these slip anchors 508, 510 so that one end thereof is connected to the other end of the air belt 320C longitudinally opposed to the end fixed to the side frame 420, and the other end thereof extends longitudinally of the air belt, then along the side surface of the seat 10 toward the position below the buckle 18, and then is routed in the direction in parallel with the direction to pull the buckle 18 downward (direction shown by the arrow D4 in FIG. 40), and connected to the lower portion of the buckle 18.

When the air belt 320C is inflated and decreased in length as in the embodiment described above, said one end of the wire 500C is pulled toward the other end of the air belt 320C and thus the mid section of the wire 500C slides within said slip anchors 508, 510, so that the other end of the wire 500C pulls the buckle 18 downward (direction shown by the arrow D4) to apply a pretension to the seat belt.

Figure 41:
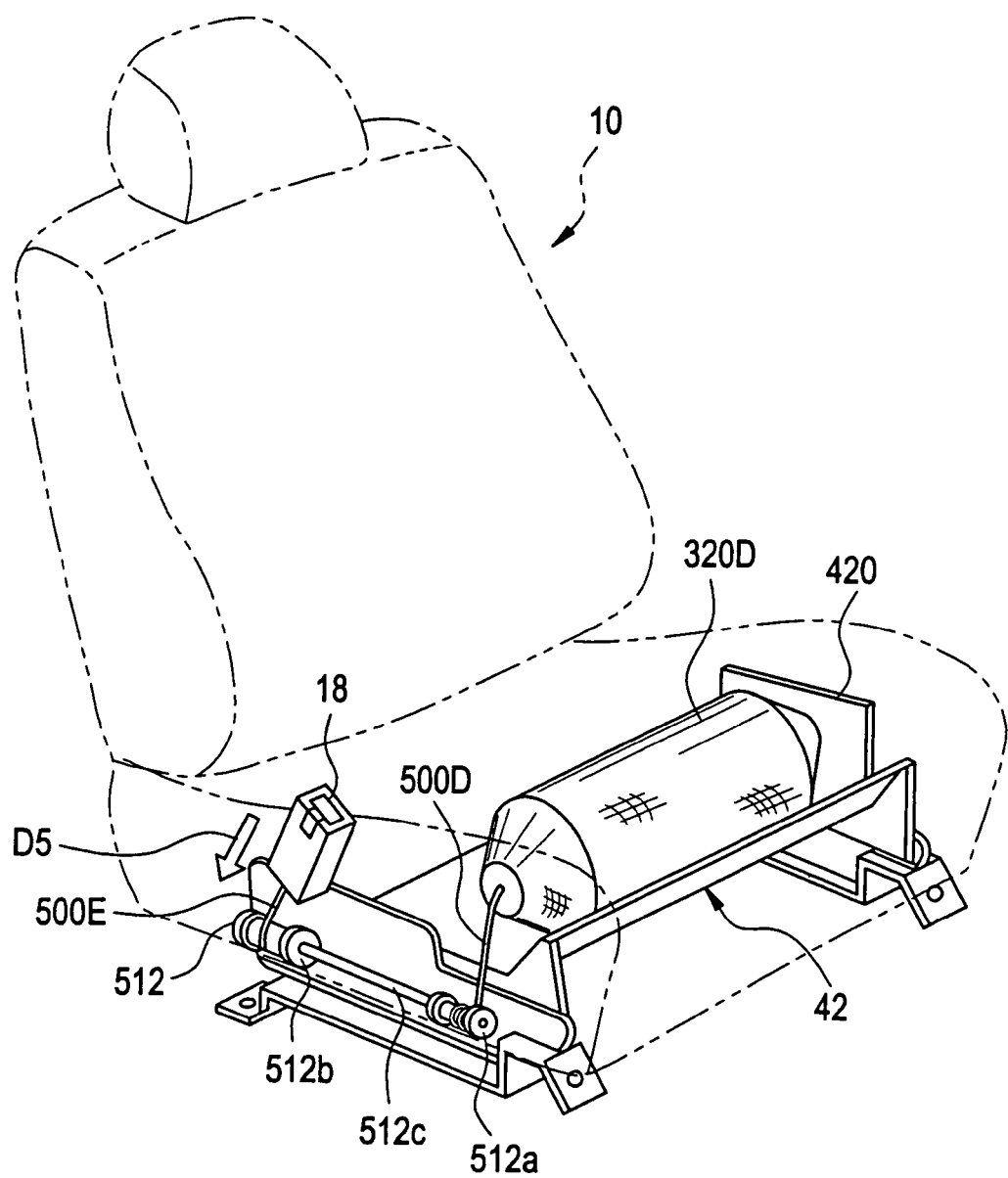
FIG. 41 is a perspective view showing the fourth structural example of the connection between the air belt and the buckle according to an embodiment of the present invention.

The air belt 320D shown in FIG. 41 has the same structure and the arrangement as the air belts 320, 320A–320C described above, and one end is fixed to the side frame 420 and the other end is connected to one end of the first wire 500D.

The other end of the first wire 500D is wound around one of the pulleys 512a of the rotatable body 512 comprising a pair of pulleys 512a and 512b coaxially connected so as to rotate integrally with each other via a shaft.

A second wire 500E is connected to the lower portion of the buckle 18. The other end of the second wire 500E extends toward the position below the buckle 18 (direction shown by the arrow D5 in FIG. 41) and windably connected to the other one of pulley 512b of the rotatable body 512.

When the air belt 320D is inflated and decreased in length, one end of the first wire 500D connected to the air belt 320D is pulled by the shrinking force of the air belt 320D, and the other end wound around the pulley 512a is unwound from the pulley 512a by the length corresponding to the shrinkage of the air belt 320D. In this case, the pulley 512a rotates in the direction to unwind the wire D in order to allow the wire D to be unwound unwinding of the wire 500D, and pulley 512b rotates integrally with the pulley 512a so that the other end of the second wire 500E connected to the pulley 512b is wound around the pulley 512b. Accordingly, said the end of the wire 500E connected to the lower portion of the buckle 18 pulls the buckle 18 downward (direction shown by the arrow D5), so that a pretension is applied to the seat webbing, not shown.

Figure 42:
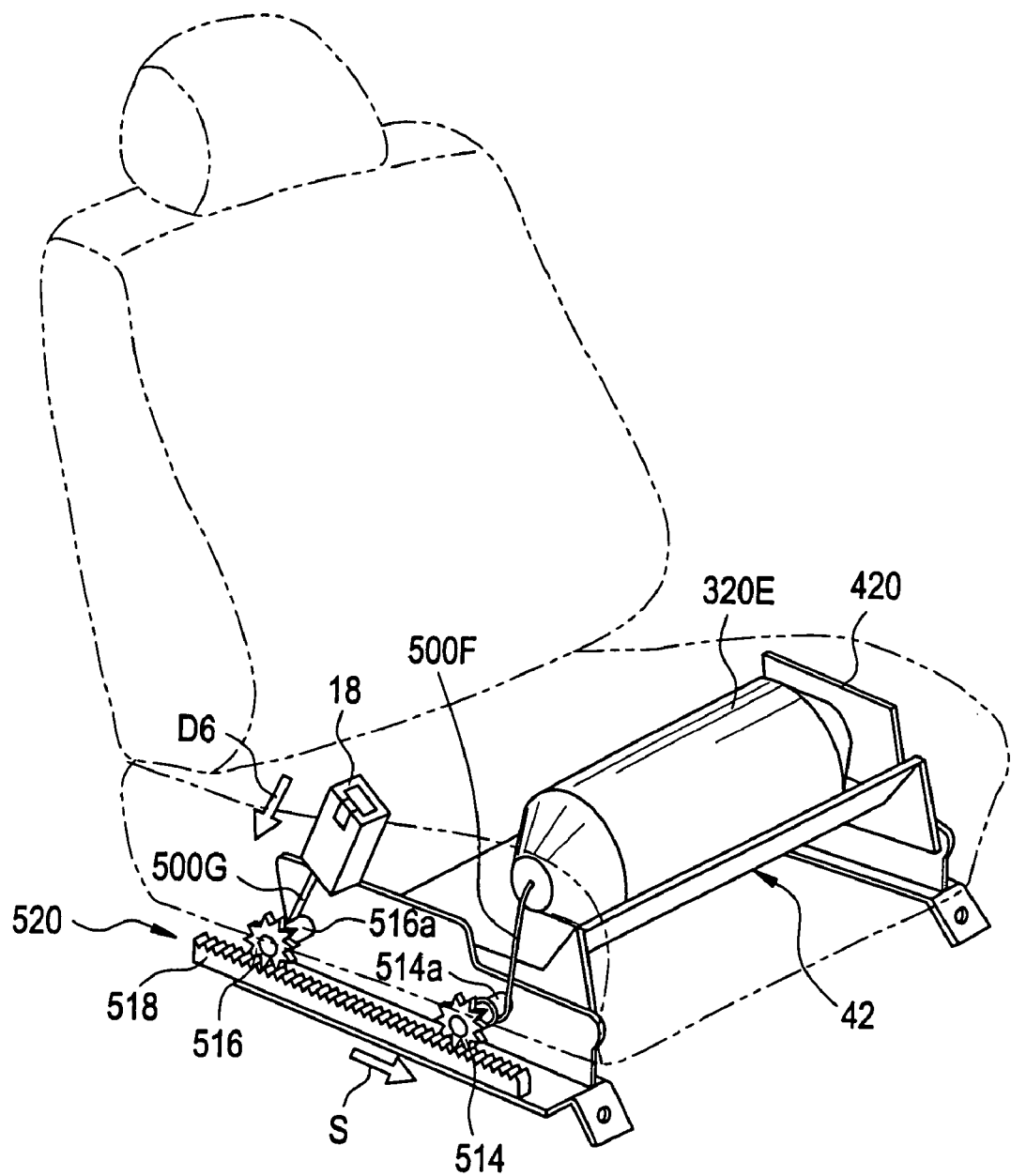
FIG. 42 is a perspective view showing the fifth structural example of the connection between the air belt and the buckle according to an embodiment of the present invention.

FIG. 42 shows another structure of the embodiment described above, in which the air belt 320E is connected to the buckle 18 via the rack-and-pinion 520 instead of the rotatable body 512.

One end of the first wire 500F is connected to the other end of the air belt 320E longitudinally opposed to the end connected to the side frame 420. The other end of the first wire is wound around the shaft portion 514a supporting the pinion 514 rotatably disposed at a prescribed position on the side of the base plate 42 shown in FIG. 42 and always rotating integrally with said pinion 514.

When the air belt 320E is inflated and decreased in length, the end of the first wire 500F connected to the air belt 320E is pulled by the shrinking force of the air belt 320E, and accordingly the other end thereof wound around the shaft portion 514a is unwound from the shaft portion 514a by the length corresponding to the shrinkage of the air belt 320E.

In this case, the shaft portion 514a rotates integrally with the pinion 514 in the direction to unwind the wire 500F to allow the unwinding of the wire F.

The pinion 514 engages with a half portion of the rack 518 disposed along the side of the base plate 42 so as to be movable in the fore-and-aft direction of the seat.

One end of the second wire 500G is connected to the lower portion of the buckle 18. The other end of the second wire 500G extends in the direction in which the buckle 18 is pulled down (direction shown by the arrow D6 in FIG. 42), and is windably connected to the shaft portion 516a supporting the pinion 516 rotatably disposed under the buckle 18 and always rotating integrally with the pinion 516 on the side of the base plate 42. The pinion 516 engages with the other half portion of the rack 518 described above.

In this embodiment, when the air belt 320E is inflated and decreased in length, as described above, the pinion 514 engaged with one half of the rack 518 rotates in association with unwinding of the other end of the first wire 500F wound around the shaft portion 514a, and engages subsequently with the rack 518 toward the other half portion so that the rack 518 moves along the side of the base plate 42 toward the front of the seat in parallel to itself. Along with the parallel movement of the rack 518, the pinion 516 engaged with the other half of the rack 518 rotates, and the other end of the wire 500G is wound around the shaft portion 516a which rotates always integrally with the pinion 516. Accordingly, the buckle 18 connected to the one end of the wire 500G is pulled downward (direction shown by the arrow D6), so that a pretension is applied to the seat belt webbing, not shown.

In the embodiments described above, it is also possible to employ a rope or some other linear body instead of the wire 500A–G, and the linear body may be webbing or mesh webbing extended from one end thereof.

Figure 43:
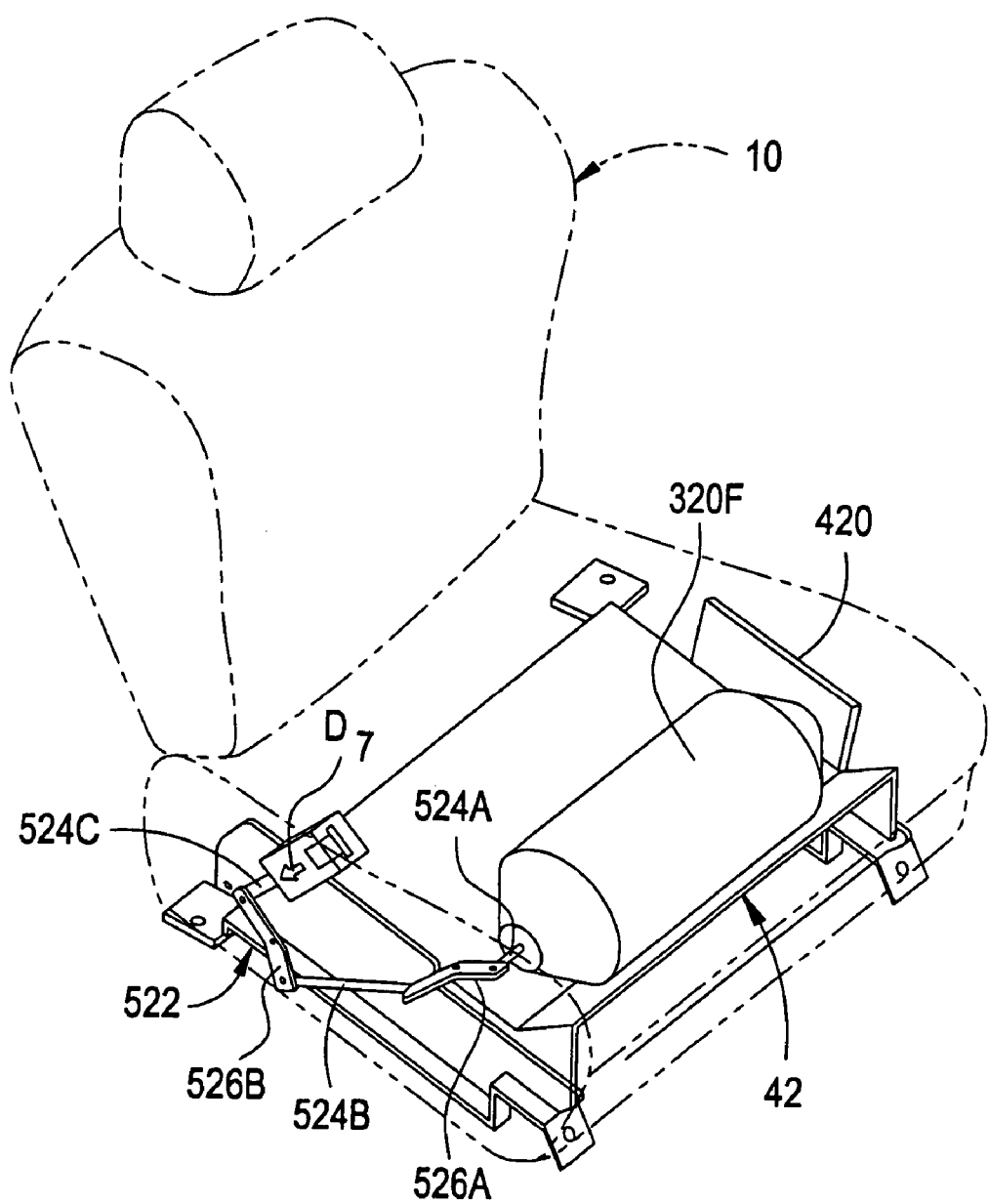
FIG. 43 is a perspective view showing the sixth structural example of the connection between the air belt and the buckle according to an embodiment of the present invention.

The air belt 320F shown in FIG. 43 is connected to the buckle 18 via a linkage 522.

The air belt 320F has the same structure and arrangement as the air belts 320, 320A–E described above, and extends at the front central portion of the base plate 42 along the width between the left and the right, and the one of the shorter ends is fixed to the side frame 420 disposed along the side of the base plate 42. When the air belt 320F is inflated, the other end thereof is attracted to the end fixed to the side frame 420, so as to decrease in length.

The linkage 522 is constructed in such a manner that the longitudinal (direction of the width of the base plate between the left and the right) shrinking force of the air belt 320F generated when the air belt 320F is inflated and the other side of the air belt 320F is attracted toward one of the sides thereof is converted to the pulling-down force for pulling the buckle 18 downward (direction shown by the arrow D7 in FIG. 43) by the shafts 524A–C and the bell cranks 526A, B or the like shown in FIG. 43 and transmitted to the buckle 18. Accordingly, when the air belt 320F is inflated and decreased in length, the shrinking force is transmitted to the buckle 18 via the linkage 522, and then the buckle 18 is pulled downward (direction of the arrow D7) so that a pretension is applied to the seat belt.

In the embodiment described above, though the air belts A–F are all connected to the buckle 18, these air belts A–F may be connected to the lap anchor 20 (not shown in FIGS. 34–43) instead of the buckle 18.

In the passenger protecting apparatus of the present invention, the air belt is provided with a shock-absorbing mechanism, so that the impactive force is absorbed when the passenger bumped against the seat cushion raised or hardened by the air belt upon collision. Referring now to FIGS. 44 to 47, the passenger protecting apparatus comprising an air belt having such a shock-absorbing mechanism will be described. FIGS. 44–47 are perspective views respectively of the air belt portion of the passenger protecting apparatus having a shock-absorbing mechanism according to this embodiment, and identical numerals and signs designates identical components throughout the drawings.

Figure 44:
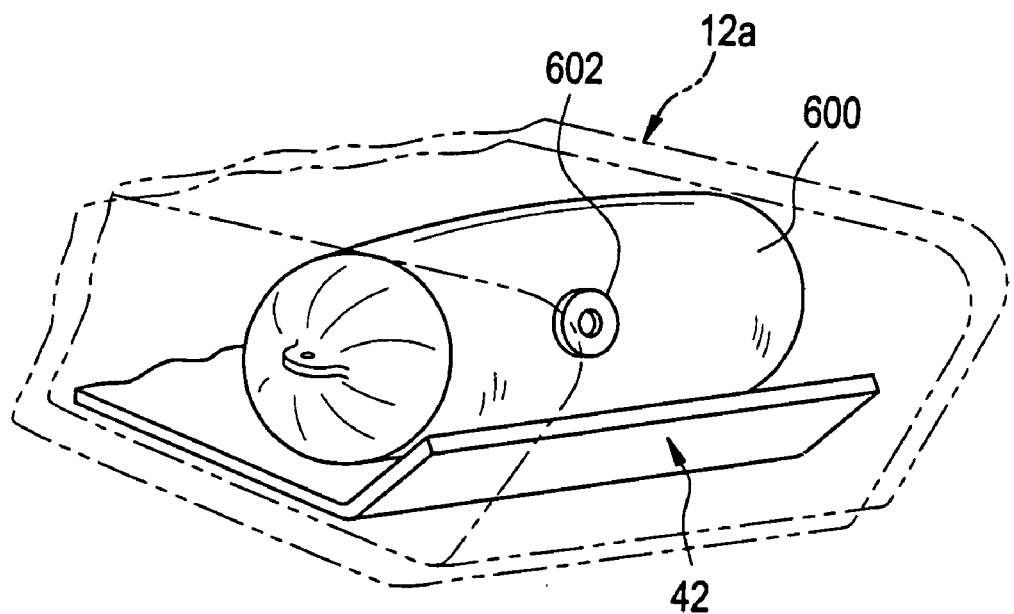
FIG. 44 is a perspective view of the air belt portion of the passenger protecting apparatus comprising a shock-absorbing mechanism having a first structure according to an embodiment of the present invention.

The air belt 600 shown in FIG. 44 comprises a vent hole 602 for discharging a gas from the air belt 600 when the air belt 600 is inflated in order to prevent the internal pressure of the air belt from excessively increasing. The air belt 600 is disposed at a front central portion of the base plate 42 so as to extend between the base plate 42 and the seat cushion 12a along the width thereof between the left and the right, and the base plate 42 prevents the air belts 600 from moving downward.

The air belt 600 is inflated by the inflator (not shown) for injecting a gas in case of emergency such as a collision of the vehicle so as to push up the seat cushion 12a from below or compress and harden the portion of the seat cushion 12a abutting against the air belt 600 from below, thereby supporting the passenger via the seat cushion 12a and preventing a submarine phenomenon of the passenger.

In this case, since a gas in the air belt is discharged from the vent hole 602 so as to prevent the internal pressure of the air belt from excessively increasing, even when the passenger bumped against the seat cushion 12a with a large impactive force, the air belt 600 sufficiently absorbs the impactive force to protect the passenger.

Though it is not shown, the air belt 600 may be provided with valve means at the vent hole 602 for opening the vent hole 602 when the gas pressure reaches or exceeds a prescribed value, so as to prevent irregular discharge of a gas from the vent hole 602. The position of the vent hole is not limited to the position shown in FIG. 44, but the vent hole may be disposed for example at the connecting portion between the air belt 600 and the inflator for inflating the air belt 600. In this case as well, the vent hole may be provided with said valve means.

Figure 45:
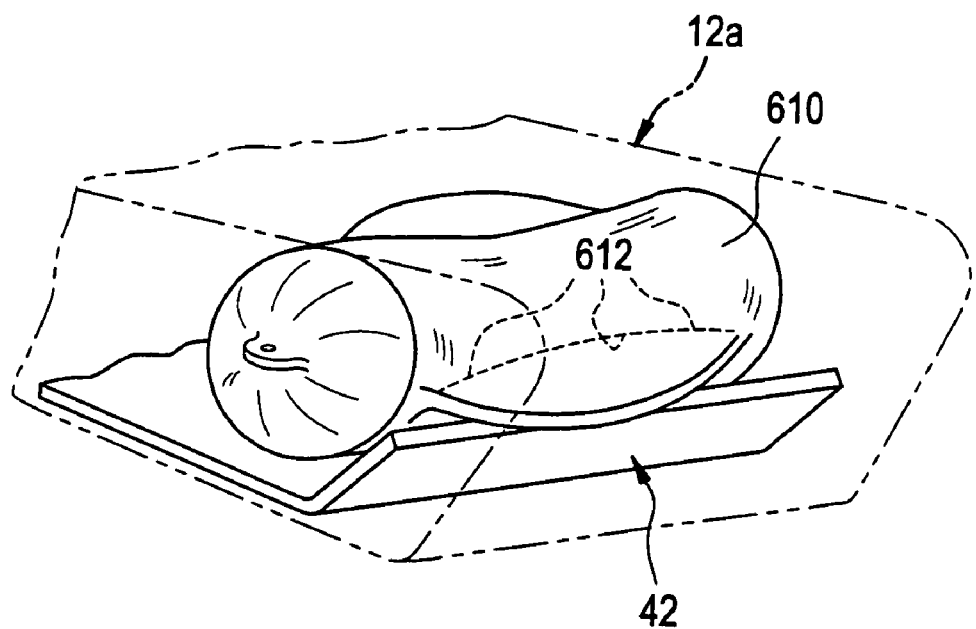
FIG. 45 is a perspective view of the air belt portion of the passenger protecting apparatus comprising a shock-absorbing mechanism having a second structure according to an embodiment of the present invention.

The air belt 610 shown in FIG. 45 is an embodiment in which a part of the air belt is seamed by a tear seam 612 to limit the configuration of the air belt 610 in the inflated state. The tear seam 612 is formed by partially seaming the air belt 610 with a thread that is to be broken when the internal pressure of the air belt reaches or exceeds a prescribed value, and limits the deployed configuration of the air belt 610 in the inflated state so as to decrease the volume of the air belt 610. When the internal pressure of the air belt reaches or exceeds the prescribed value when inflated, the seamed portion is released by breakage of the thread and thus allows the air belt to increase in volume.

The air belt 610 extends between the base plate 42 and the seat cushion 12a and is inflated by the injection of a gas from the inflator (not shown) to prevent a submarine phenomenon of the passenger as in the case of the air belt 600. When the passenger bumped against the air belt 610 via the seat cushion 12a with a very large impactive force, the air belt 610 is pressurized by the impactive force and thus the internal pressure of the air belt increases. When the internal pressure of the air belt reaches or exceeds a prescribed value, the tear seam 610 is broken and allows the air belt 610 to increase in volume. At this time, since increase in volume of the air belt 610 prevents the internal pressure from excessively increasing, this air belt 610 can absorb the large impactive force sufficiently and protect the passenger.

Figure 46:
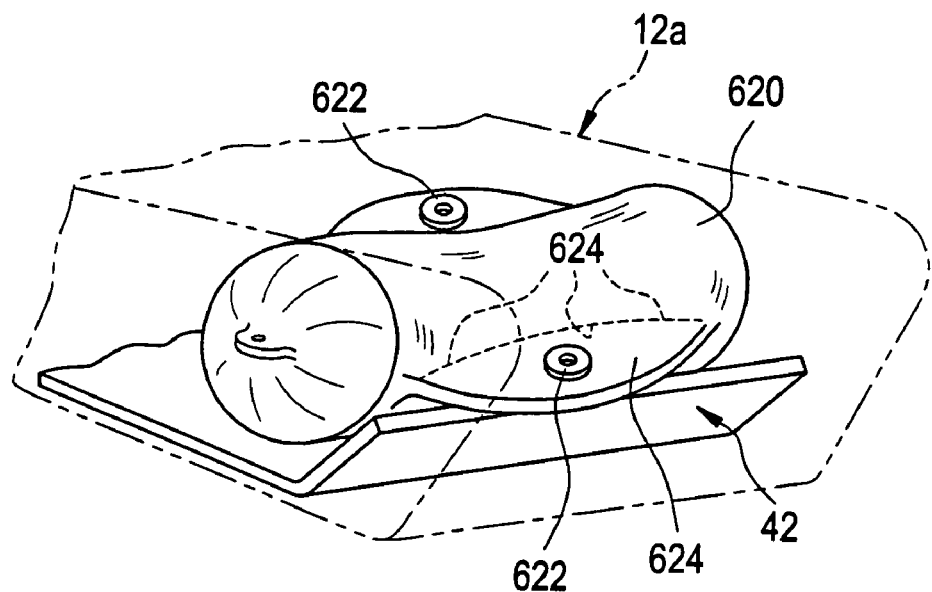
FIG. 46 is a perspective view of the air belt portion of the passenger protecting apparatus comprising a shock-absorbing mechanism having a third structure according to an embodiment of the present invention.

The air belt 620 shown in FIG. 46 is provided with a vent hole 622 as in the case of the vent hole 602 of the air belt 600 described above, and partially seamed so as to close the vent hole 622 by a tear seam 624.

The tear seam 624 is, as in the case of the tear seam 612 of the air belt 610 described above, formed by partially seaming the air belt 620 with a thread that is to be broken when the internal pressure of the air belt reaches or exceeds the prescribed value and limits the deployed configuration of the air belt 610 so as to reduce the volume of the air belt in the state of being inflated. In this embodiment, the tear seam 624 joins the peripheral portion of the vent hole 622 so as to close the vent hole 622. When the internal pressure of the air belt reaches or exceeds the prescribed value, the tear seam 624 is broken and releases the jointed portion of the air belt 620 to allow the air belt to increase in volume and open the vent hole 622.

In the air belt 620 in this arrangement, when the internal pressure of the air belt is at or below a prescribed value upon inflation of the air belt, the vent hole 622 is not opened, and thus a gas is not discharged irregularly from the air belt 620. Therefore, the air belt 620 is inflated quickly and supports the passenger immediately, and prevents a submarine phenomenon of the passenger. When the passenger pressurized the air belt 620 with a very large impactive force and thus the internal pressure of the air belt reaches or exceeds a prescribed value, the tear seam 624 is broken and the joined portion of the air belt 620 by the tear seam 624 is released to allow the air belt 620 to increase in volume, and the internal pressure decreases with this increase in volume. When the joined portion of the air belt 620 is released, the vent hole 622 is released as well, and thus a gas can be discharged from the air belt 620 so that the internal pressure of the air belt is prevented from excessively increasing. Therefore, the air belt 620 can satisfactory absorb the impactive force to protect the passenger.

Figure 47:
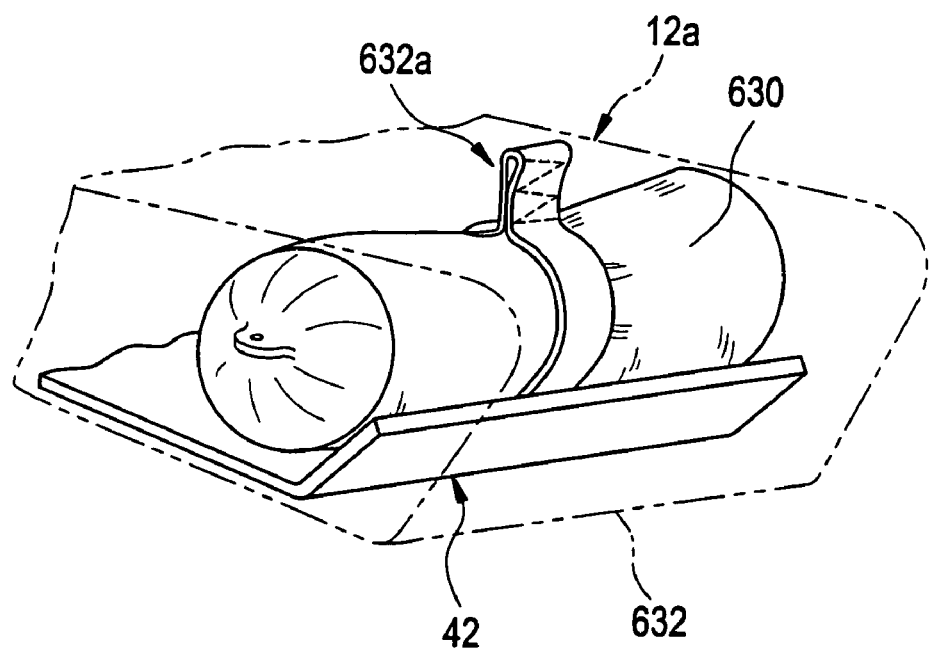
FIG. 47 is a perspective view of the air belt portion of the passenger protecting apparatus comprising a shock-absorbing mechanism having a fourth structure according to an embodiment of the present invention.

The air belt 630 shown in FIG. 47 limits the deployed configuration in the state of being inflated by means of a loop strap 632 wound circumferentially around the air belt at about the midway along the length thereof.

The loop strap 632 has a seamed portion 632b formed by seaming a portion of the strap with another portion of the strap so that the length of the loop is reduced with a thread that is to be broken when a prescribed tensile strength is applied, and the air belt 630 wound by the strap 632 around thereof is narrowed by the strap 632 at the mid section thereof and reduced in volume when the internal pressure of the air belt is at or less than the prescribed value in the state of being inflated. The strap 632 is released by breaking the thread at the seamed portion 632a when the internal pressure of the air belt reaches or exceeds a prescribed value, and thus the length of the loop is increased and allows the air belt 630 to increase in volume.

With the air belt 630 having a strap 632 in this arrangement, when the air belt 630 is pressurized by the passenger with a very large impact force when the air belt is inflated, the thread at the seamed portion 632a is broken and thus the loop of the strap 632 is increased in length and thus the air belt 630 is increased in volume, thereby reducing the internal pressure of the air belt, and therefore the impactive force is absorbed.

The shock-absorbing mechanism as described above can be provided for the air belt used as a power source of the lowering means for the buckle or the lap anchor of the seat belt apparatus.

For example, in the air belt 320 comprising a mesh webbing 324 and the inflatable tube 322 described above, a shock-absorbing mechanism as described above may be provided for the inflatable tube 322, though not shown in the figure.

In the air belt 320 comprising such a shock-absorbing mechanism, when the air belt is inflated and the length of the air belt 320 is reduced thereby pulling down the buckle 18 or the lap anchor 20 via the power transmission mechanism with the shrinking force of the air belt 320 as a power source to apply a pretension to the seat webbing, and then the passenger bumped against the seat belt webbing with a very large impactive force, the impactive force abruptly pulls up the buckle 18 or the lap anchor 20 and the force of the buckle 18 or the lap anchor 20 in the pulling-up direction is transmitted to the air belt 320 via the power transmission mechanism to pull the mesh webbing 324 of the air belt having shrunk along its length due to inflation of the air belt in the expanding direction so that the circumference thereof is narrowed and the inflatable tube 322 covered by the webbing 324 is pressed to increase the internal pressure abruptly.

In this case, when the internal pressure of the air belt reaches or exceeds the prescribed value, the shock-absorbing mechanism described above provided on the inflatable tube 322 is actuated and the internal pressure of the air belt 320 is lowered or is prevented from excessively increasing so as to allow the longitudinal elongation with a adequate internal pressure maintained. As a result, the buckle 18 or the lap anchor 20 connected to the air belt 320 via the power transmission mechanism can be moved in the pulling-up direction by the impactive force applied by the passenger while receiving an adequate drag, so that the impactive force can be absorbed.

The structure of the air belt having a shock-absorbing mechanism may be applied not only to the case where the air bag is used as a power source for the lowering means for the buckle or the lap anchor of the seat belt apparatus, but also to the case where the air bag shown in other embodiment is used as a power source for other mechanism.

When the air belt is used as a power source for the pulling down means for said buckle or the lap anchor, the shock-absorbing mechanism may be provided also for the power transmission mechanism that connects the air belt and the buckle or the lap anchor and transmits the shrinking force of the air belt to pull down these buckle or the lap anchor. Referring now to FIG. 48 to 61, the passenger protecting mechanism having a power transmission mechanism including such a shock-absorbing mechanism will be described.

Figure 48:
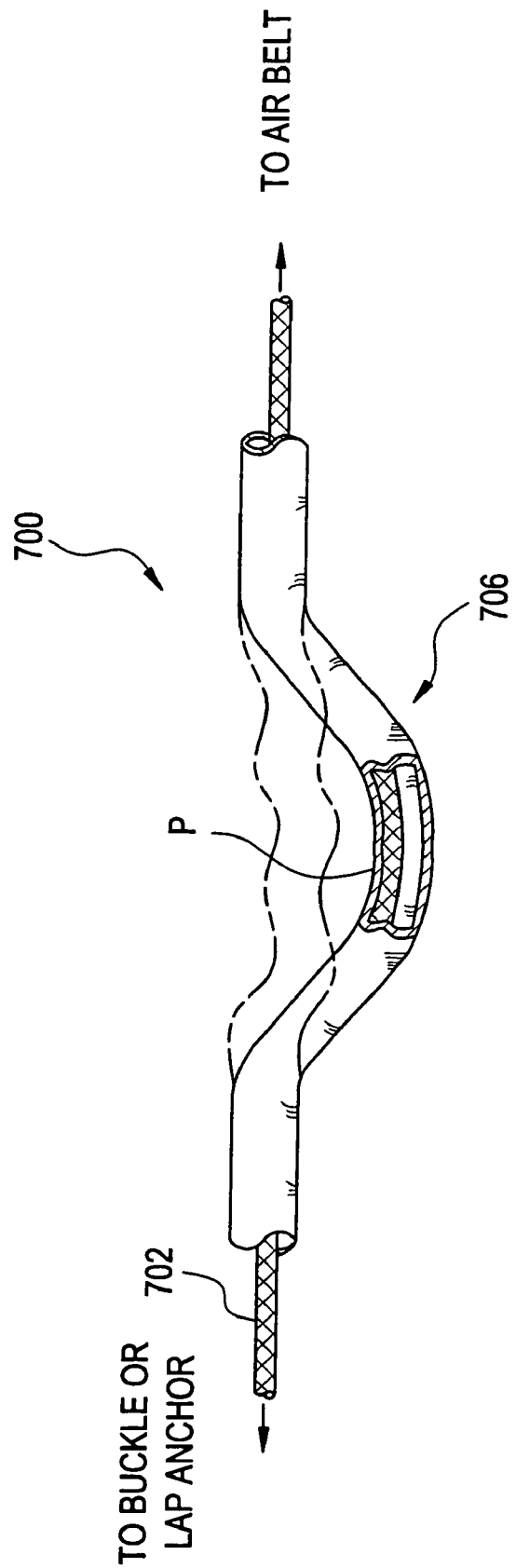
FIG. 48 is an explanatory drawing showing a first structural example of the power transmission mechanism comprising a shock-absorbing mechanism according to an embodiment of the present invention.

FIG. 48 is a view of the first structure of the power transmission mechanism including a shock-absorbing mechanism according to the embodiment partly in cross section.

The power transmission mechanism 700 shown in FIG. 48 is constructed in such a manner that the air belt (not shown) and the buckle or the lap anchor (both not shown) of the seat belt apparatus are connected via a wire 702, and the shrinking force of said air belt in the direction of the length generated when inflated is transmitted via the wire 702 to said buckle or the lap anchor so that the buckle or the lap anchor is pulled down. The mid section of the wire 702 is inserted into the tubular guide column 704 deformable by the load not less than a prescribed value and guided from said air belt along the side of the seat (not shown) to said buckle or the lap anchor by the guide column 704.

On the mid section of the guide column 704, there is formed a curved portion 706 curved downward (downward in FIG. 48) into a generally U-shape. The wire 702 inserted into the guide column 704 is curved along he curved portion 706, and thus the distance between both ends of the wire 702 extending from the guide column 704 of the wire 702. The guide column 704 is constructed in such a manner that when the wire 702 inserted into the guide column is applied with a tensile strength not less than a prescribed value, the upper portion P of the inner peripheral surface at the curbed portion 706 is pressed upward (upward direction in FIG. 48) by the wire 702, and deforms as if the path at the curved portion 706 is shortened as shown in dot dash line in FIG. 48. Along with deformation of the guide column 704 in this way, the wire 702 is pulled out from the guide column 704 by the length corresponding to the shortened length of the path of the guide column 704 while receiving a drag in association with this deformation, so as to allow the distance between both ends to be increased.

In the power transmission mechanism 700, the curved portion 706 of the guide column 704 functions as a shock-absorbing mechanism. In other word, when the air belt is inflated and decreased in length, thereby pulling down the buckle or the lap anchor via the power transmission mechanism 700 to apply a pretension to the seat belt webbing, and then the passenger bumped against said seat belt webbing with a large impactive force, the impactive force abruptly pulls the bent hole or the lap anchor connected to the power transmission mechanism upward (in the pulling-up direction) to apply a tensile strength not less than a prescribe value to the wire 702, which deforms the curved portion 706 of the guide column 704 as described above. As a consequent, said buckle or the lap anchor is allowed to move in the pulling-up direction by the wire that can afford to be pulled out by the length corresponding to the length that the path of the guide column 704 is shortened, so that the impactive force applied by the passenger is absorbed.

In this embodiment, the structure of the guide column being formed with a curved portion is not limited thereto. For example, as a power transmission mechanism 700A shown in FIG. 49, a guide column 704A in generally recessed shape having a pair of curved portions 706A, 706B and extending along the lower side of the seat (not shown) at the mid section thereof may be used.

Figure 49:
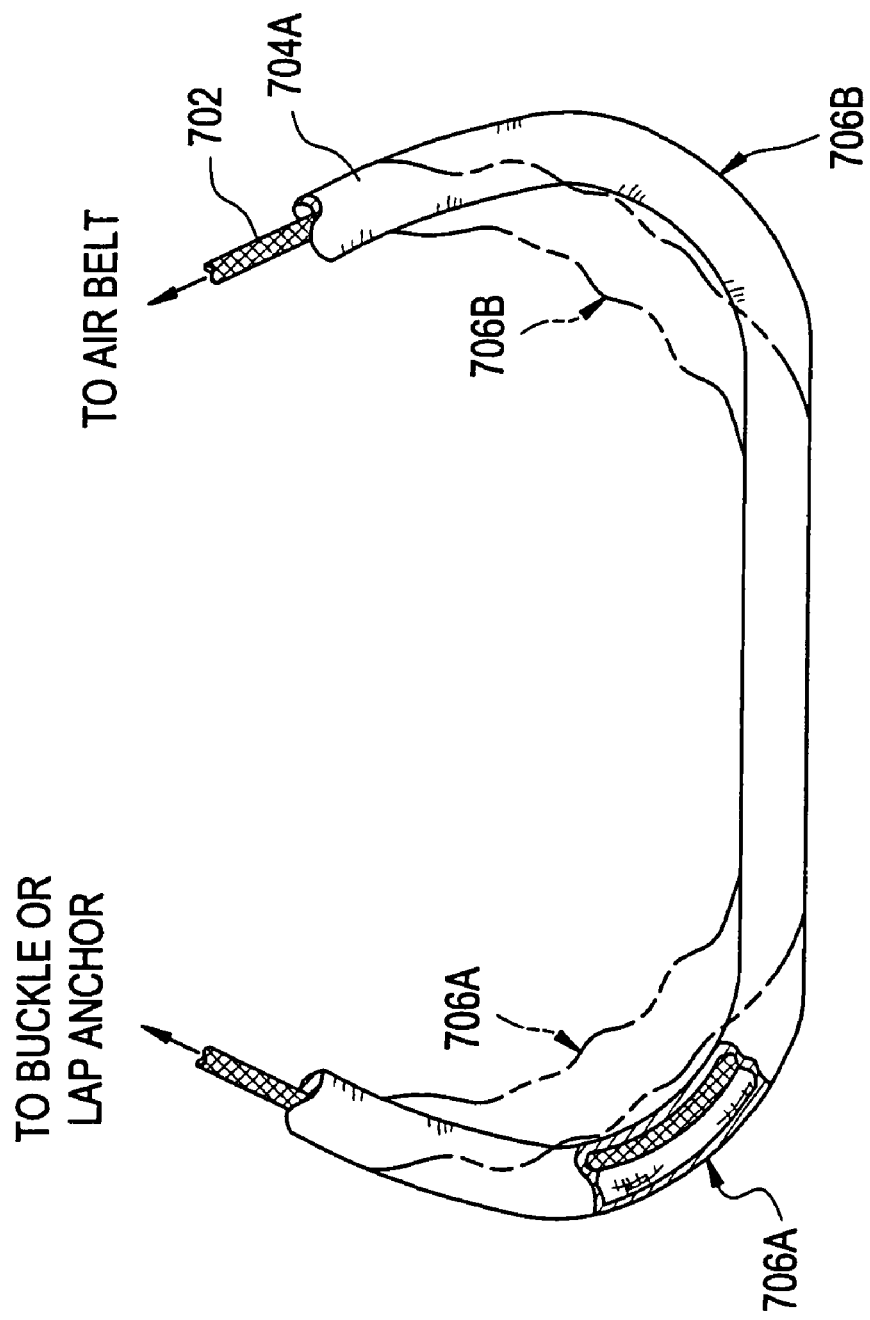
FIG. 49 is an explanatory drawing showing a second structural example of the power transmission mechanism comprising a shock-absorbing mechanism according to an embodiment of the present invention.

In the guide column 704A, the curved portions 706A, 706B provided on both side thereof deforms so as to shorten the length as shown by dot dash line in FIG. 49 when a tensile strength not less than a prescribed value is applied to the wire 702 inserted therein as in the case of the curved portion 706 of the guide column 704 described above.

In the power transmission mechanism 700A provided with a guide column 704A in this arrangement, these curved portions 706A, 706B function as shock-absorbing mechanism respectively to protect the passenger.

FIG. 50 is a front view showing another structure of the power transmission mechanism provided with a shock-absorbing mechanism according to this invention.

The power transmission mechanism 710 shown in FIG. 50 is constructed in such a manner that the air belt (not shown) and the buckle or the lap anchor (both not shown) is connected via a wire 712 as in the case of the power transmission mechanism 700, the shrinking force of the air belt in the direction of the length generated when inflated is transmitted to said buckle or the lap anchor by the wire 712 so that the buckle or the lap anchor is pulled down. The mid section of the wire 712 is engaged with the pulley 714 and 716 so as to be guided from said air belt to said buckle or the lap anchor along the side surface of the seat (not shown).

The pulleys 714, 716 are rotatably supported in a prescribed direction respectively by the axes of rotations 714a, 716a, respectively. On the side frame 420 provided along the side of the base plate 42 (not shown), there is formed guide holes 718, 720 in the form of a pair of elongated openings both inclined respectively from the ends closer with respect to each other downwardly the other ends, with which the axes of rotation 714a, 716a are engaged respectively. The axes of rotation 714a, 716a can move along these guide holes 718, 720 in parallel to itself without being detached from the guide holes 718, 720 with which they are engaging respectively.

The guide holes 718, 720 are provided with a deformable member 722, 724 that functions in such a manner that when the pressing force from each axis of rotation 714a, 716a is not more than a prescribed value, these axes of rotation 714a, 716a are engaged with the diagonally lower end of the guide holes 718, 720 respectively, and when pressed by these axes of rotation 714a, 716a toward the upper ends of the guide holes 718, 720 by a pressing force not less than a prescribed value, it is deformed by this pressing force so as to be backed off toward the upper ends of the guide holes 718, 720 (in the direction shown by the arrows U1, U2 in FIG. 50) to allow these axes of rotation 714a, 716a to move to the diagonally upper ends of the guide holes 718, 720 (to move in the directions shown by the arrows U1 and U2).

One end of the wire 712 is connected to said air belt and routed under and engaged with the pulleys 714, 716 supported by the axes of rotation 714a, 716a, thereby being guided from said air belt to said buckle or the lap anchor, and the other end thereof is connected to said buckle or the lap anchor.

In the passenger protecting apparatus in which the air belt and the buckle or the lap anchor is connected by the power transmission mechanism 710, when said air belt is inflated and decreased in length, thereby pulling down the buckle or the lap anchor via the wire guided by the pulleys 714, 716 to apply a pretension to the seat belt webbing, and then the passenger bumped against said seat belt webbing with a large impactive force, the impactive force abruptly pulls up (in the pulling-up direction) the buckle or the lap anchor and thus the wire 712 connected to said buckle or the lap anchor strongly pulls up each pulley 714 and 716 in the directions shown by the arrow U1 and U2. When the pulling-up force applied by the wire 712 to the pulleys 714, 716 reaches or exceeds a prescribed value, in other words, when the axes of rotation 714a, 716a support the pulleys 714, 716 respectively, and engaged at the diagonally lower end of the guide holes 718, 720 respectively by the deformable members 722, 724 press these deformable members 722, 724 in the directions shown by the arrows U1, U2 with a pressing force not less than a prescribed value, these deformable members 722, 724 is deformed by a pressing force from the axes of rotation 714a, 716a so as to be backed off toward the diagonally upper end of the guide holes 718, 720, so that each axis of rotation 714a, 716a can be moved along the guide holes 718, 720 in the directions shown by the arrows U1, U2.

Since the pulleys 714 and 716 supported by these axes of rotation 714a, 716a move upward in the directions of the arrows U1, U2 respectively toward each other while receiving a drag from each deformable member in association with the deformation, the path of the wire 712 guided by these pulleys 714, 716 is shortened and thus the wire 712 allows said buckle or the lap anchor to move in the pulling-up direction by the length corresponding to the length of the path shortened. As a consequent, the buckle or the lap anchor is allowed to move gradually in the pulling-up direction while receiving a drag in association with deformation of said deformable members 722, 724, thereby absorbing the impactive force applied by the passenger and thus protecting the passenger.

In this embodiment, the structure of said deformable members 722, 724 is not limited, but any deformable member that deforms accompanied by a prescribed drag when a pressing force not less than a prescribed value from the axes of rotation 714a, 726a supporting the pulleys 714, 716, and allows said axes of rotation 714a, 716a can move diagonally from the lower end toward the upper end of the corresponding guide holes 718, 720 may be employed.

Figure 51A:
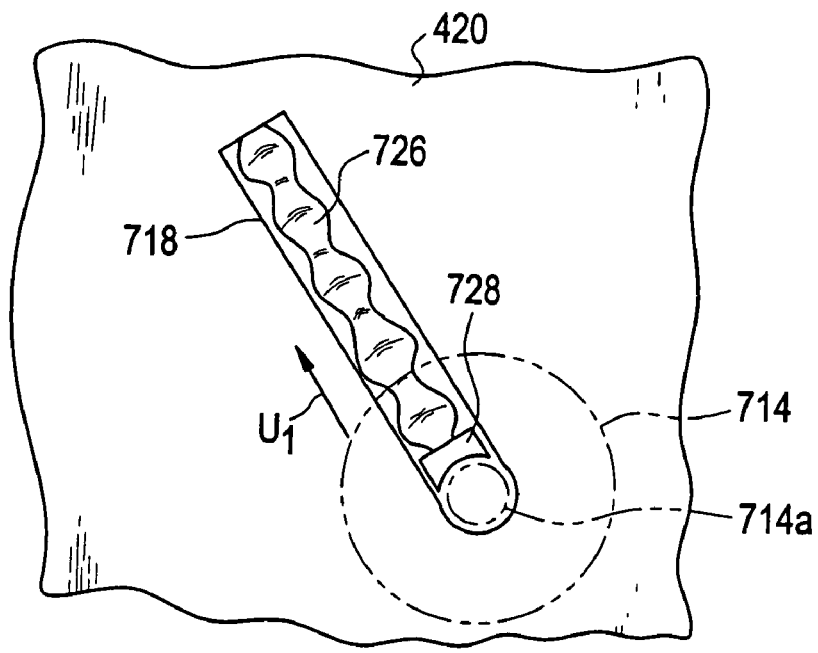
FIG. 51 is an explanatory drawing showing the first structural example of the guide hole portion of the power transmission mechanism shown in FIG. 44.
Figure 51B:
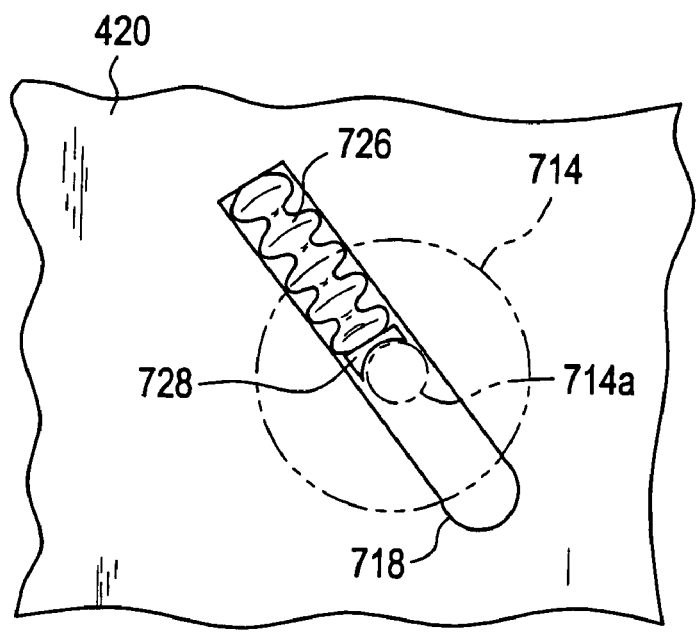

For example, FIG. 51 shows a structure in which a corrugate pipe 726 is used as a deformable member. In FIG. 51, (a) is an enlarged view of the guide hole 718 before deformation of the corrugate pipe 726, and (b) is an enlarged view of the guide hole 718 after deformation of the corrugate pipe 726.

In FIG. 51, the corrugate pipe 726 is placed within the guide hole 718, one end of which abuts the surface of the diagonally upper end of the guide hole 718, and the other end of which abuts the bearing member 728 disposed along the guide hole 718 so as to be able to move in parallel to itself to engage the axis of rotation 714a of the pulley 714 to the diagonally lower end of the guide hole 718.

When the axis of rotation 714a presses the corrugate pipe 726 in the directions shown by the arrows U1, U2 at a force not less than a prescribed value, as shown in FIG. 51(*b*), the corrugate pipe 726 is contracted toward the diagonally upper end of the guide hole 718 diagonally so that the axis of rotation 714a moves gradually along the guide hole 718 in the direction shown by the arrow U1 while receiving a drag from the corrugate pipe 726 accompanied by deformation thereof.

Figure 52A:
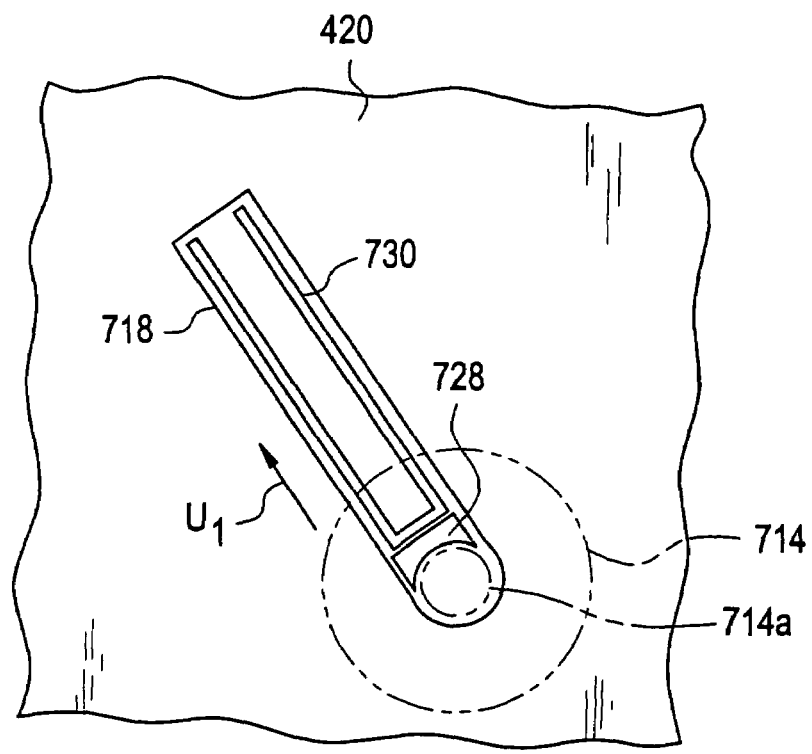
FIGS. 52a and 52b are explanatory drawings showing the second structural example of the guide hole portion of the power transmission mechanism shown in FIG. 44.
Figure 52B:
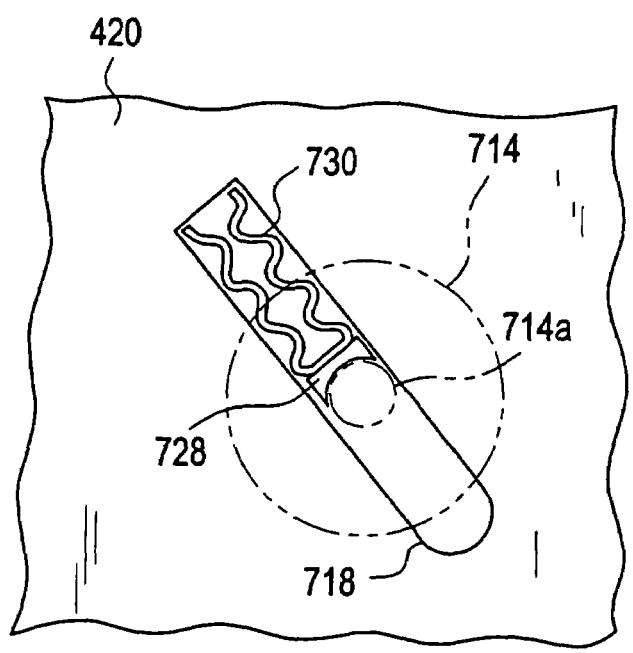

FIG. 52 shows a structure in which a band-shaped metal 730 is used as a deformable member instead of the corrugate pipe 726. In FIG. 52, (a) is an enlarged view of the guide hole 718 before the band-shaped metal 730 is deformed, and (b) is an enlarged view of the guide hole 718 after the band-shaped metal 730 is deformed.

The band-shaped metal 730 is disposed in the guide hole 718 and square in cross section with one end open. The rear end of the band shaped metal abuts against the diagonally upper end surface of the guide hole 718 and the tip abuts against the bearing member 728 so that the axis or rotation 714a is engaged with the diagonally lower end of the guide hole 718 as in the case of the corrugate pipe 726 described above.

When the axis of rotation 714a pressed the band-shaped metal 730 with a pressing force not less than a prescribed value in the direction shown by the arrow U1, as shown in FIG. 52(*b*), the band-shaped metal 730 deforms diagonally upward along the guide hole 718 so as to be crashed, and the axis of rotation 714a is allowed to move gradually in the direction shown by the arrow U1 along the guide hole 718 while receiving a drag from the band-shaped metal 730 accompanied by deformation thereof.

Figure 53A:
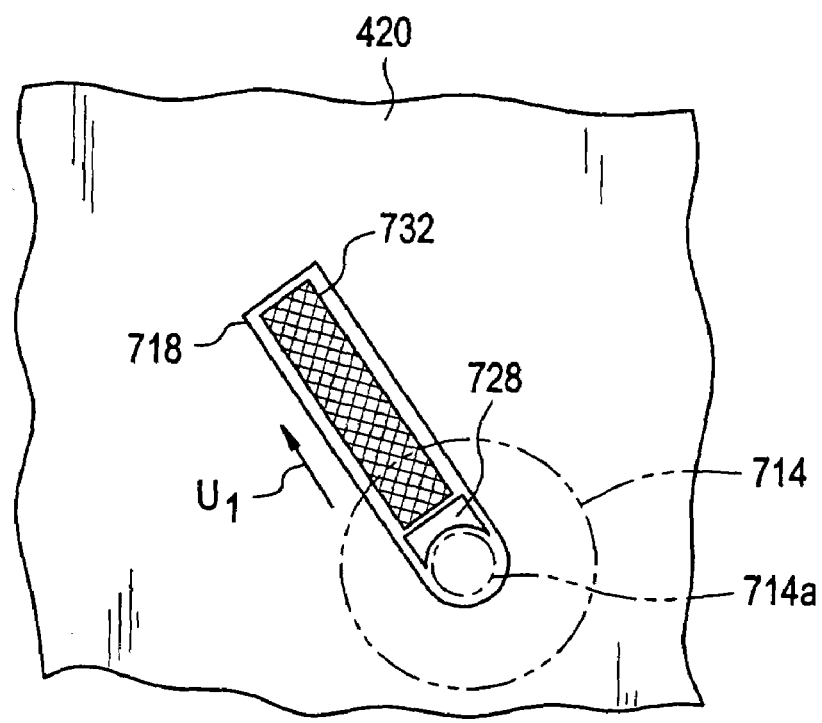
FIGS. 53a and 53b is an explanatory drawing showing the third structural example of the guide hole portion of the power transmission mechanism shown in FIG. 44.
Figure 53B:
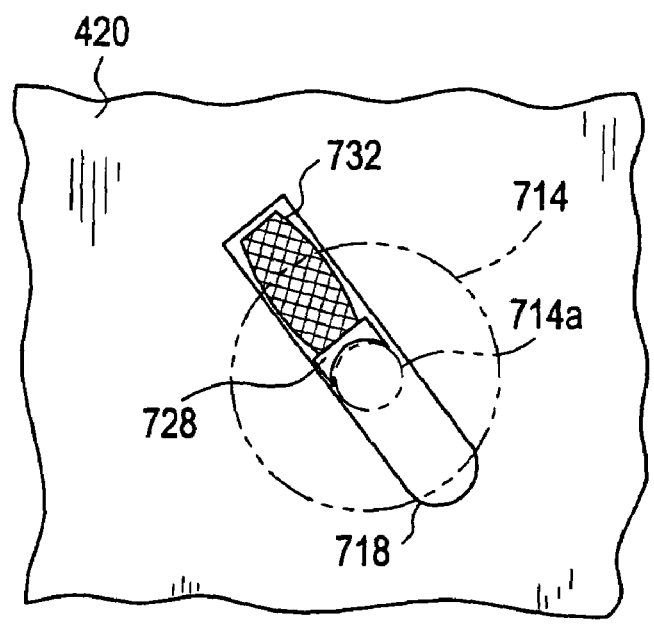

FIG. 53 shows a structure using a metal lath as a deformable member. In FIG. 53, (a) is an enlarged view of the guide hole 718 before the metal lath 732 is deformed, and (b) is an enlarged view of the guide hole 718 after the metal lath 732 is deformed.

The metal lath 732 is formed in a cylindrical shape and the rear end thereof abuts against the diagonally upper end surface of the guide hole 718, and the tip thereof abuts against the bearing member 728 so that the axis of rotation 714a is engaged at the diagonally lower end of the guide hole 718 as in the cases of the corrugate pipe 726 and the belt-shaped metal 730 described above.

When the axis of rotation 714a presses the metal lath 732 in the direction of the arrow U1, as shown in FIG. 47(b), the metal lath 732 deforms so as to be contracted in the axial direction, and the axis of rotation 714a is allowed to move gradually in the direction shown by the arrow U1 along the guide hole 718 while receiving a drag from the metal lath 732 accompanied by deformation thereof.

In the embodiments described above, though the deformable members to be placed in the guide hole 718 and limits the movement of the axis of rotation 714a in the guide hole 718 in the direction shown by the arrow U1 are shown as examples, it is also possible to apply the same structures to the deformable members to be placed in the guide hole 720 on the opposite side from this guide hole 718 as a matter of course.

Figure 54:
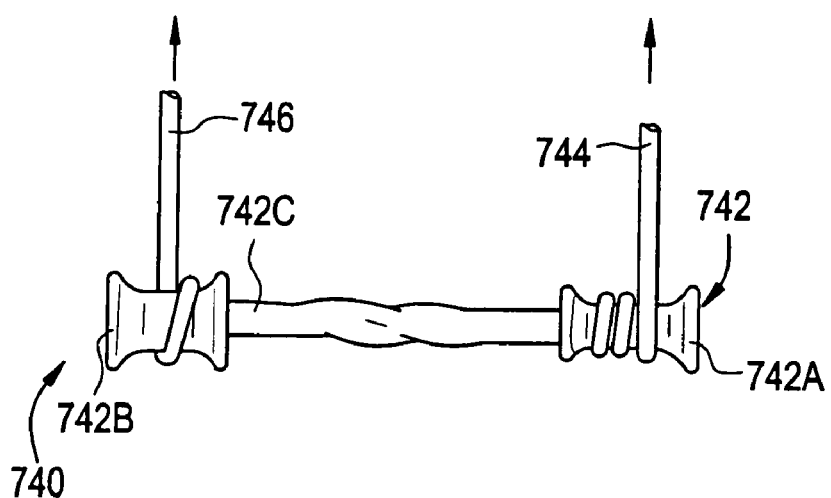
FIG. 54 is an explanatory drawing showing the fourth structural example of the power transmission mechanism comprising a shock-absorbing mechanism according to an embodiment of the invention.

FIG. 54 is a front view showing the fourth structural example of the power transmission mechanism having a shock-absorbing mechanism according to an embodiment of the invention.

The power transmission mechanism 740 shown in FIG. 54 has a structure in which the air belt (not shown) and the buckle or the lap anchor (both not shown) are connected via the rotatable body 742.

The rotatable body 742 comprises one of the pulleys 742A on which one end of a first wire 744, of which the other end is connected to said air belt, is wound, the other pulley 742B on which one end of the second wire 746, of which the other end is connected to the lower portion of said buckle or the lap anchor, is windably connected, and a shaft 742C for coaxially connecting this pair of pulleys 742A, 742B so as to rotate integrally, wherein when said air belt is inflated and decreased in length upon collision of the vehicle, the end of the first wire 744 connected to the air belt is pulled by the air belt and the pulley 742A rotates so that the other end of the first wire 744 is unwound from said pulley 742A by the length corresponding to the shrinkage of the air belt, and the other pulley 742B that rotates integrally with the pulley 742A via the shaft 742C winds the second wire 746 to pull down said buckle or the lap anchor to apply a pretension to the seat belt webbing.

In this power transmission mechanism 740, a shaft 742C for connecting the pair of pulleys 742A and 742B of the rotatable body 742 comprises a torsion bar that is resiliently twisted by being applied with a torsional moment not less than a prescribed value around the axis thereof to allow generation of the phase difference between the pulleys 742A and 742B by rotating relatively in the reverse directions.

In the passenger protecting apparatus comprising a power transmission mechanism 740 in this arrangement, when the passenger bumped against the seat belt webbing in the state of being applied with a pretension as described above with a very large impactive force, said buckle or the lap anchor pulled down in order to apply a pretension to said seat belt webbing is abruptly pulled upward (pulling-up direction), and a strong torsional moment is applied to the roller 742B wound the other end of the second wire 746 connected to said buckle or the lap anchor in the direction to unwind the wire 746 from the roller 742B.

In this case, the roller 742A on the opposite side of the roller 742B is being applied via the first wire 744 with a strong torsional moment in the direction opposite from the direction to unwind the wire 746 around the axis of the shaft 742C, and thus a very large torsional moment is generated on the shaft 742C connecting these pulleys 742A, 742B. When the torsional moment is reaches or exceeds a prescribed value, as described above, the shaft 742C is resiliently twisted so as to allow the rotation of the roller 742B in the direction to unwind said wire 746.

As a result, in the passenger protecting apparatus in which the air belt and buckle or the lap anchor is connected by the power transmission mechanism 740, said buckle or the lap anchor is allowed to move gradually in the pulling-up direction while receiving a drag due to a resilient force of the shaft 742C, so that the impactive force applied by the passenger is absorbed.

Figure 55:
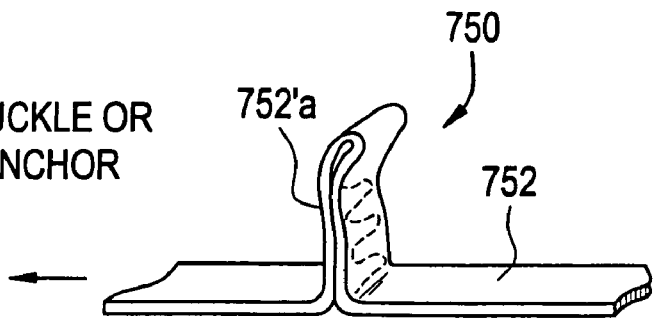
FIG. 55 is an explanatory drawing showing the fifth structural example of the power transmission mechanism comprising a shock-absorbing mechanism according to an embodiment of the invention.

FIG. 55 is a perspective view showing the fifth structural example of the power transmission mechanism comprising a shock-absorbing mechanism of an embodiment of the invention.

The power transmission mechanism 750 shown in FIG. 55 has a structure in which the air belt (not shown) and the buckle or the lap anchor (both not shown) are connected by a webbing 752 formed of a band-shaped cloth, for example, a cloth material that is the same as the material used as a seat belt webbing.

At the mid section of the webbing 752, a seamed portion 752a formed by joining a part thereof to another part thereof by seaming in order to reduce the length of the webbing 752.

For forming the seamed portion 752a, a thread that is to be broken by a tensile strength not less than a prescribed value to release the seam thereof is used.

In the passenger protecting apparatus having such a power transmission mechanism 750, the seamed portion 752a of the webbing 752 functions as a shock-absorbing mechanism. In other words, when said air belt is inflated and decreased in length, thereby pulling down the buckle or the lap anchor via the webbing to apply a pretension to the seat belt webbing, and then the passenger bumped against said seat belt webbing with a large impactive force, the impactive force abruptly pulls said buckle or the lap anchor upward (in the pulling-up direction) to apply a tensile strength not less than a prescribed value to the webbing 752, which breaks the thread of the seamed portion 752a and release the seam of the seamed portion 752a, thereby increasing the length of the webbing 752 and allowing said buckle or the lap anchor to move in the pulling-up direction. As a consequent, said buckle or the lap anchor moves in the pulling-up direction while receiving a drag accompanied by breakage of the thread at the seamed portion 752a so that the impactive force applied by the passenger is absorbed.

FIG. 56 is an explanatory drawing showing the sixth structural example of the power transmission mechanism comprising a shock-absorbing mechanism according to an embodiment of the invention. In FIG. 56, (a) is a cross sectional view of the connecting member 766 connecting a first and a second wires 762, 764 described later, (b) is a cross sectional view of the deformable member 772 provided on the connecting member 766 when deformed, and (c) is a cross sectional view taken along the line C—C in Fig. (a).

The power transmission mechanism 760 shown in FIG. 56 comprises a first wire 762 one end of which is connected to the air belt (not shown), a second wire 764 one end of which is connected to the buckle or the lap anchor (both not shown), and a connecting member 766 for connecting said wires 762 and 764.

In this power transmission mechanism 760, one end of the first wire 762 is connected to said air belt, and the other end thereof is inserted into the generally cylindrical connecting member 766 through a insertion hole 768 formed at one end thereof. The second wire 764 is connected to said buckle or the lap anchor at one end, and is inserted through the insertion hole into the connecting member 766 at the other end.

The generally cylindrical connecting member 766 is formed with flanges 766a, 766b enclosing the insertion holes 768 and 770 respectively in the inner periphery on both ends. The connecting member 766 is also provided with a deformable member 772 having the same structure as the deformable member 722, 724 of the power transmission mechanism 710 shown in FIGS. 50–53 described above and deformable by a pressing force not less than a prescribed value so as not to be detached from the connecting member 766 by said flanges 766a and 766b.

In this embodiment, as shown in FIG. 56, a corrugate pipe is provided as a deformable member 772, one end of which abuts against said flange 766a so as to enclose the insertion hole 768 and the other end of which abuts against the clamp 774. The deformable member 772 is constructed in such a manner that when the other end of the deformable member is pressed by the clamp 774 toward said one end thereof with a pressing force not less than a prescribed value, it is longitudinally contracted as if it is compressed between said flange 766a and said clamp 774.

The other end of the first wire 762 inserted into the connecting member from the insertion hole 768 is passed through the deformable member 772 and secured to the clamp 774 being abutted against the other side of the deformable member 772. On the other hand, the end of the second wire 764 inserted from the insertion hole 770 opposed to the insertion hole 768 is secured to the clamp 776 being abutted against said flange 766b from the inside of the connecting member 766.

In the power transmission mechanism 760 in this arrangement, the connecting member 766 functions as a shock-absorbing mechanism. In other words, when said air belt is inflated and decreased in length, thereby pulling down the buckle of the lap anchor via the wires 762, 764 connected by the connecting member 766 to apply a pretension to the seat belt webbing, not shown, and then the passenger bumped against said seat belt webbing with a large impactive force, the buckle or the lap anchor is abruptly pulled upward (in the pulling-up direction) and the first wire 762 connected to said air belt and the second wire 764 connected to said buckle or the lap anchor are strongly pulled away from each other. When the pulling force reaches a prescribed value, the clamp 774 on which the end of the first wire 762 is secured pressurizes the deformable member 772 to contract the deformable member 722 in the axial direction in the connecting member 766 connecting these wires 762, 764. Therefore, said buckle or the lap anchor moves gradually upward (in the pulling-up direction) while receiving a drag from the deformable member accompanied by deformation of the deformable member 772, so that the impactive force applied by the passenger is absorbed.

Figure 57C:
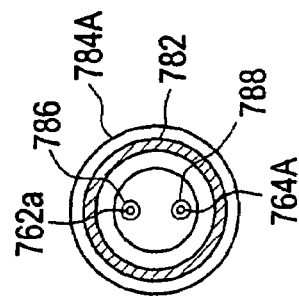
FIG. 57 is an explanatory drawing showing the seventh structural example of the power transmission mechanism comprising a shock-absorbing mechanism according to an embodiment of the invention.
Figure 57A:
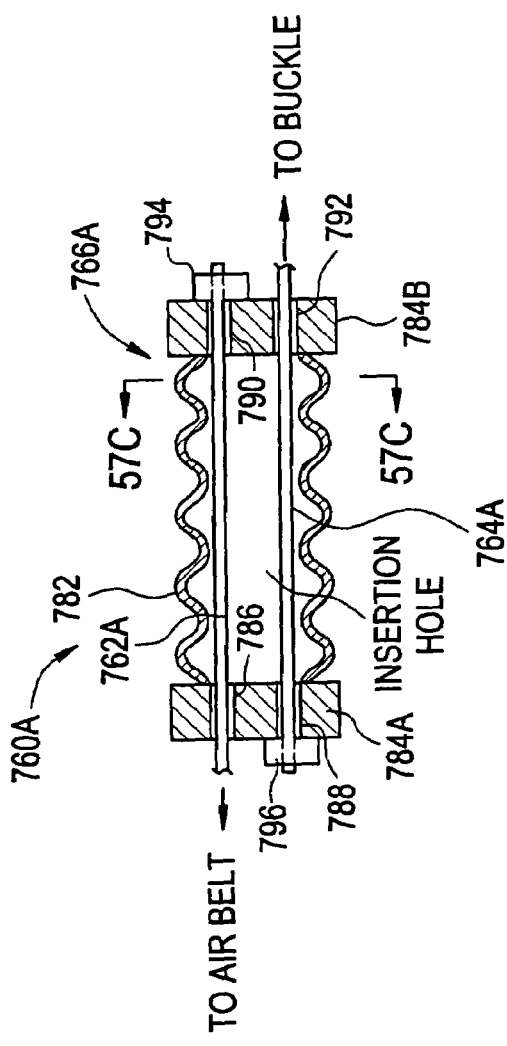
Figure 57B:
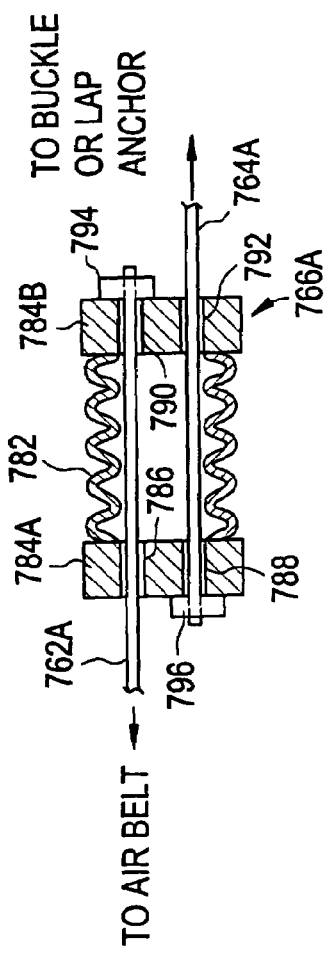

In this embodiment, the connecting member is not limited thereto. For example, in the power transmission mechanism 760A shown in FIG. 57, the connecting member 766A comprises a deformable member 782 formed of a cylindrical corrugate pipe, and a pair of compressively holding members 784A, 784B of a plate shape abutting against both ends of the deformable member. FIG. 57 is an explanatory drawing showing a sixth structural example of the shock-absorbing mechanism according to the embodiment of the invention. In the same figure, (a) is a cross sectional view of the connecting member 766A before said deformable member 782 is deformed, (b) is a cross sectional view of the connecting member 766A after said deformable member 782 is deformed, and (c) is a cross sectional view taken along the line C—C in Fig. (a).

In this connecting member 766A, the compressively holding member 784A is provided with a pair of insertion holes 786, 788 through which a first wire 762A connected to the air belt at one end and a second wire 764A connected to the vent hole or the lap anchor at one end are inserted respectively. The compressively holding member 784B is symmetric with the compressively holding member 784A with the deformable member 782 interposed therebetween, and is formed with a pair of inserting holes 790, 792 through which said first and second wire 762A, 764A are inserted respectively. The deformable member 782 is disposed so that both ends enclose the insertion holes 786 to 792 on the compressively holding member 784A, 784B so as to communicate with each other via the deformable member 782.

The first wire 762A of which one end is connected to said air belt is inserted at the other end through the insertion hole 786 on the compressively holding member 784A abutting against one end of the deformable member 782, introduced within the deformable member 782, and then inserted through the insertion hole 790 on the compressively holding member 784B abutting against the other end of the deformable member 782 so that the first wire 762A is drawn out from the deformable member, and then attaching a clamp 794 on the end of the wire 762A projecting from the insertion hole 790, thereby being engaged with the compressively holding member 784B. On the other hand, the second wire 764A of which one end is connected to said buckle or the lap anchor is inserted at the other end from the inserting hole 792 on the compressively holding member 784B abutted against said the other end of the deformable member into the deformable member 782, inserted into the insertion hole 790 on the compressively holding member 784A opposed to the compressively holding member 784B and drawn out from the deformable member 782, and then attaching a clamp 796 on the end of the wire, thereby being engaged with the compressively holding member 784A.

When the first and the second wires 762A, 764A engaged with the connecting member 766A and connected by said connecting member are pulled away from each other, the wires 762A, 764A attract the corresponding compressively holding members 784B, 784A are attracted with respect to each other, so that the deformable member 782 are pressed so as to be contracted longitudinally from both sides. When a tensile strength for pulling the wire 762A, 764A reaches a prescribed value, the deformable member 782 deforms and is contracted longitudinally, and the distance between both ends of a series of wires 762A, 764A increases by the length corresponding to the length of contraction.

In the power transmission mechanism 760A having a connecting member 766A in this arrangement, the same effect as in the case of the power transmission mechanism 760 described above, and thus the impactive force applied by the passenger may be absorbed in case of emergency.

In the embodiments described above, the deformable member 722, 782 placed in the connecting member 766, 766A respectively may be any deformable member as far as it deforms accompanied by a prescribed drag when a pressing force not less than a prescribed value is applied from the clamp 774 or the compressively holding member. For example, as a deformable member 772 in the power transmission mechanism 760 shown in FIG. 56 described above, it is also possible to use a band-shaped metal 778 of generally square with one side open in cross section as shown in FIG. 58, having a structure as the band-shaped metal 730 shown in FIG. 52 and deforming as shown in FIG. 58(b) by a pressing force from the clamp 774, or as shown in FIG. 58, a metal lath 780 as shown in FIG. 58 having the same structure as the metal lath 732 shown in FIG. 53, deforming as shown in FIG. 58(b) by a pressing force from the clamp 774. In FIG. 52 and FIG. 53, (a) is a cross sectional view of the connecting member 766 of the power transmission mechanism 760, and (b) is a cross sectional view of each deformable member placed in the connecting member 766 when deformed.

Figure 60:
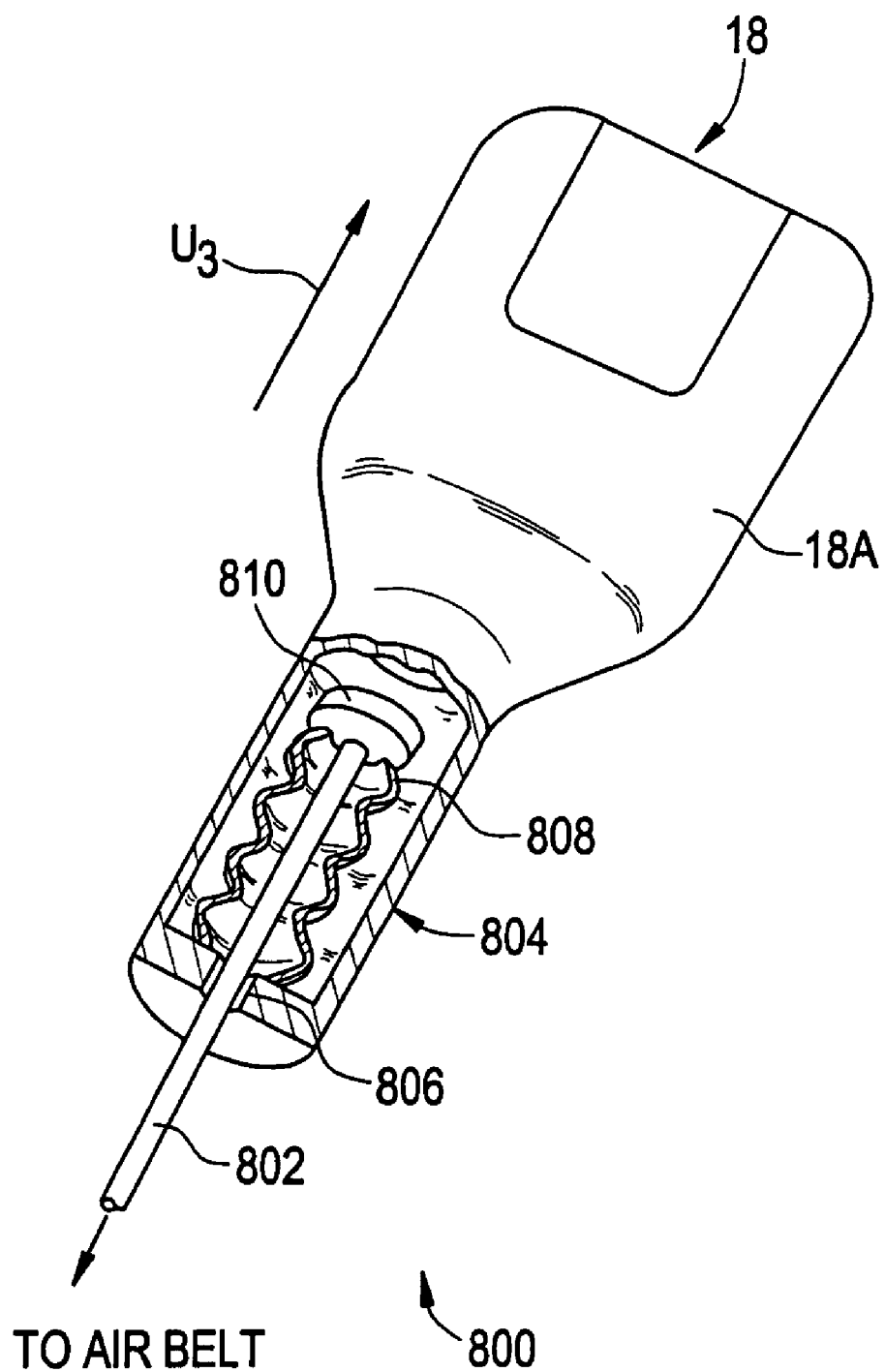
FIG. 60 is an explanatory drawing showing the eighth structural example of the power transmission mechanism provided with a shock-absorbing mechanism according to an embodiment of the invention.

FIG. 60 is a drawing of the eighth structural embodiment of the power transmission mechanism partly in cross-section having a shock-absorbing mechanism according to an embodiment of the invention.

The power transmission mechanism 800 shown in FIG. 60 shows an another embodiment of the power transmission mechanism shown in FIG. 56 described above in which the second wire for connecting the buckle or the lap anchor and the connecting member 766 is omitted, and the connecting member 766 is disposed below the buckle body or the lap anchor body.

In this embodiment, the power transmission mechanism 800 connects the air belt (not shown) and the buckle 18 by the wire 802, so that a shrinking force of the air bag is transmitted via the wire 802 to the buckle 18 to pulling down the buckle 18 so that a pretension is applied to the seat webbing, not shown.

The buckle body 18 of the buckle 18 is provided with a generally cylindrical hollow connecting portion 804 extending from the lower portion thereof. One end of the wire 802 is connected to said air belt, and the other end is inserted into the connecting portion 804 from the inserting hole 806 formed on the end of the connecting portion 804.

In the connecting portion 804, there is provided a deformable member 808 formed of a corrugate pipe, a belt-shaped metal, or metal lath or the like having the same structure as the deformable member used in the power transmission mechanism 760 described above or the like. In this embodiment, a cylindrical corrugate pipe is used as a deformable member 808, and one end of the deformable member 808 abuts against the peripheral edge of the insertion hole 806 so as to enclose the insertion hole 806, and the other end is provided with a clamp 810 abutted thereto. The other end of the wire 802 inserted into the connecting portion 804 from the insertion hole 806 is passed through the cylindrical deformable member 808, then secured to the clamp 810 abutted against the other end of the deformable member 808.

In the passenger protecting apparatus having the power transmission mechanism 800, when the buckle 18 is strongly pulled upward (in the direction shown by the arrow U3), a tensile strength is applied to the wire 802 connected to the buckle 18, and this tensile strength allows the clamp 810 to which the other end of the wire 802 is secured to press the deformable member 808 to contract longitudinally, and when the tensile strength reaches or exceeds a prescribed value, the deformable member is deformed and contracted, so that the buckle 18 can be moved upward (in the direction shown by the arrow U3) by the length corresponding to the length of contraction of the deformable member 808. Therefore, as in the case of the power transmission mechanism described above, the impact force applied by the passenger can be absorbed in case of emergency.

As a matter of course, in this embodiment, the connecting portion to which the wire 802 is connected may be disposed in said lap anchor body (not shown).

Figure 61:
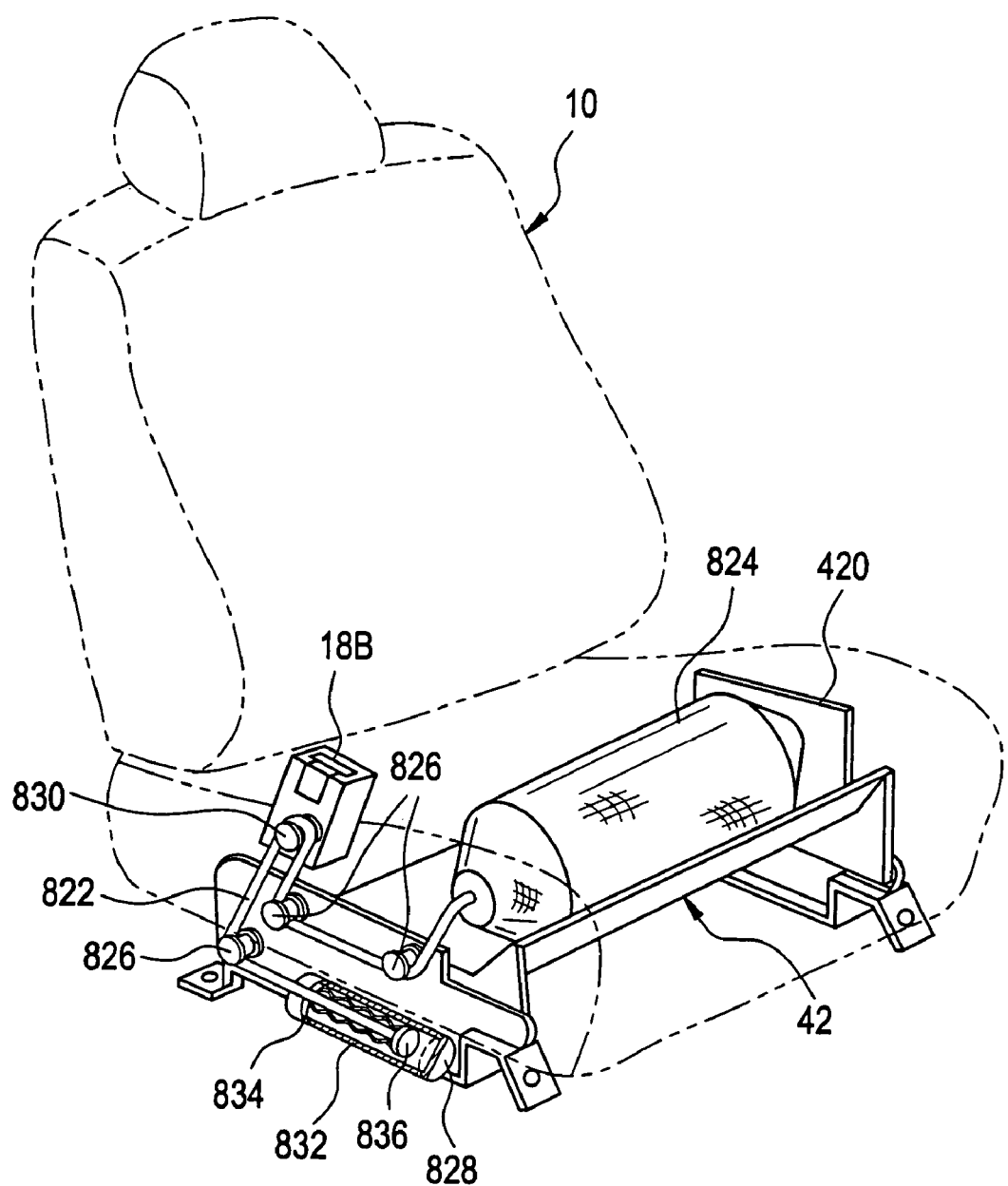
FIG. 61 is an explanatory drawing showing the ninth structural example of the power transmission mechanism provided with a shock-absorbing mechanism according to an embodiment of the invention.

FIG. 61 is a perspective view of the ninth structural example of the power transmission mechanism partly in cross section having a shock-absorbing mechanism according to the embodiment of the invention. In FIG. 61, identical numerals and signs designates identical components.

The power transmission mechanism 820 shown in FIG. 61 comprises a wire 822 for transmitting a shrinking force of the air belt to pull down the buckle body 18B, one end of the wire 822 is connected to the air belt 824, and the other end is guided by the guide 826 and connected to a shock-absorbing mechanism 828 installed at the side of the base plate 42 of the seat 10.

The buckle body 18B is provided with a hooking portion 830 to which the wire 822 is hooked. By hooking the mid section of the wire 822 on the hooking portion 830 in generally U-shape, the buckle body is engaged with the wire.

The shock-absorbing mechanism 828 has, as in the case of the connecting member 766 of the power transmission mechanism 760 described above, a cylindrical hollow structure, and comprising a deformable member 832 formed of a corrugate pipe, a band-shaped metal, a metal lath or the like is mounted. The other end of the wire 822 is inserted through the insertion hole 834 provided on the end of the shock-absorbing mechanism 828 into the shock-absorbing mechanism 828. On of the ends of the deformable member 832 abuts against the peripheral edge of the insertion hole 834, and at the other end, a clamp 836 is abutted. The wire 822 inserted from the insertion hole 834 into the shock-absorbing mechanism 828 is passed through the deformable member 832, and then secured to the clamp 836 abutted against the other end of the deformable member 832.

In the passenger protecting apparatus having a power transmission mechanism 820, when the buckle body 18B is strongly pulled upward (in the direction shown by an arrow U), the mid section of the wire 822 is pulled together with the buckle body 18B so that a tensile strength is applied to the wire 822, and the clamp 836 to which the other end of the wire 822 is secured presses the deformable member 832 by the tensile strength so as to contract the deformable member 832 longitudinally. In order to construct the passenger protecting mechanism in such a manner that when the tensile strength applied to the wire 822 reaches or exceeds a prescribed value, the deformable member 832 deforms and is contracted, so that the buckle body 18B can move upward (in the direction shown by the arrow U) while receiving a drag accompanied by deformation of the deformable member 830, as in the case of the power transmission mechanism described above, the impactive force applied by the passenger can be absorbed in case of emergency.

In this embodiment, though the wire 822 is constructed in such a manner that the buckle body 18B can engage, it is also possible to construct in such a manner that the lap anchor body is engaged instead of the buckle body.

As described thus far, according to the passenger protecting apparatus of the present invention, a submarine phenomenon of the passenger can be prevented by the use of an air belt, or the passenger can be protected by applying a pretension to the webbing. It is also possible to prevent the passenger sitting in the rear seat from jumping toward the front.

The priority documents Japanese Patent Application Nos. H11-375178 (filed Dec. 28, 1999) and 2000-202511 (filed Jul. 4, 2000) are hereby incorporated by reference herein in their entirety.

What is claimed is:

1. An apparatus for protecting a passenger seated in a seat having a seat cushion and a seat back, comprising:

an air belt connected to the seat cushion and the seat back and configured to inflate to form a sleeve wall at a side of the seat cushion; and a plate disposed under the seating surface of the seat cushion and configured to tilt upward, wherein a length of the air belt is configured to decrease when the air belt is inflated, and wherein the air belt is connected to the plate and the seat back.

2. The apparatus of claim 1, wherein the plate is operatively connected with at least one of a seat belt buckle and a seat belt lap anchor so that when the plate tilts upward the at least one of the buckle and the lap anchor move downward.

3. The apparatus of claim 2, wherein a connection between the plate and the at least one of the buckle and the anchor is a wire.

4. The apparatus of claim 3, wherein movement of the wire is limited to one direction.

5. An apparatus for protecting a passenger seated in a seat having a seat cushion and a seat back comprising an air belt connected to the seat cushion and the seat back and configured to inflate to form a sleeve wall at a side of the seat cushion, wherein a length of the air belt is configured to decrease when the air belt is inflated, and wherein the air belt is connected to a plate located under a seating surface of the seat so that when the air belt inflates and decreases in length the plate tilts upward to inhibit the passenger from being subjected to a submarine phenomenon.

6. An apparatus for protecting a passenger seated in a vehicle seat having a seat cushion and a seat back comprising an air belt connected to the seat cushion and the seat back and configured to inflate to form a sleeve wall at a same side of the seat cushion and the seat back, wherein a length of the air belt is configured to decrease when the air belt is inflated, wherein the air belt is configured to inflate when the vehicle is detected to be involved in a side crash, and wherein the air belt is configured to pretension a seat belt when the air belt is inflated.

7. The apparatus of claim 6, further comprising an upwardly tilting plate located under a seating surface of the cushion, wherein the plate is configured to tilt upwards when the air belt inflates.

8. An apparatus for protecting a passenger seated in a vehicle seat having a seat cushion and a seat back, the apparatus comprising:

an air belt connected to the seat cushion and the seat back and configured to inflate to form a sleeve wall at a side of the seat cushion, when the vehicle is detected to be involved in a side crash; and a belt buckle configured to move downward when the air belt is inflated to thereby apply a pretension to a seat belt, p1 wherein a length of the air belt is configured to decrease when the air belt is inflated.

9. The apparatus of claim 8, further comprising:

a plate configured to rotate about a fixed shaft.

10. The apparatus of claim 9, wherein the plate is disposed under a seating surface of the seat cushion and is configured to tilt upward.

11. The apparatus of claim 8, wherein movement of the belt buckle is limited to the downward direction.

12. An apparatus for protecting a passenger seated in a vehicle seat having a seat cushion and a seat back, the apparatus comprising:

an air belt connected to the seat cushion and the seat back and configured to inflate to form a sleeve wall at a side of the seat cushion, when the vehicle is detected to be involved in a side crash; and a lap anchor configured to move downward when the air belt is inflated to thereby apply a pretension to a seat belt, wherein a length of the air belt is configured to decrease when the air belt is inflated.

13. The apparatus of claim 12, wherein movement of the lap anchor is limited to the downward direction.

14. The apparatus of claim 12, further comprising:

a plate configured to rotate about a fixed shaft.

15. The apparatus of claim 14, wherein the plate is disposed under a seating surface of the seat cushion and is configured to tilt upward.

* * * * *